(12) United States Patent
Karr et al.

(10) Patent No.: US 9,392,413 B2
(45) Date of Patent: *Jul. 12, 2016

(54) LOCATION OF COOPERATIVE TAGS WITH PERSONAL ELECTRONIC DEVICE

(71) Applicant: Santa Monica Semiconductor, LLC, Santa Monica, CA (US)

(72) Inventors: Lawrence J. Karr, Santa Monica, CA (US); Roy J. Mankovitz, Santa Monica, CA (US)

(73) Assignee: SANTA MONICA SEMICONDUCTOR, LLC, Santa Monica, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/549,478

(22) Filed: Nov. 20, 2014

(65) Prior Publication Data

US 2015/0201308 A1 Jul. 16, 2015

Related U.S. Application Data

(60) Continuation of application No. 14/048,555, filed on Oct. 8, 2013, now Pat. No. 9,042,916, which is a division of application No. 13/049,599, filed on Mar. 16, 2011, now Pat. No. 8,583,145, which is a division of application No. 11/924,553, filed on Oct. 25, 2007, now Pat. No. 7,917,155.

(60) Provisional application No. 60/854,827, filed on Oct. 27, 2006.

(51) Int. Cl.
| | |
|---|---|
| *H04W 24/00* | (2009.01) |
| *H04W 4/02* | (2009.01) |
| *G01S 13/82* | (2006.01) |
| *G08B 21/02* | (2006.01) |
| *G08B 21/24* | (2006.01) |
| *G01S 5/02* | (2010.01) |

(52) U.S. Cl.
CPC ............ *H04W 4/025* (2013.01); *G01S 5/0284* (2013.01); *G01S 13/825* (2013.01); *G08B 21/023* (2013.01); *G08B 21/0227* (2013.01); *G08B 21/0263* (2013.01); *G08B 21/0266* (2013.01); *G08B 21/0272* (2013.01); *G08B 21/24* (2013.01)

(58) Field of Classification Search
CPC .. H04W 64/00; H04W 4/02; H04L 29/08657; G06Q 10/08
USPC ............ 455/456.5, 456.1, 456.6; 340/539.13
See application file for complete search history.

(56) References Cited

U.S. PATENT DOCUMENTS

| | | |
|---|---|---|
| 4,006,477 A | 2/1977 | Yost, Jr. et al. |
| 4,047,171 A | 9/1977 | Fugit |

(Continued)

*Primary Examiner* — Danh Le

(57) ABSTRACT

The present disclosure relates to location and communication systems that can be utilized for locating people, pets and other objects with a software defined radio set. A personal electronic device (PED) such as a cellular telephone, personal data assistant (PDA) or other device that include a software defined radio set can be configured for operation as a locator device. The PED transmits a signal A transponder or micro-transponder (MT) that is tagged to an object is arranged to reply to a transmission received from the PED. The PED based locator is arranged to calculate a distance between the PED and the MT using the time-of-flight (TOF) between the transmission and the receipt of a reply. The absolute geographic position of the PED can be determined using satellite navigation information, while the position of the MT relative to the PED can be determined from the TOF information.

10 Claims, 34 Drawing Sheets

(56) References Cited

U.S. PATENT DOCUMENTS

| | | | | |
|---|---|---|---|---|
| 4,156,873 | A | 5/1979 | Moore | |
| 4,218,680 | A | 8/1980 | Kennedy | |
| 4,468,656 | A | 8/1984 | Clifford et al. | |
| 4,475,106 | A | 10/1984 | Andrews | |
| 4,608,022 | A | 8/1986 | Bellofatto | |
| 4,954,835 | A | 9/1990 | Lanciaux | |
| 5,075,694 | A | 12/1991 | Donnangelo et al. | |
| 5,280,293 | A | 1/1994 | Tong | |
| 5,418,736 | A | 5/1995 | Widigen et al. | |
| 5,448,248 | A | 9/1995 | Anttila | |
| 5,515,062 | A | 5/1996 | Maine et al. | |
| 5,515,419 | A | 5/1996 | Sheffer | |
| 5,572,427 | A | 11/1996 | Link et al. | |
| 5,574,467 | A | 11/1996 | Saunders | |
| 5,576,716 | A | 11/1996 | Sadler | |
| 5,613,193 | A | 3/1997 | Ishikawa et al. | |
| 5,632,217 | A | 5/1997 | Ford et al. | |
| 5,905,464 | A | 5/1999 | Lanciaux | |
| 5,943,013 | A | 8/1999 | Ohashi | |
| 6,058,306 | A | 5/2000 | Liu | |
| 6,169,514 | B1 | 1/2001 | Sullivan | |
| 6,177,907 | B1 | 1/2001 | Golovin et al. | |
| 6,268,829 | B1 | 7/2001 | Weckstrom | |
| 6,300,875 | B1 * | 10/2001 | Schafer | G01S 19/16 340/539.1 |
| 6,317,049 | B1 | 11/2001 | Toubia et al. | |
| 6,337,665 | B1 | 1/2002 | Gaukel | |
| 6,362,778 | B2 | 3/2002 | Neher | |
| 6,437,742 | B1 | 8/2002 | Niesen et al. | |
| 6,466,162 | B2 | 10/2002 | Boman | |
| 6,608,592 | B2 | 8/2003 | McReynolds | |
| 6,611,757 | B2 | 8/2003 | Brodie | |
| 6,646,617 | B1 | 11/2003 | Gaukel | |
| 6,778,130 | B1 | 8/2004 | Bevan et al. | |
| 6,801,782 | B2 | 10/2004 | McCrady et al. | |
| 6,826,472 | B1 | 11/2004 | Kamei et al. | |
| 6,829,229 | B1 | 12/2004 | Palermo et al. | |
| 6,876,878 | B2 | 4/2005 | Zhdanov | |
| 6,914,559 | B2 | 7/2005 | Marks | |
| 7,355,513 | B1 * | 4/2008 | Brockel | G01S 19/17 340/539.11 |
| 7,358,894 | B2 * | 4/2008 | Stoschek | B60R 25/24 342/357.29 |
| 7,646,330 | B2 | 1/2010 | Karr | |
| 7,917,155 | B2 | 3/2011 | Karr | |
| 8,583,145 | B2 | 11/2013 | Karr | |
| 2002/0062301 | A1 * | 5/2002 | Rudoff | G06F 17/30067 |
| 2002/0062310 | A1 | 5/2002 | Marmor et al. | |
| 2003/0208317 | A1 | 11/2003 | Chang | |
| 2005/0012653 | A1 | 1/2005 | Heide et al. | |
| 2005/0171695 | A1 | 8/2005 | Sullivan | |
| 2005/0187677 | A1 | 8/2005 | Walker | |
| 2005/0243952 | A1 | 11/2005 | Li | |
| 2005/0248484 | A1 * | 11/2005 | Stoschek | B60R 25/24 342/357.29 |
| 2006/0212909 | A1 * | 9/2006 | Girard | H01Q 1/28 725/73 |
| 2006/0222087 | A1 | 10/2006 | Bauman et al. | |
| 2006/0276201 | A1 | 12/2006 | Dupray | |
| 2007/0030116 | A1 | 2/2007 | Feher | |
| 2007/0032246 | A1 | 2/2007 | Feher | |
| 2007/0032266 | A1 | 2/2007 | Feher | |
| 2007/0063820 | A1 | 3/2007 | Kung | |
| 2007/0194923 | A1 | 8/2007 | Karr | |
| 2007/0194924 | A1 | 8/2007 | Karr | |
| 2007/0194925 | A1 | 8/2007 | Karr | |
| 2008/0248813 | A1 * | 10/2008 | Chatterjee | G01S 1/68 455/456.2 |
| 2011/0215922 | A1 * | 9/2011 | Armstrong | G08B 1/08 340/539.13 |
| 2013/0136355 | A1 * | 5/2013 | Demandolx | H04N 5/3572 382/167 |
| 2013/0137365 | A1 * | 5/2013 | Taylor | H04B 7/18508 455/12.1 |
| 2014/0038636 | A1 | 2/2014 | Karr | |

* cited by examiner

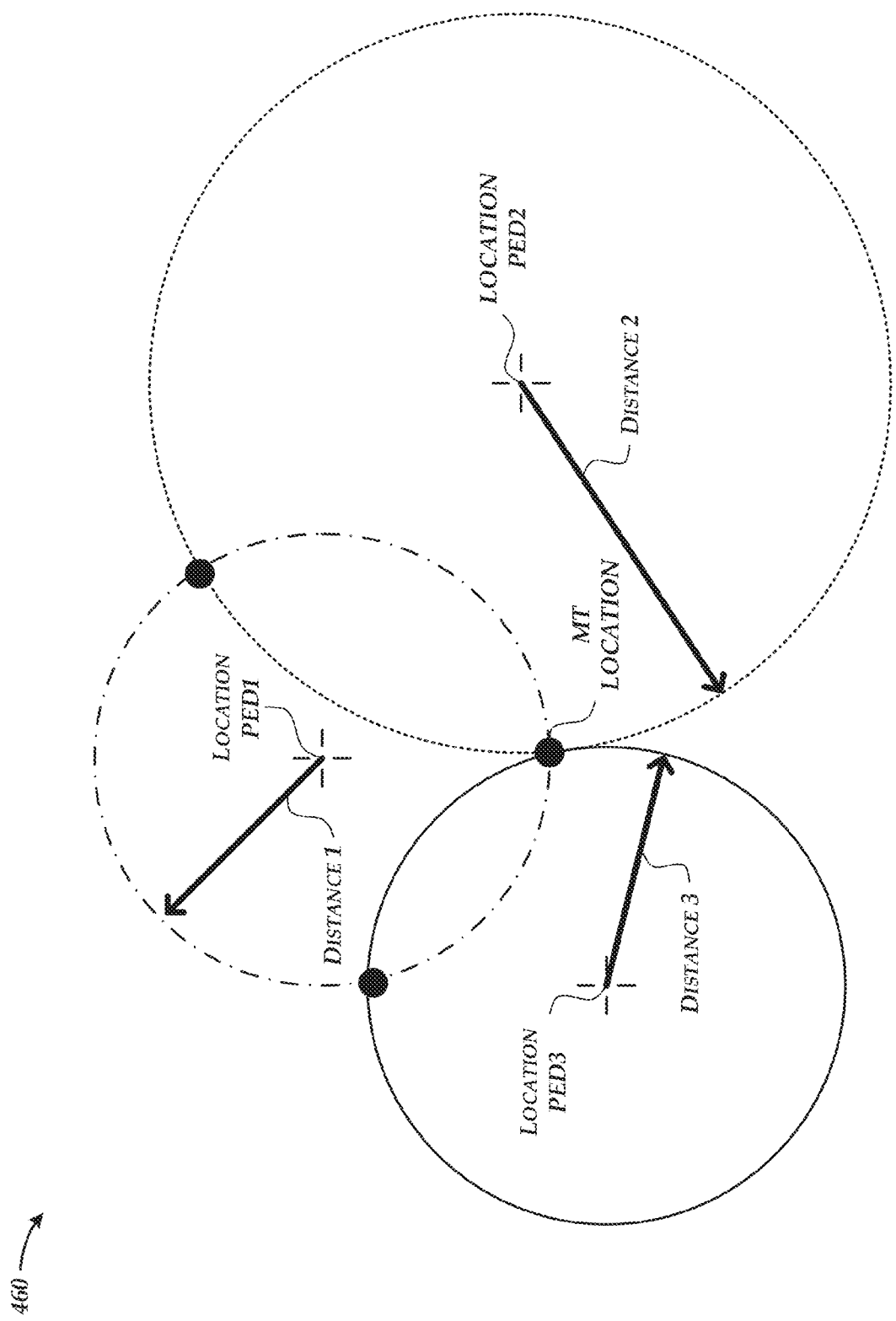

LOCATION OF COOPERATIVE TAGS WITH PERSONAL ELECTRONIC DEVICE

CROSS-REFERENCE TO RELATED APPLICATIONS

This application is a continuation of and claims priority to application Ser. No. 14/048,555, filed Oct. 8, 2013, entitled LOCATION OF COOPERATIVE TAGS WITH PERSONAL ELECTRONIC DEVICE, now granted as U.S. Pat. No. 9,042,916, on May 26, 2015, which is a divisional of and claims priority to application Ser. No. 13/049,599, filed Mar. 16, 2011, entitled LOCATION OF COOPERATIVE TAGS WITH PERSONAL ELECTRONIC DEVICE, now granted as U.S. Pat. No. 8,583,145, on Nov. 12, 2013, which is a divisional of and claims priority to application Ser. No. 11/924,553, filed Oct. 25, 2007, entitled LOCATION OF COOPERATIVE TAGS WITH PERSONAL ELECTRONIC DEVICE, now granted as U.S. Pat. No. 7,917,155, on Mar. 29, 2011, which claims the benefit under 35 United States Code §119(e) of United States Provisional Patent Application No. 60/854,827, filed Oct. 27, 2006, all of which are hereby incorporated by reference.

FIELD OF THE INVENTION

The present disclosure relates generally to location and communication systems for locating people, pets, and other objects. More particularly the disclosure relates to the use of portable devices such as cellular telephones, PDAs and other personal electronic devices that include software definable radio sets. A software application program can be used to configure the software defined radio for use in locating people and/or objects that are tagged with a transponder or microtransponder device.

BACKGROUND

Modern cellular telephones are becoming more flexible and, essentially "software defined". Thus, they often operate at different frequencies, modulation types and data rates in a completely transparent fashion to the user. Often, these phones have short message services and/or internet browsing capabilities. In general, communication data rates and signal bandwidths have increased with the desire to operate them as PDA's (personal digital assistants). In addition, it is quite common for even generic cellular telephones to have an embedded GPS reception capability, which often isn't directly available to the user, but is employed for emergency position finding or other purposes. Often the signal processing in cellular telephones is implemented in programmable DSP's or digital signal processing chips. This lends great flexibility to said cellular telephones.

These cellular telephones have rechargeable batteries, which are often recharged at night, which minimizes the volume and mass of the battery.

Separately, there has of late been a very large increase in the use of GPS devices for a variety of purposes, very often automobile navigation, where they are extremely effective. There has also been interest in location of persons, animals, and things. In many cases, the GPS solution to this is impractical, because of energy consumption, physical size, and/or inadequate access to the sky overhead.

Some methods for locating an object are known in the art. A missing vehicle locator system is described in U.S. Pat. No. 5,418,736 issued to Bird. The vehicle locator system uses one or more GPS systems in conjunction with a GPS antenna, a receiver/transmitter, a telephone with associated antennas, and a modem mounted in a vehicle whose position is to be monitored. A paging request is issued and received by a paging responder in the vehicle. The paging request causes the modem to interrogate the GPS receiver to determine the current position of the vehicle. The current position of the vehicle is transmitted via a cellular telephone link to notify a vehicle location service center of the current location of the vehicle. Other known location determination techniques include the use of a Loran or a Glonass satellite based system.

Another object location system is described in U.S. Pat. No. 5,576,716 to Sadler for locating lost or stolen property. This location system includes a GPS module, a microcomputer, a modem, and a telephone, all of which must be installed in the vehicle. The system described regularly and automatically computes the position of the property for transmission via the phone link to a central receiver/transmission station.

Low power transmissions are subject to signal corruption due to noise, static, and signal interference. Extracting information from a signal in the presence of such interference and noise is very difficult when the information signal is of the same order of magnitude as the noise sources. The presently described invention identifies various noise problems from the conventional solutions and provides a new and novel system, method, and apparatus that is arranged to extract signals from a transmission using very low power in a small scale object location system.

BRIEF DESCRIPTION OF THE DRAWINGS

Non-limiting and non-exhaustive embodiments are described with reference to the following drawings:

FIGS. 4A-4E are diagrams illustrating the use of the satellite based navigation in conjunction with one or more personal electronic devices each arranged for operation as a locator of cooperative transponder tags;

DETAILED DESCRIPTION

Figure 1:
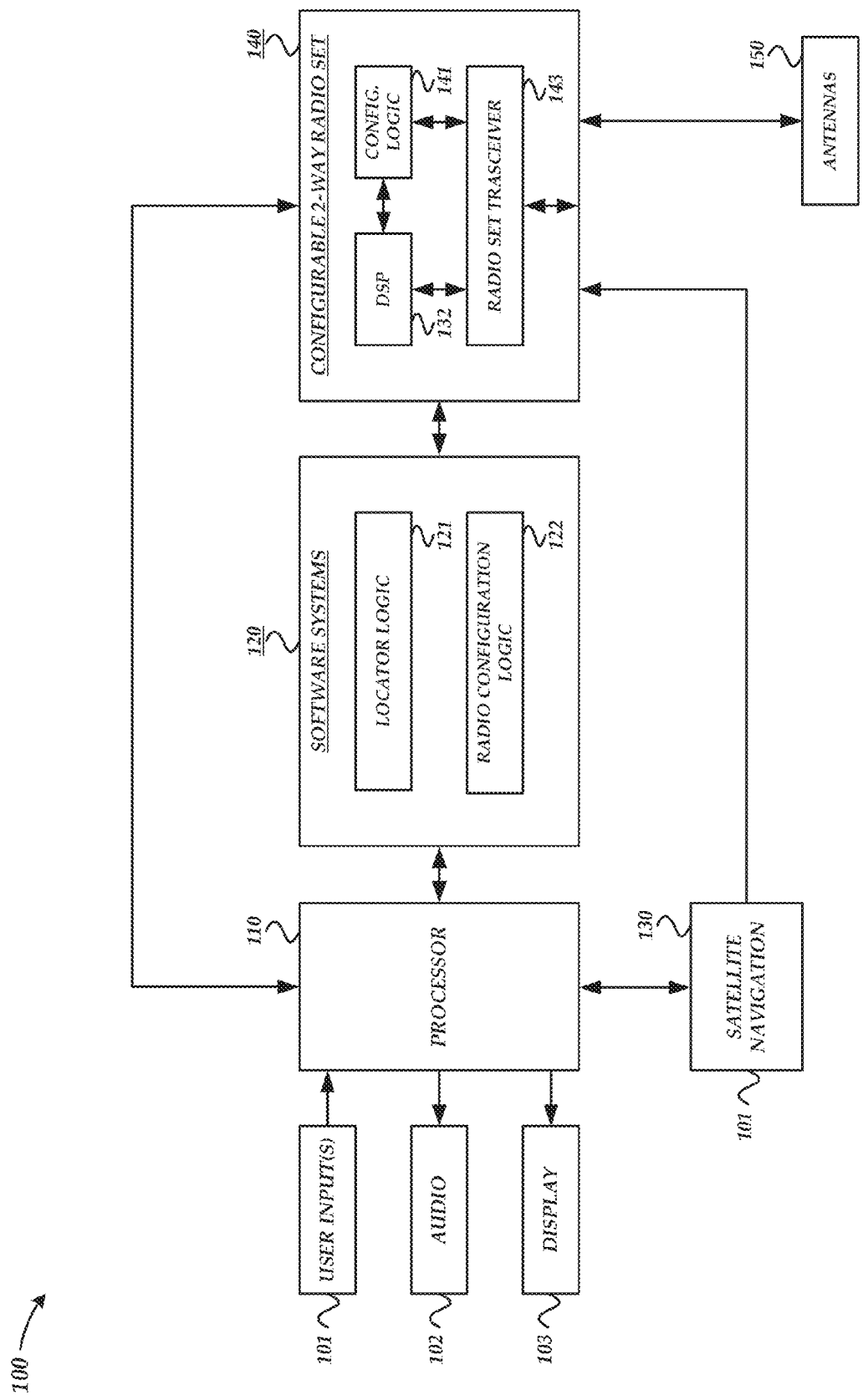
FIG. 1 is a block diagram illustrating a personal electronic device that is arranged for operation as a locator of cooperative transponder tags.

The present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

Briefly stated, the present disclosure relates to location and communication systems that can be utilized for locating people, pets and other objects with a software defined radio set. A personal device (PED) such as a cellular telephone, personal data assistant (PDA) or other device that include a software defined radio set can be configured for operation as a locator device. The PED transmits a signal to a transponder or micro-transponder (MT) that is tagged to an object is arranged to reply to a transmission received from the PED. The PED based locator is arranged to calculate a distance between the PED and the MT using the time-of-flight (TOF) between the transmission and the receipt of a reply. The absolute geographic position of the PED can be determined using satellite navigation information, while the position of the MT relative to the PED can be determined from the TOF information.

As will be described, the PED and the MT each include a receiver and a transmitter. The communication signals from the transmitters are encoded with a unique ID code. The communication signal consists of a sequence of encoded transmissions, where each sequence is arranged to provide a portion of clock synchronization and calibration information. Each receiver validates the ID code for the transmission, and decodes information. The frequency, phase, and starting time of the coded transmission sequence is determined by the transmission sequence itself such that clock recovery can be performed without additional information. The MT can be a wearable circuit such as a band or collar, affixed to an object, embedded in an object, or an implantable bionic device.

Block Diagram for a Locator Based Personal Electronic Device (PED)

FIG. 1 is a block diagram illustrating a personal electronic device (100) that is arranged for operation as a locator of cooperative transponder tags, arranged in accordance with the present disclosure. The personal electronic device or PED can be any device that includes a software defined two-way wireless radio set including but not limited to: cellular telephone devices, personal data assistance (PDA) devices, combined cellular telephone/PDA devices, as well as others.

The example personal electronic device (PED) of FIG. 1 includes a processor (110), a software system (120), a satellite navigation system (130), and a configurable two-way wireless radio set (140). The processor (110) is arranged to interact with the software system (120) to perform a variety of functions. The software system (120) includes a radio control logic portion (121) that is used for configuring the two-way wireless radio set (140), and also a locator logic (122) that is used to determine and/or track the location of one or more transponder tags (not shown). The two-way wireless radio set (140) can include a variety of functional blocks such as radio configuration logic (141), baseband processing (142, e.g. DSP based baseband processor), and a transceiver radio set (143). The described blocks may be combined or separated into other functional blocks based on the use of a particular chipset or the overall system implementation as may be desired.

The satellite navigation system (130) can be of any variety such as GPS, Loran, Glonass, and Galileo based satellite navigation systems. The system can be provided as a single chip solution, a chip set, or integrated together with one or more other functional blocks as may be desired.

The processor (110) can be any variety of processor including processor cores or integrated circuits. Example processors include any one of a micro-processor, a micro-controller, a complex instruction set computer (CISC) processor, a reduced instruction set computer (RISC) processor, an application specific integrated circuit (ASIC), or a programmable logic device (PLD).

The necessary software and/or firmware for the processor can be provided in a memory circuit (not shown) or some other storage medium (e.g., hard disk drive, optical disk, etc.). Example memory circuits include random access memory (RAM) circuits, dynamic random access memory (DRAM) circuits of all varieties and static random access memory (SRAM) circuits, to name a few. Some example memory circuits are read-only memory (ROM) circuits, while others can be programmable read-only memory circuits (PROM) such as EPROMs, EEPROMS, and other non-volatile memories (NVM) such as flash-type memories and other varieties.

In operation, the two-way wireless radio set (140) is configured in response to software applications that are executed by the processor (110). During the configuration process, the radio configuration logic (122) in the software system (120) is used to generate configuration data (CONFIG) that is used by the two-way wireless radio set (140), such as by the configuration logic (141). The configuration logic (141) is used to cooperate with the baseband signal processing (142, e.g., DSP) and the radio set transceiver (143) to adjust transmit and receive frequencies, data encryption and decryption, and other functions necessary for use of the two-way radio for locating a transponder. The two-way radio set (140) may also cooperate with the processor (110) and/or satellite navigation systems (130) directly as may be necessary. Antennas (150) are used with the two-way radio set (140) to transmit and receive.

The personal electronic device (PED) can optionally be configured to make use of the satellite navigation capability (e.g., GPS set) to determine an absolute position of the PED, and to very precisely frequency correct its quartz crystal oscillator.

The personal electronic device (PED) may include any variety of user interface means such as user inputs (101) from a keyboard, keypad, joystick, button, a microphone, or another reasonable user input means. Also, the user interface means may include any variety of output mechanisms such as an audio device (102), a display device (103), or any other reasonable output means.

Example Operation Environment

Figure 2A:
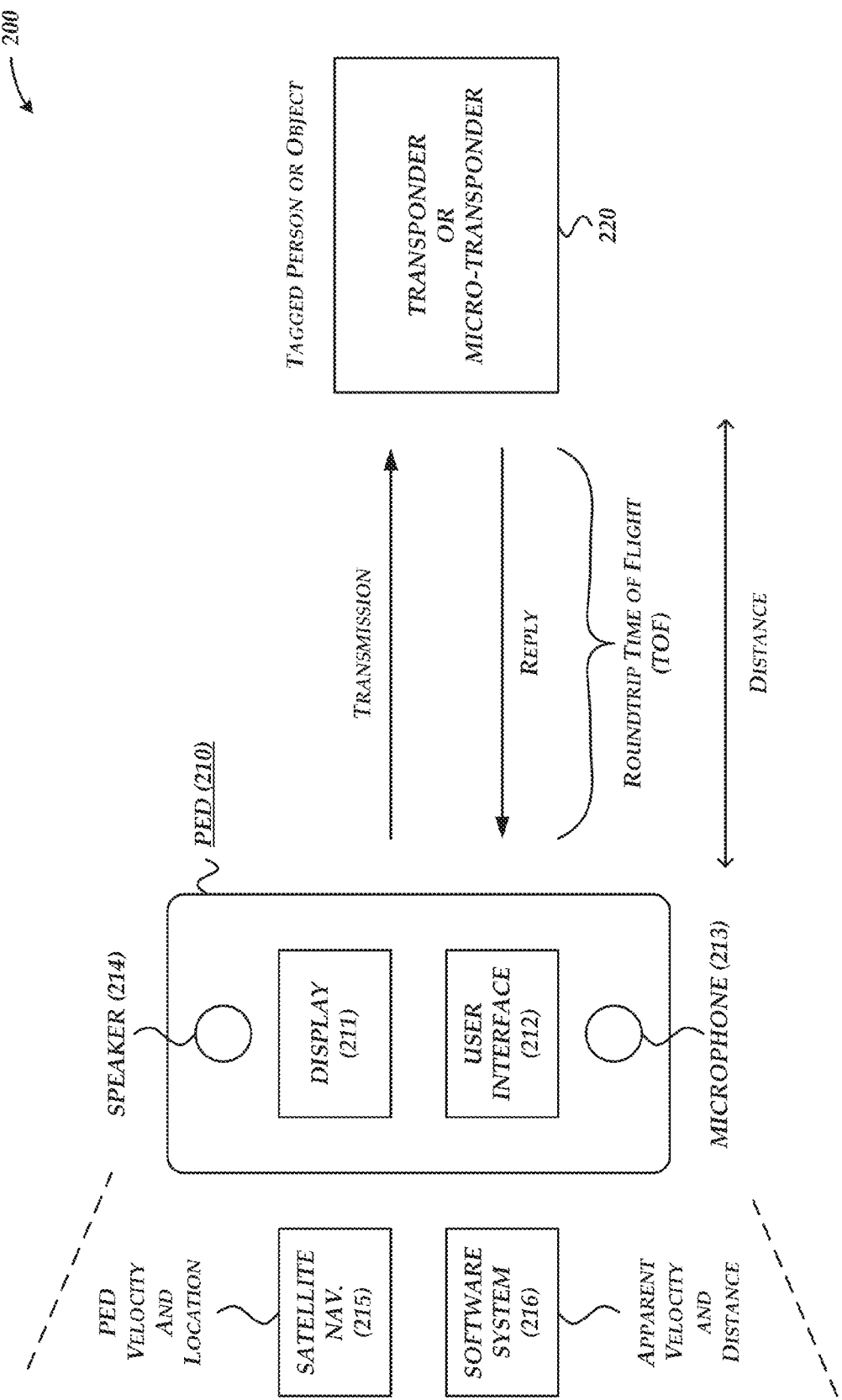
FIGS. 2A-2C are diagrams illustrating example operating environments for a personal electronic device arranged for operation as a locator of cooperative transponder tags.
Figure 2B:
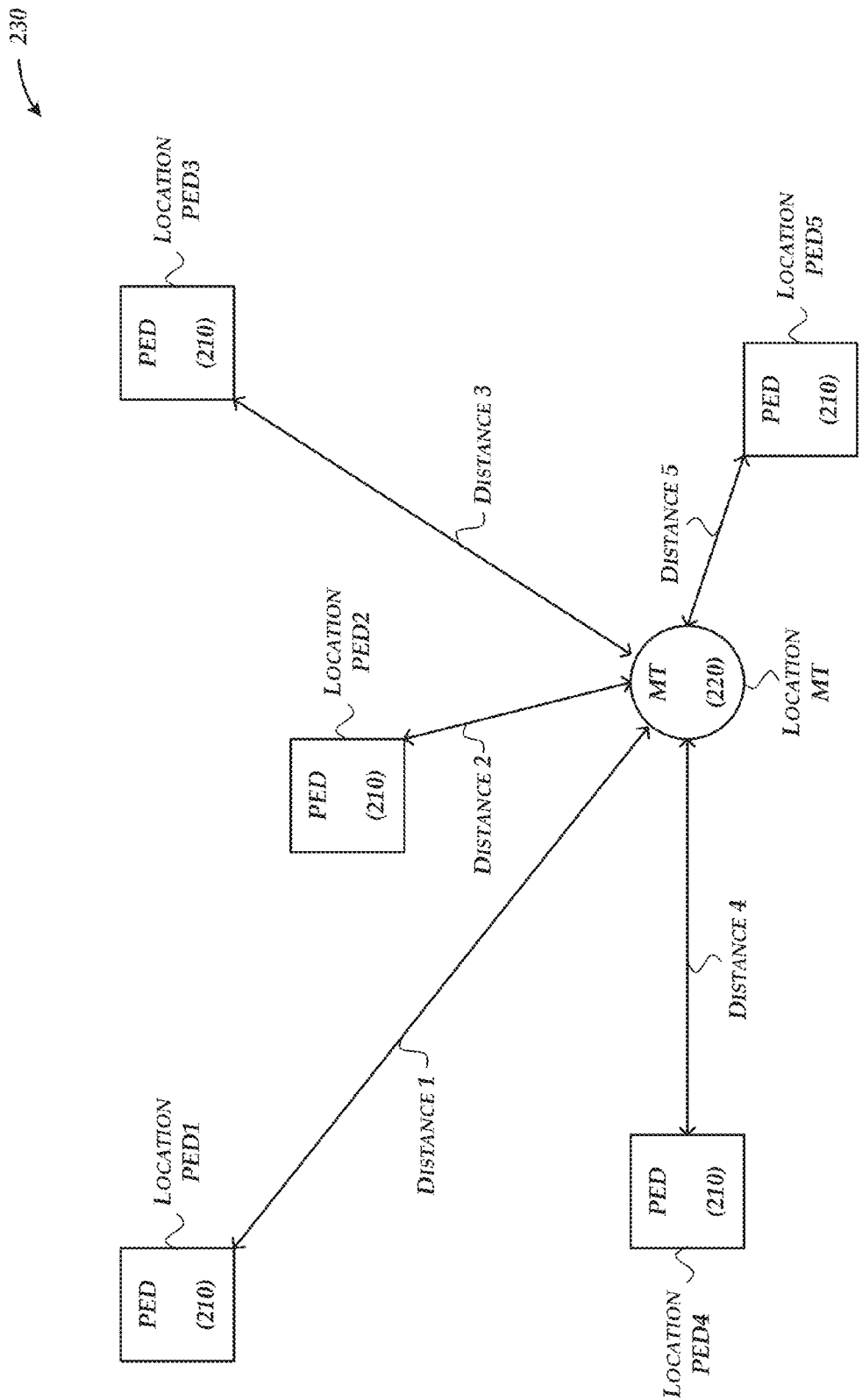
Figure 2C:
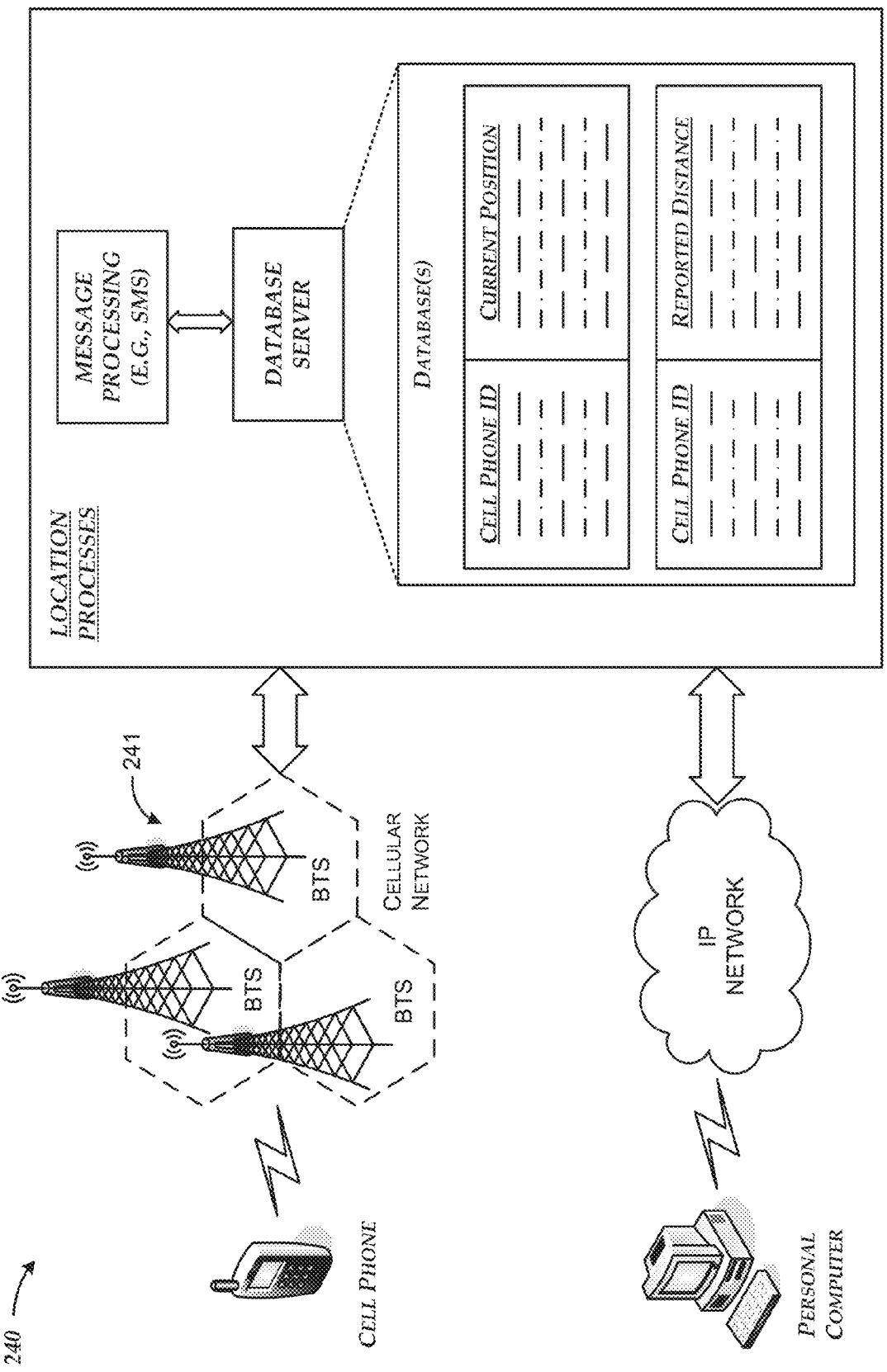

FIGS. 2A-2C are diagrams illustrating example operating environments for a personal electronic device arranged for operation as a locator of cooperative transponder tags.

As illustrated by the operating environment (200) of FIG. 2A, an example personal electronic device (PED 210) may includes a display (211), a user interface (UI 212), a microphone (213) and a speaker (214). An example display (211) is an LCD display, either color or monochromatic, such as may be found in a cellular telephone. The user interface (212) can be a touchpad, touchscreen, a keypad as well as any other known user interface that may be desired. Example speakers (214) include all varieties of conventional speakers including electrostatic speakers and piezo devices. The microphone (213) can be used as a voice input mechanism as will be described later.

During operation the PED (210) is carried by a user. The user activates the location mode and designates the identity of the target (e.g., TARGET ID), such as via the microphone (213) input of the user interface. After activation of the location mode, the two-way radio (e.g., see FIG. 1) is configured for communicating with the tagged person or object (220) and begins such communication between the PED (210) and the transponder (220) in the tag. The roundtrip time-of-flight (TOF) of the communication can be used to determine a distance between the tag's transponder (220) and the PED (210). The satellite navigation system (215) will monitor the location and velocity of the PED, while the software system (216) via the various processing functions will determine the apparent velocity and distance to the tagged object or person. Both of the velocities can be used together to determine a precise location, direction and distance between the PED (210) and the transponder (220). Moreover, the satellite navigation system (215) can identify an exact geographic location (e.g., lat1, long1) of the PED (210) so that the PED (210) can compute an exact geographic (e.g., lat2, long2) location of the tag's MT.

As illustrated by the operating environment (230) of FIG. 2B, multiple personal electronic devices (PED 210) can be used collaboratively to determine an exact location of a micro-transponder device (MT 220). The PEDs may each be arranged as described with reference to FIG. 2A, where each PED includes facility to measure a distance to MT 220. For example five PED devices are each located at a different geographic position (e.g., Location PED1-Location PED5) relative to the location (Location MT) of the MT (220). Each PED device can then be requested to make a distance measurement (e.g., Distance 1-Distance 5), and report the distance measurements to some form of central processing on either one of the PEDs (e.g., the requesting PED) or on a server within the communication network. The locations of the PEDs and the distance measurements together can form a set of geographically arranged overlapping circles that include a common point that corresponds to the location of the MT (220). The overall method of determining the position will be described in further detail with respect to FIGS. 4A-4E.

As illustrated by the operating environment (240) of FIG. 2C, a series of cellular towers (BTS) are arranged in a cellular telephone network (120) that facilitates communications to PEDs that includes cellular telephony capabilities. Cellular communications from the cellular towers are managed by a back-end server that can be operated by the cellular telephone company. A location process can be operated on a server so that a messaging processing system (e.g., SMS messages) can be managed to facilitate location processes.

In some example, a PED can initiate a search process by transmitting a message requesting a search for an MT by the location processes operated within the cellular telephone company's server. The location process then accesses a database through a database server to query for locations associated with the identified MT. Candidate PEDs are identified based on their relative position to the MT, and then a message can be communicated to those PEDs requesting a distance measurement. PEDs can then configure their radio sets to search for the MT, measure any distances to the MT, and report those measurements back to the server for analysis. The PEDs can also report their location to the server using their own satellite navigation system as previously discussed. The server then maintains a log of cell phone IDs for each PED, including their reported distance measurement and their current position. Once enough measurements are assembled, the server can determine the precise geographic location of the MT and communicate the result back to the requesting PED.

In some other examples, a none PED device can submit a search request such as from a personal computer via an internet based communication. The communication can be established directly with the cellular company via a website, or via some other mechanism such as an SMS message that is initiated over the internet. The server can again execute a location process to search for the identified MT, and report the search results back to the personal computer. Many other examples are also contemplated, and the above-described networked systems are merely provided as illustrative examples.

Example Audio Processing

Figure 3:
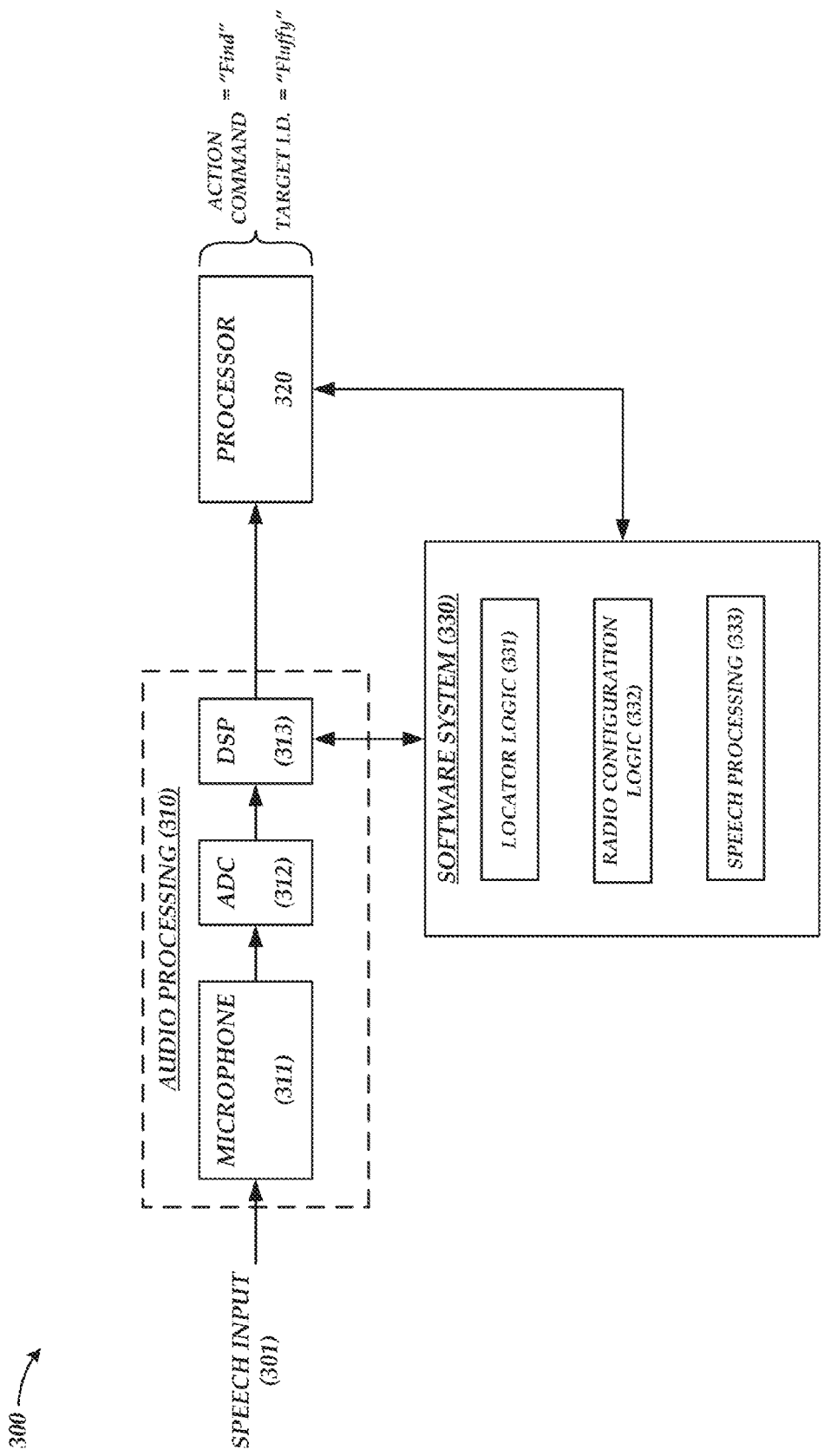
FIG. 3 is a block diagram illustrating example audio processing functions for a personal electronic device arranged for operation as a locator of cooperative transponder tags.

FIG. 3 is a block diagram illustrating example audio processing functions (300) for a personal electronic device (PED), arranged in accordance with features of the present disclosure. In particular, FIG. 3 illustrates example audio processing function that can be utilized for operating the PED by speech interpretation.

Onboard audio processing (310) for the microphone (311) may include an analog-to-digital converter (ADC 312) and digital signal processing (DSP 313). The audio processing (310) can be found in most conventional cellular telephones. In this instance however, the speech processing functions (333) are added to the software system (330) so that the processor (320) recognizes voice/speech based input (301) for an action command and a target ID that is used by the processor (320) to activate the locator mode.

For example, a location transmission is initiated by the user of the cellular telephone by a voice command such as "Find Fluffy." The word "Find" is interpreted as an action command to enter the locator mode, while the word "Fluffy" is interpreted as a target ID for the locator logic (331) in the software system (330). The radio configuration logic (332) in the software system (330) is utilized to configure the two-way radio set in the PED for a location operation. The locator logic (331) in the software system (330) is used by the processor (320) so that the target ID for "Fluffy" is coded into the transmission sequence for a specific transponder that is associated with "Fluffy", most likely a cat or dog in this example.

After the locator mode is active, a coded sequence that is specifically coded for the "Fluffy" transponder is transmitted. The transponder, which can be in a sleep mode that "wakes up" every few seconds or so (for e.g., 150 microseconds), and collects samples of the appropriate radio spectrum while active. If an appropriate set of sequences is found, the transponder will reply with a precisely timed reply, which is approximately delayed in time by the time-of-flight, or round trip time of the communication.

The PED is also configured under software control (e.g., software system 330) to capture samples of the radio spectrum at a predicted time for when the reply sequence from the transponder is expected. The reply sequence is delayed by the round-trip time of flight of the radio signals plus a fixed time offset. From this signal capture, the distance to the transponder can be determined as well as other auxiliary data.

Example Satellite Navigation Operation

Figure 4A:
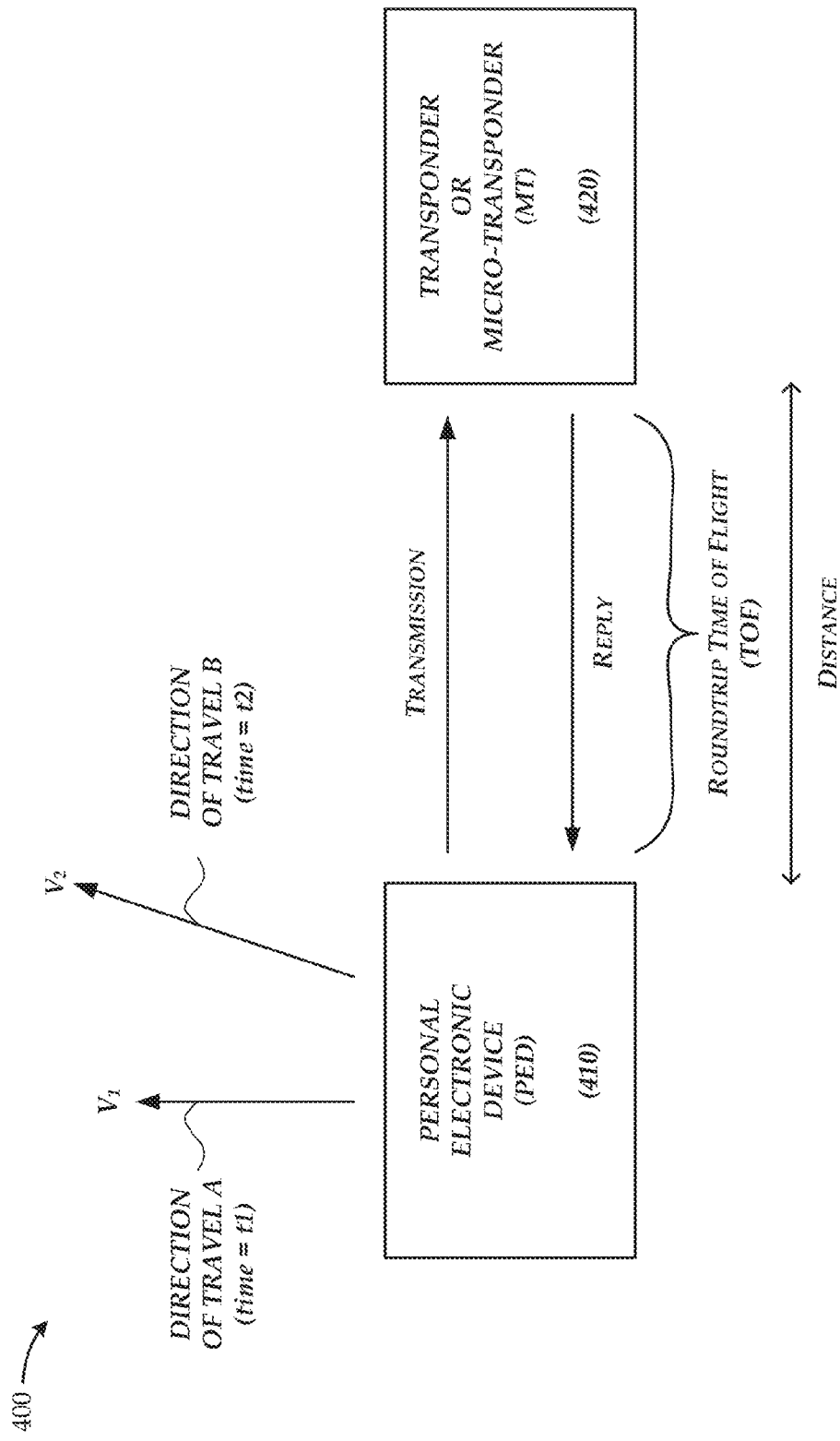
Figure 4B:
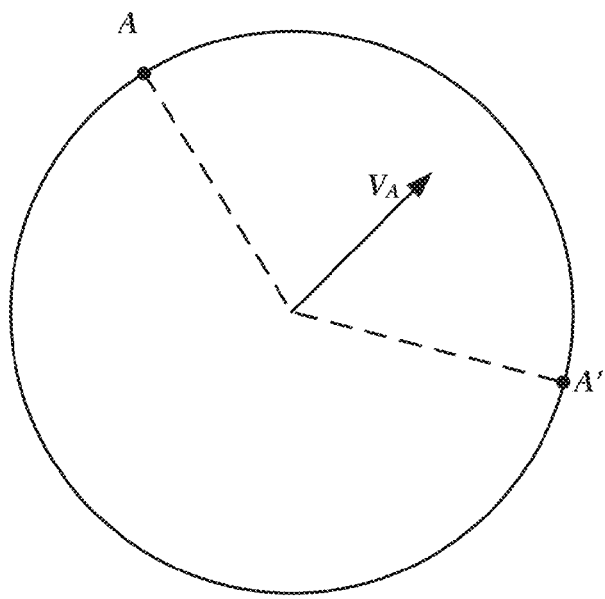
Figure 4C:
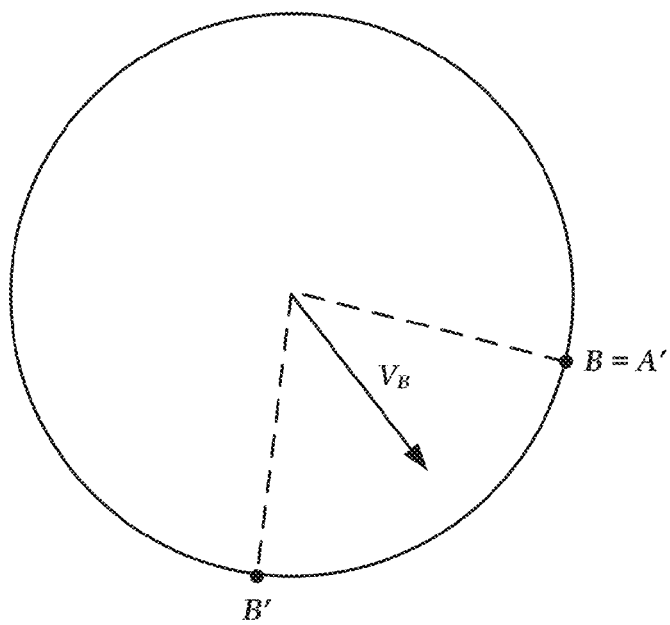

FIGS. 4A-4C are diagrams illustrating the use of satellite based navigation (e.g., GPS) in conjunction with a personal electronic device (PED) arranged for operation as a locator of cooperative transponder tags.

FIG. 4A illustrates a locator system (400) where a personal electronic device (410) is configured to operate as a locator that communicates with a transponder or micro-transponder (420) such as may be found on a tag. The PED (410) is moved by the user in any arbitrary direction when the locator mode is active. During a first instance of time (e.g., time=t0) the direction of travel is designated as direction A, while in a second instance of time (time=t1) the direction of travel is designated as B. The velocity of the PED (310) corresponds to a first velocity (V1) when the direction of travel corresponds to direction A, and a second velocity (V2) when the direction of travel corresponds to direction B. These velocities for the PED (310) are retrieved from the satellite navigation system (e.g., GPS), as are the known geographic positions (e.g., lat/long) of the PED (310).

FIG. 4B is a graphical diagram (430) illustrating a first velocity vector (VA). Velocity vector VA is positioned from an origin at the center of a circle, and extending in-between two points A and A'. Points A and A' correspond to the apparent velocity associated with the directional vector that is determined by processor via the locator logic, which occurs at the same time that velocity V1 is retrieved from the satellite navigation system.

FIG. 4C is a graphical diagram (440) illustrating a second velocity vector (VB). Velocity vector VB is similarly positioned from an origin at the center of a circle, and extending in-between two points B and B', wherein points B and B' correspond to the apparent velocity occurring at the same time that velocity V2 is retrieved from the satellite navigation system.

The direction of the transponder (420) relative to the PED (410) corresponds to the common direction between these two velocity vectors (VA, VB). Since A' and B are mapped at the same location, the ambiguity in direction is resolved and the other directions are discarded. This process is accomplished by analyzing the true velocity of the locator/PED with respect to the earth's reference system, and correlating this velocity with the apparent frequency and cadence shift of the signal from the "Fluffy" transponder.

Figure 4D:
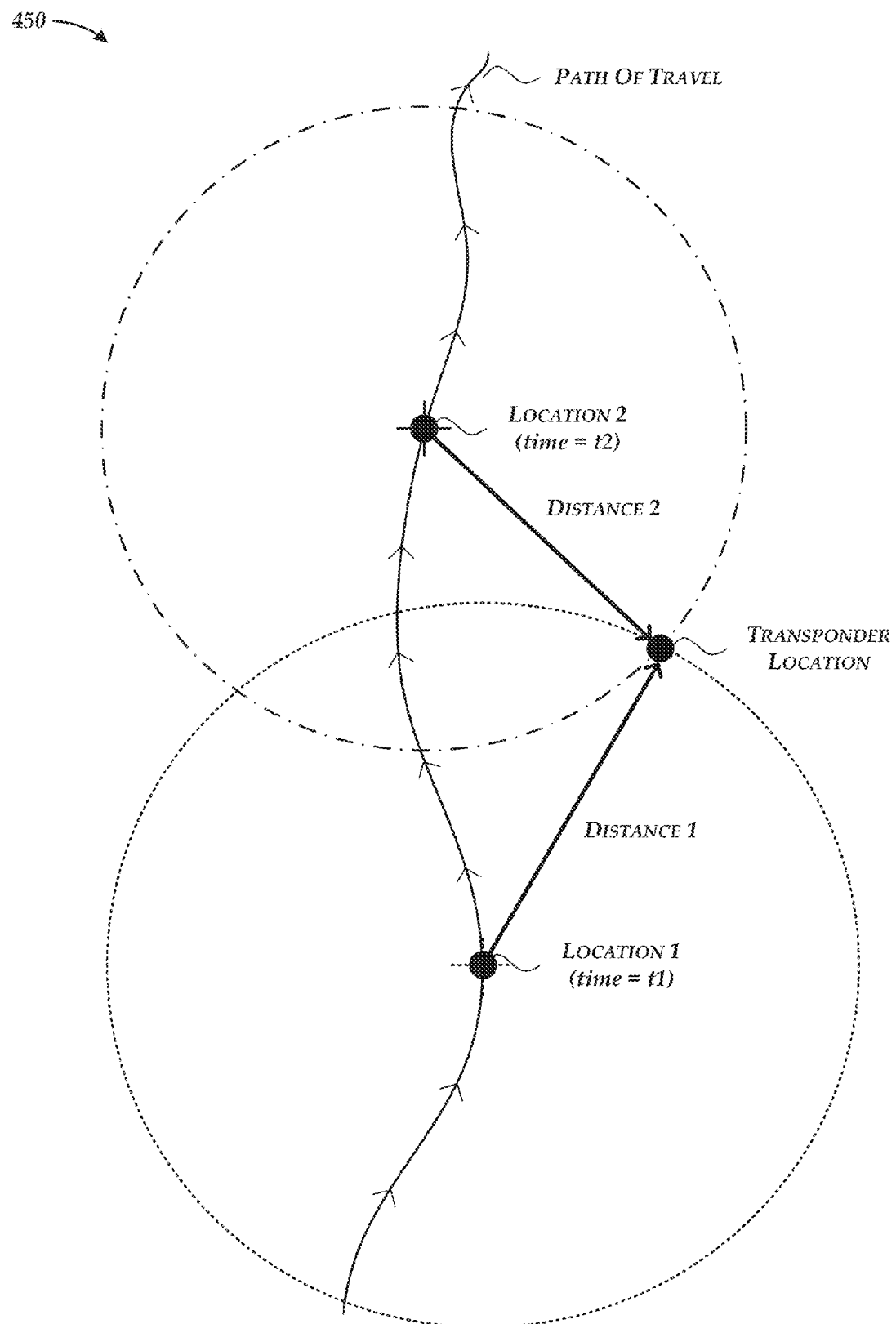

FIG. 4D is a graphical diagram (450) illustrating a location determination from a PED that performs a series of distance measurements as the PED moves through a path of travel. At time=t1, the PED is located at a first location (LOCATION 1) and calculates a first distance measurement (DISTANCE 1) based on a time-of-flight (TOF). At time=t2, the PED is located at a second location (LOCATION 2) and calculates a second distance measurement (DISTANCE 2) based on a time-of-flight (TOF). The circles illustrated in FIG. 4D illustrate a constant distance about the location of the PED at that point in time. The two circles intersect at two points, where one point corresponds to the location of the transponder. It is important to note that an ambiguity exists at another intersection point, which can easily be resolved by additional measurements as the path of travel continues.

FIG. 4E is a graphical diagram (450) illustrating a location determination from either one PED that performs a series of distance measurements as the PED moves through three points along a path of travel, or via multiple PED devices that report their location and distance measurement such as described previously for FIGS. 2A-2C. A first PED (PED1) is located a first location (Location PED1), and measures a first distance (DISTANCE 1) to the transponder. A second PED (PED2) is located a second location (Location PED2), and measures a second distance (DISTANCE 2) to the transponder. A third PED (PED3) is located a third location (Location PED3), and measures a third distance (DISTANCE 3) to the transponder.

Three circles are illustrated to demonstrate a constant radius of distance about the location at the time of measurement by a PED. Although each circle may overlap at two places, leaving an ambiguity in the exact location of the transponder, the use of all three measurements together results in a single location of the transponder (MT location). As such the above description illustrates that a network of PEDs communicating either through a server or directly to one another can easily be used as an opportunistic model to collaboratively identify the transponder's precise location.

Example Process Flow for PED Locator Operation

Figure 5A:
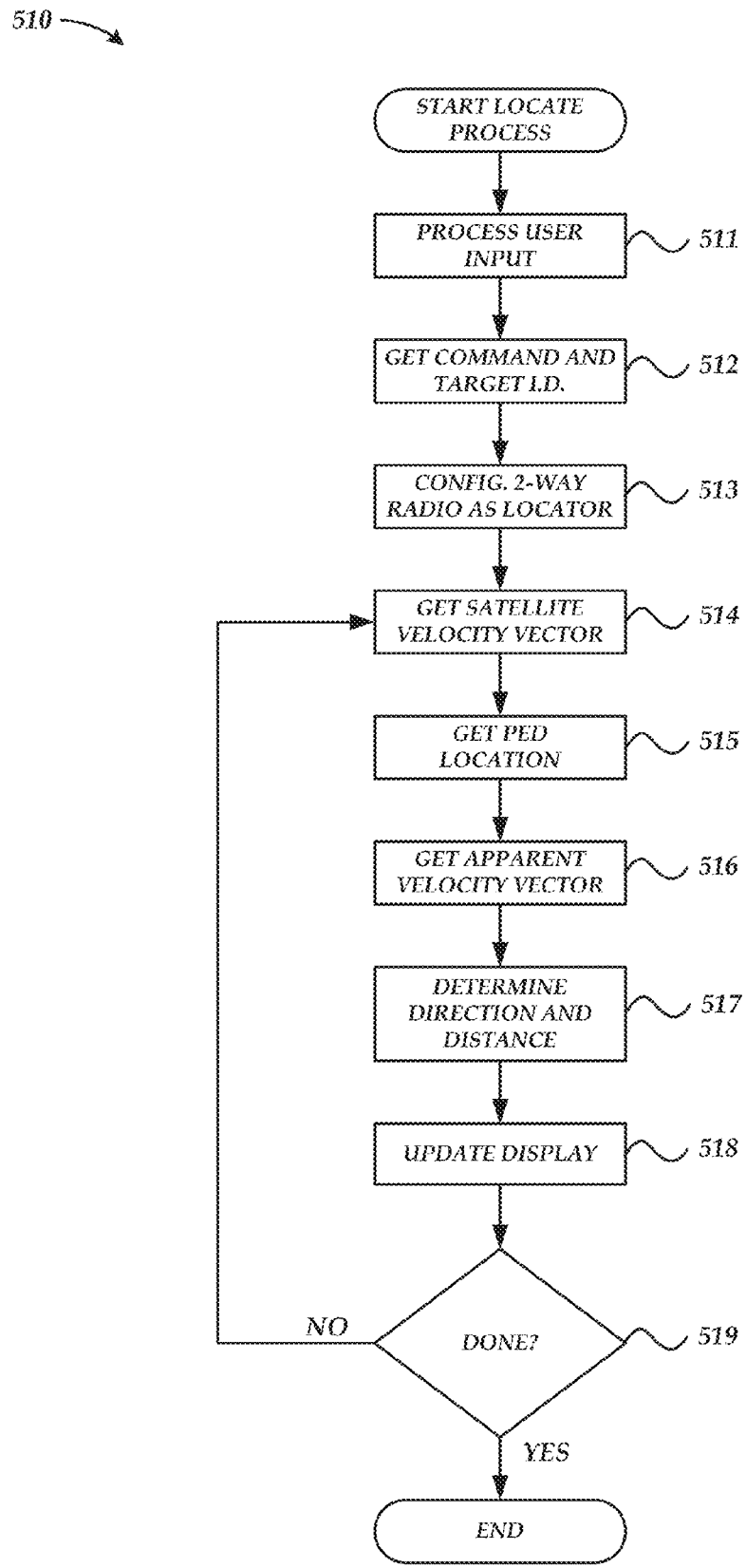
FIGS. 5A-5B are flow charts illustrating example process flows for a locator software application that can be used in one or more personal electronic devices each arranged for operation as a locator of cooperative transponder tags.
Figure 5B:
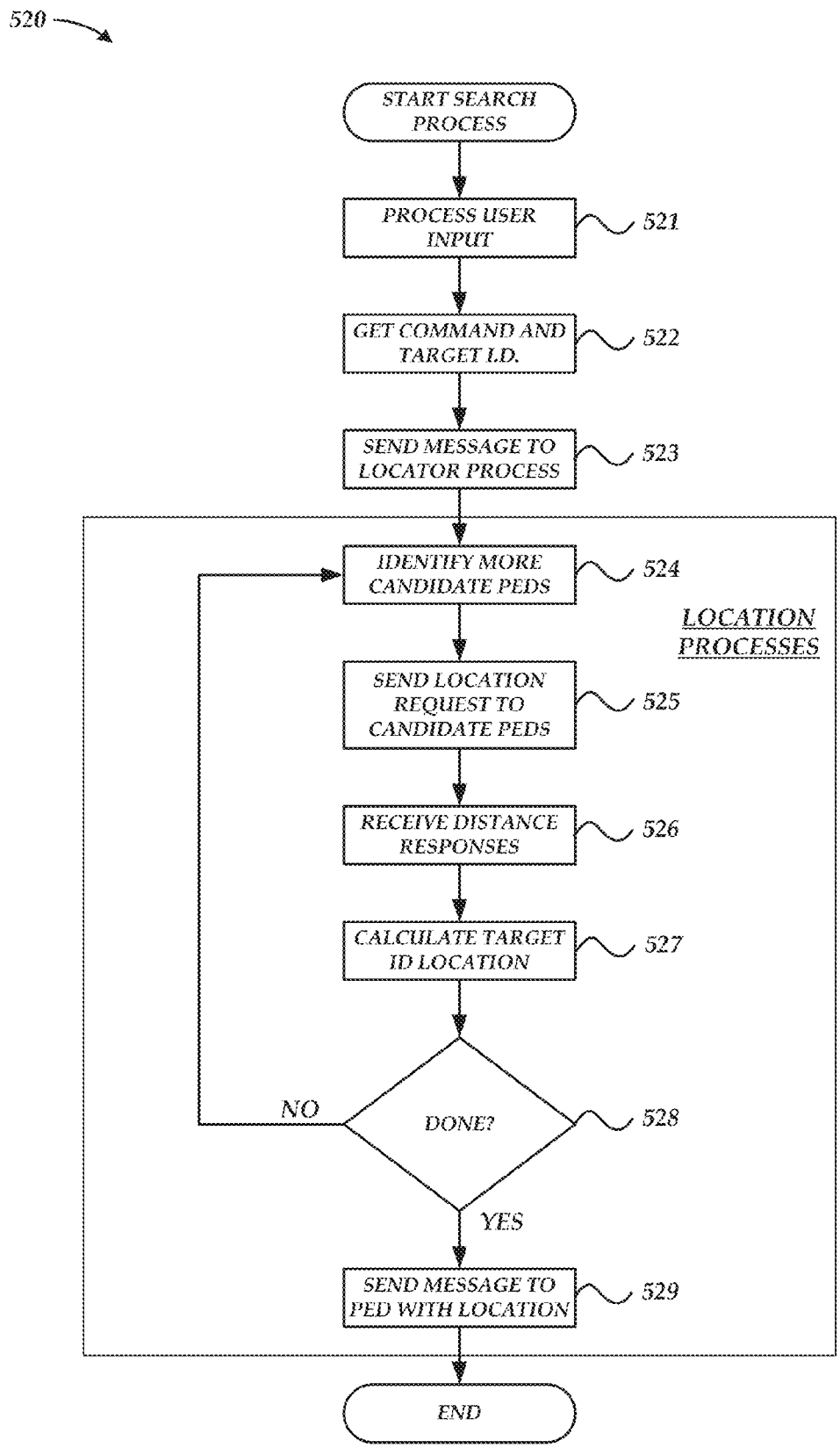

FIGS. 5A-5B are flow charts illustrating example process flows (500) for a locator software application that can be used in one or more personal electronic devices (PEDs) arranged in accordance with the present disclosure.

As illustrated by FIG. 5A, a first process (510) can be used by each PED to collect information based on its own collection of distance measurement information. First user inputs are processed (511) such as from a user interface, a micro-phone, etc. The command and target ID are then extracted (512) from the user input such as via a speech recognition system. Then, the 2-way radio system is configured to a locator operation (513). Velocities are then retrieved from the satellite navigation system (514), as well as the current location associated with the PED (515). Apparent velocities are then identified with the locator system (515), and the direction and distance from the locator to the transponder are determined using the described correlation operations (516). The display of the PED is then updated (517) to indicate a direction, distance, and/or exact location associated with the target ID. This process (514-518) repeats from decision block 519 until the locator mode is disabled, such as via another user initiated input (518).

As illustrated by FIG. 5B, a second process (520) can be used by a PED to collect information based on a collection of distance measurements from multiple PEDs using a search process. First user inputs are processed (521) such as from a user interface, a micro-phone, etc. The command and target ID are again extracted (522) from the user input such as via a speech recognition system. Then, a message is transmitted (e.g., an SMS message, email request, etc.) from the requesting PED to the locator process (523) such as might be managed by a server from a cellular telephone company. The location process includes processing steps 524-529.

At step 524, candidate PEDs are identified for requesting a transponder search via distance measurements. Each candidate PED is then sent a location request (525) to search for the identified transponder (e.g., via a TARGET ID). Each PED that receives the location request will search for the targeted transponder, identify its own location such as via a satellite navigation system, calculate a distance measurement using the described time-of-flight measurements, and report the location and distance measurement back to either the requesting server or the requesting PED. At block 526, the distance and location measurements are received by the location processes. At block 527, the target transponder's location is determined such as previously described with reference to FIG. 4E. This process (524-527) repeats from decision block 528 until the distance measurement and exact location of the transponder is determined. Proceeding to block 529, the calculated location of the targeted transponder is sent as a message back to the requesting PED.

Example Detailed System for PED/MT

Figure 6A:
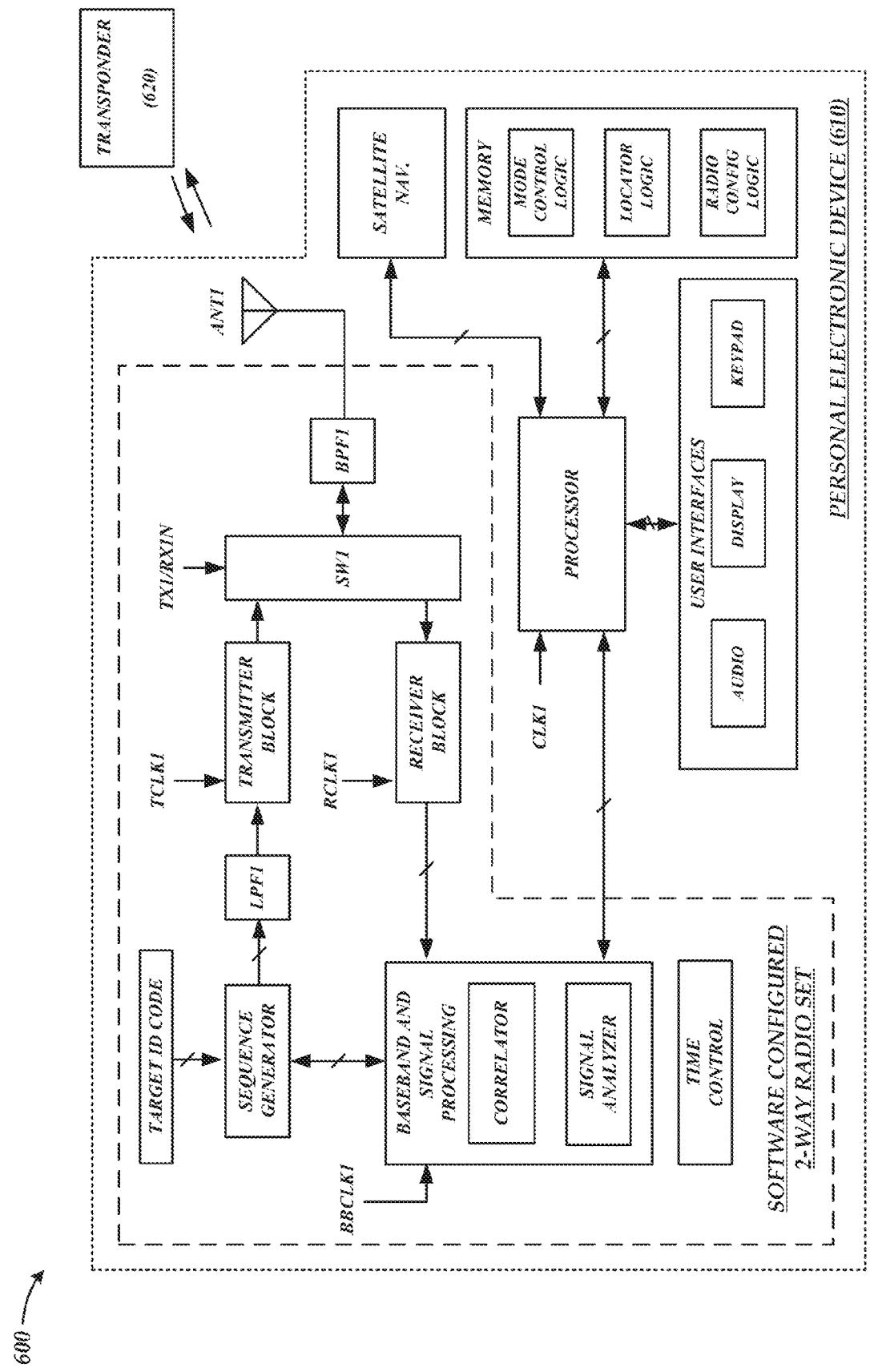
FIGS. 6A and 6B are detailed block diagrams illustrating an example personal electronic device arranged for operation as a locator with an example cooperative transponder tag.

FIGS. 6A and 16 illustrate an example communication system (600) that includes a PED based locator (610) and a MT (620) arranged in according with at least one aspect of the present disclosure. The PED (610) is arranged to transmit a sequence over a communication channel, while the MT (620) is arranged to transmit back to the PED (610) over the communication channel in a half-duplex fashion.

The example PED (610) includes a processor, an antenna (ANT1), a software configured two-way radio set, memory, a satellite navigation system, and a series of user interfaces. The memory includes, among other things, a mode control logic, locator logic, and a radio configuration logic. The processor is arranged to configure the software configured two-way radio set under control of various software applications such as those illustrated in the memory.

When the personal electronic device is changed into a locator mode, the processor is arranged to cooperate with the radio configuration logic to configure the two-way radio set. For example, a number of functional blocks for the two-way radio set can be configured to include: a base-band signal processing block, a sequence generator block, a low-pass filter block, a transmitter block, a receiver block, a transmit/receive switch block, and a band-pass filter block. The transmitter and receiver block is illustrated as coupling to the antenna (ANT1) through a transmit/receive switch (SW1) based on the operating mode being either transmit (e.g., TX1 asserted) or receive (e.g. RX1N asserted). A transmission sequence (e.g., TSEQ) is coupled to the first transmitter block when transmission commences, where the sequence is determined by an ID code associated with the target tag (e.g., ID CODE=f(TARGET ID)). The receiver block is coupled to the baseband and signal processing block. Timing parameters for the transmitter, receiver, baseband processing, and the processor are provided by a time control block, which is illustrated as various clock signals (CLK1, BBCLK1, TCLK1, and RCLK1).

The processor receives inputs from any variety of user input devices such as an audio input stream from a microphone such as previously described, a keypad type device, a touchscreen or touchpad type device, or any other reasonable input device. The processor is also arranged to provide output to any variety of output mechanisms such as an audio output (e.g., speaker) or a display output (e.g., LCD display).

The processor is arranged to coordinate the operations of managing operating modes for the PED (610), managing memory access, execution of software application programs, performing computations, managing user interfaces, and interfacing with the satellite navigation system for location based calculations. The processor also coordinating the operations for the software configured radio set such as baseband processing, signal analysis, memory buffering, input processing. The memory processing can include random access memory (RAM), read-only memory (ROM), as well as non-volatile memory (NVM) such as Flash memory, battery backed up RAM, EEPROM, as well as other NVM type technologies.

Additional antennas (e.g., ANT1B) can also be coupled to the receiver block of the PED device such as through an additional switch (not shown). For this example, the PED can multiplex between the various antennas. The various antennas can be arranged (e.g., orthogonal to one another) as diversity antennas that are used to gain additional information about signal strength, distance and Doppler, etc.

The example MT (620) device includes a second antenna (ANT2) that is coupled to a second transmit/receive switch (SW2). The second transmit/receive switch (SW2) is coupled to a second transmitter block and a fourth receiver block in response to another control signal (TX2/RX2N). A reply sequence (e.g., RSEQ) is coupled to the second transmitter block when transmission commences, where the sequence is determined by the ID code. The second receiver block is arranged to provide in-phase and quadrature signals (I and Q) that are captured in a buffer (e.g., a memory buffer such as a digital buffer or an analog sample buffer). The capture buffer is coupled to a correlator in a baseband signal processor block, which can provide both direct form correlation and FFT correlation functions. The FFT correlator is arranged to provide a circular correlation function of the received I/Q data with the complex I/Q data related to the ID code. A signal analyzer and a processor are both arranged to receive the data output from the correlator for evaluation. Time control is provided to the transmitter, receiver, and the processor in the form of various additional control signals (TCLK2, RCLK2 and CLK2). The processor receives inputs and coordinates the operation of the correlator, signal analysis, sequence generation, memory buffering, and other related tasks. The memory for the processor can include random access memory (RAM), read-only memory (ROM), as well as non-volatile memory (NVM) such as Flash memory, battery backed up RAM, EEPROM, as well as other NVM type technologies.

Current technology systems for locating people and things have a rather short battery life, which can limit their use. The present disclosure describes a small device (e.g., a transponder or a micro-transponder) that has a long battery life by suspending energy consumption until operation is required. Since the MT device needs to be in an active state for very brief intervals, the battery life is extended substantially. Although cellular telephone technologies can be used to determine position in conjunction with a global positioning system (GPS) set, such as a system is inappropriate for the MT since the energy required to operate conventional cellular telephones even in a standby mode will rapidly deplete small batteries. In addition, a GPS set in an MT device would awaken from sleep, and perform a cold start location fix, which process will consume a considerable amount of energy that again rapidly depletes the battery. The present disclosure contemplates that a portable location technology for the MT is preferably operated intermittently to minimize power consumption, and thus addresses some of the problems from conventional location determination techniques.

The present disclosure has analyzed and identified problems with current Doppler shift technology such as found in GPS signals, which render then unusable for the MT in the present system. Although GPS signals may be detected efficiently by means of FFT correlation, there are approximately 28 GPS satellites that include a significant level of Doppler ambiguity from about ±15 ppm. For a GPS signal of 1.5 GHz and a capture interval of 1 msec, a Doppler shift of roughly 22 KHz maximum requires on the order of several tens of Doppler bins or correlation attempts to identify the Doppler shift. The processing efforts necessary to utilize a conventional GPS technology are unacceptable for the presently disclosed use. For example, the MT in the current disclosure is searching for a single code, and in addition, need not contend with huge velocities, and thus does not require any Doppler bins. Moreover, the present disclosure describes an apparatus and system that has reduced capture times relative to conventional technologies, where the magnitude of the processing is reduced by approximately two orders of magnitude.

Communication and Locating Issues

Frequency and phase information in the MT is initially recovered from one portion of the transmission from the PED, and further refined using a bootstrapping process. Timing location within the frame (e.g., coarse timing) is recovered in another portion of the transmission from the PED. After the timing, phase and frequency are recovered, data reception can be scheduled with a degree of certainty. The data is extracted and a reply message is transmitted from the MT back to the PED, where similar signal processing functions are performed by the reconfigured radio set in the PED. The carefully corrected round-trip time of the transmission sequence is used to identify distance between the PED and the MT. A synthetic round-trip Doppler shift, which is independent of the MT's internal clock, can be measured to and correlated against the relative motion of the PED and MT to assess the magnitude of a directional vector between the PED and the MT.

The presently described system has the ability to identify location of a MT with a PED configured locator utilizing an asymmetric transmission system. The signals captured by the MT will typically not be aligned in time with the start and end of a complete pattern in the sequence (e.g., a 2047 chip sequence). However, the PED configured locator is arranged to transmit repeated patterns over time in the sequence. The MT is arranged to cyclically capture a complete pattern in the sequence, even though the captured pattern may be rotated in time relative to the start and end of a complete pattern. A circular correlator can be used to evaluate the captured signals such that the captured signals are properly identified by the MT, despite the rotation status of the pattern. Since the MT does not have a priori knowledge of the timing related to transmission and reception from the PED, circular correlations of the received transmissions are used by the MT to determine the fine and coarse timing. A circular correlation is a correlator that operates on a sequence of fixed length, where the sequence may be circularly shifted in time such that the beginning of the original sequence may be received in the shifted sequence after the end of the original sequence. While a general correlator may not give valid timing information, the circular correlation will provide valid timing information when the captured signals are not aligned in time with the start and end of a complete pattern.

The presently described asymmetric transmission system can be configured such that the MT receives a relatively high power transmission of a structured signal from the PED, while the reply or acknowledgement transmission from the MT to the PED is a very low power transmission. An example MT is configured to operate in a very low power "inactive" mode or "sleep mode", where the MT "activates" or "wake-ups" for brief intervals to listen for the transmission from the PED. The MT correlates each piece of its received structured signals to determine if these signals are coded with an identification code (ID Code) that is specifically associated with the MT. The MT also determines the precise frequency, timing, phase, and cadence for which a reply transmission can be transmitted back to the PED from the received structured signals. The reply transmission that is transmitted from the MT to the PED is a very low power transmission of short duration (a short structured signal) such that significant battery life is conserved. Although the reply transmission is a very low power transmission, the signal processing functions in the PED can be configured to utilize an integration and circular correlation technique to increase the signal-to-noise level of the captured reply transmission.

In the presently described system, a reply transmission signal is transmitted back to the PED from an MT, where the MT synthesizes timing, frequency, phase, and cadence for the reply transmission from signals that are received by the MT from the PED. The frequency of the reply transmission from the MT differs from the original frequency from the PED's transmission by a Doppler shift (ignoring other noise and minor error sources). As such, the PED can predict the reply transmission frequency with a very small margin of error. The potential uncertainty of the reply transmission frequency is small enough so that the phase rotation over several tens of transmission sequences is much less than one turn (one phase rotation through 360 degrees). This allows the PED to sample the reply transmission and add (or integrate), either in the analog domain or the digital domain, the respective samples from reply transmission sequence. Since noise sums as a square root and signal sums linearly, the signal-to-noise ratio for the captured signal is increased, allowing reception of a much lower level signal than would otherwise be the case without the use of exhaustive computation.

Example PED Based Locator

FIG. 6A illustrates an example PED based locator that is arranged to communicate with an example MT. The MT is arranged (e.g., by a sleep timer) to wake up at pre-determined intervals and receive a coded transmission signal (e.g., COM13). The coded signals are received and evaluated using a variety of signal processing methods such as digital signal processing, analog signal processing, Fast Fourier Transform (FFT), correlation, inverse FFT (IFFT) to name a few. The MT evaluates the received coded signals to determine if the signals are specifically identified with the MT (e.g., by a unique ID code). Through the various signal-processing functions, various internal signals and parameters are varied such that time, frequency and phase alignments for receiving and transmitting coded information are successively refined (e.g., through digital control mechanisms) for accurate processing. The MT, using as its time base the Doppler shifted frequency of the signal from the PED locator, subsequently transmits a reply sequence back to the PED locator, which is similarly coded. The PED based locator receives the coded transmission, and processes the incoming signals in a similar fashion as the MT.

The PED based locator includes a processor that can be any appropriate processing means including but not limited to at least one: micro-processor, micro-controller, CISC processor, RISC processor, application specific integrated circuit (ASIC), to name a few. The processor is arranged to: receive and evaluate inputs, control outputs, log data, retrieve logged data, and execute programs. The processor is thus arranged to communicate with any number of circuit components such as: a time control circuit, an input circuit, a display output circuit, an audio output or input circuit, a storage circuit, and a memory circuit.

Example inputs can be from any number of input devices (or user input means) such as: an interrupt signal, a wake-up timer, a keyboard device, a keypad device, one or more buttons or keys, a touch-screen (passive or active), a touch-panel, a joystick device, a joy-pad device, a mouse device, a pointing device, a touch-pad device, a pressure sensitive input device, or another processor and an input generated by a software program. In some examples, sound can be used as an input to the PED via audio input processor such as an analog-to-digital converter (ADC) circuit or a coder-decoder (CODEC) circuit that includes analog-to-digital conversion means. A microphone can be built into the PED or externally coupled to the PED through a microphone port for sound input purposes, where signals received by the microphone into a digital signal that can be interpreted as an input. The sound-based input can be stored for further use (e.g., a sound file for playback or recognition purposes) or interpreted as a voice input that can be utilized by the PED. In some implementations, a voice-to-text interpreter can be incorporated into a hardware solution that is arranged in communication with the processor. In some other examples, voice recognition under software control implemented by the audio input processor to operate as a voice input means that generates an example input.

Audio output circuits can be used as an indication means for reporting audible information to a user of the PED device, as well as to provide navigation and location information. The audio output circuit can include an audio output device and an audio output processor. The audio output processor is arranged to cooperate with the audio output device to provide an audible notification to the user. The functions of the audio output device and the audio output processor can be combined in some implementations. The audio output device can be an audio driver circuit for a headphone type device or a speaker type device. In some examples, a speaker or a piezo device is included in the PED to provide sound output. In another example, an audio output port such as a headphone jack can be provided in the PED for a user to connect a headphone type device, or perhaps an external speaker connection.

The audio output processor can be a single tone generator circuit, a polyphonic tone generator circuit, a polyphonic synthesizer circuit, a voice synthesizer circuit, a MIDI playback circuit, or a sound playback circuit. In some examples, the audio output processor includes digital-to-analog conversion means such as from a digital-to-analog converter (DAC) circuit or from a CODEC circuit. The voice synthesizer circuit can include a text to speech interpreter. The voice synthesizer can also be arranged to provide various regional voice affectations and language accents, such as male and female voices, robotic voices, English accents, French accents, Spanish accents, etc. In some examples, the audio output processor is arrange to provide music playback that can be in any desired format such as a lossy compressed sound file, a non-lossy compressed sound file, or an uncompressed sound file. In other examples, the audio output processor device is arranged to provide playback of previously recorded sounds or user recorded sounds. The recorded sounds can be voice messages such as can be provided in character voices (e.g., cartoon characters), recordings of celebrities, or as impressions of recognizable voices. In some examples, the audio output processor can be combined in function with the audio input processor previously described.

Display circuits can also be used as an indication means for reporting visual information to a user of the PED device, as well as to provide navigation and location information. Example display circuits can provide any appropriate video output such as, for example: an LED type display, an LCD type display, an active display, a passive display, a black and white display, a monochromatic display, and/or a color display. Other examples display circuits can be discrete arrangement of LEDS, seven segment displays, as well as other light emitting devices that can be used for reporting visual information. In some examples, the user interface can be integrated with the video output device such as, for example, a touch screen that is integrated with an LCD display. In other examples, the user input interface is separate from the video output device.

The processor in the PED of the present disclosure can be arranged to cooperate with a compass sensor device (not shown) or some similar means for determining a rotational position of the PED. The compass sensor can be an integrated circuit, a discrete circuit, or some other device that is arranged to provide compass sensor information that is related to a directional orientation of the PED. The compass sensor can be a digital compass device or an analog compass device that is arranged to work with an analog-to-digital converter, for example, to provide a comparable function.

In some examples, distance can be reported with display circuit in an alphanumeric representation (e.g., 100, 100', 100 ft, 100 m, etc.). In other examples, distance can be reported in a graphical representation such as an icon, a line, or other graphical shapes. Similarly, direction can be reported in either an alphanumeric representation (e.g., N, S, E, W, NE, SE, NW, or SW) or in a graphical representation. Any combination of graphical and alphanumeric representations can also be made.

The processor is arranged to apply mode control logic in response to a variety of user inputs for activating and deactivating a variety of operating modes as will be described. The mode control logic and any related settings for the PED can be provided in software form or as a firmware such as a read-only memory (ROM) that is loaded into a conventional memory for execution by the processor, or by some equivalent mechanism such as a non-volatile memory (NVM), a flash memory device, and hard-coded instructions in a micro-controller, to name a few. In another example, the processor and memory can be replaced with a programmable logic device (PLD), a specially designed circuit such as an application specific integrated circuit (ASIC), as well as others devices that are arranged to provide similar functionality.

When the two-way radio set in the PED is configured for a locator mode, the PED is operated to send a transmission that consists of a series of coded signals. The code is generated by a unique identifier (e.g., an ID Code) that is associated with a specific MT. A sequence generator is arranged to evaluate the unique identifier and create a transmit sequence. After the coded sequence is generated for the unique identifier, additional information is encoded into the transmit sequence. In one example, the additional information can be command/control instructions for the MT. Only one sequence need be transmitted to accomplish communication, timing synchronization, and sequence validation. The output of the sequence generator (e.g., TSEQ) can be filtered such as by a low pass filter (LPF1) prior to coupling the signal to the transmitter block.

The transmitter block is arranged to carrier modulate (e.g., multi-phase shift keying, binary phase shift keying, quadrature phase shift keying, differential phase shift keying, continuous phase modulation, multiple amplitude and phase shift keying, etc.) the coded signals with a carrier frequency, a spread spectrum carrier, and/or a frequency hopping method.

The transmit-receive switch (SW1) is arranged to couple the carrier modulated coded signals to the antenna (ANT1) during the transmit sequence. A band-limiting filter (e.g., BPF1) can be provided between the antenna and the transmit-receive switch (SW1) such that out-of-band signals are ignored. The band-limiting filter (BPF1) can be any filter that provides reasonable band-limiting functions such as: a passive band-pass filter, an active band-pass filter, a surface acoustic wave (SAW) filter, a bulk acoustic wave (BAW) filter, a comb filter, a strip-line filter, to name a few.

The PED based locator is operated to receive a transmission from the MT that consists of another series of coded signals. The coded signal is similarly generated by the MT with a unique identifier (e.g., the ID Code) that is associated with the specific MT. The receiver block is arranged to receive carrier modulated (e.g., multi-phase shift keying, binary phase shift keying, quadrature phase shift keying, differential phase shift keying, continuous phase modulation, multiple amplitude and phase shift keying, etc.) coded signals from the antenna (ANT1) via SW1. The received signals are handled by a baseband processor that can also provide signal-processing functions. Alternatively, the baseband processor is arranged to provide captured signals to the processor, which is arranged to handle various signal-processing functions.

The described PED based locator performs distance measurement by round trip time measurement. For example, the round trip time can be determined by the difference in time between the transmission of a signal from the MT to the PED, and the subsequent reply transmission of an acknowledgement signal from the PED back to the MT, offset by any other delays.

Bearing to the MT is determined by the operation of the PED in a search and locate mode as will be described later. In general, the user initiates a search mode to acquire a communication link and an initial distance calculation, followed by user initiated movement of the PED itself. In some examples, the PED is partial rotated through an arc relative to the user where additional distance and correlator information is evaluated to determine direction. In some other examples, the PED is moved either linearly or non-linearly during distance and correlation calculations.

Various timing signals that are employed by the PED in the software configured two-way radio set are generated by a time control circuit as illustrated in FIG. 6A. The timing signals are used by the system to digitally synthesize transmitter and receiver carrier wave signals from a locally generated oscillator signal in the PED.

Example Micro-Transponder (MT)

Figure 6B:
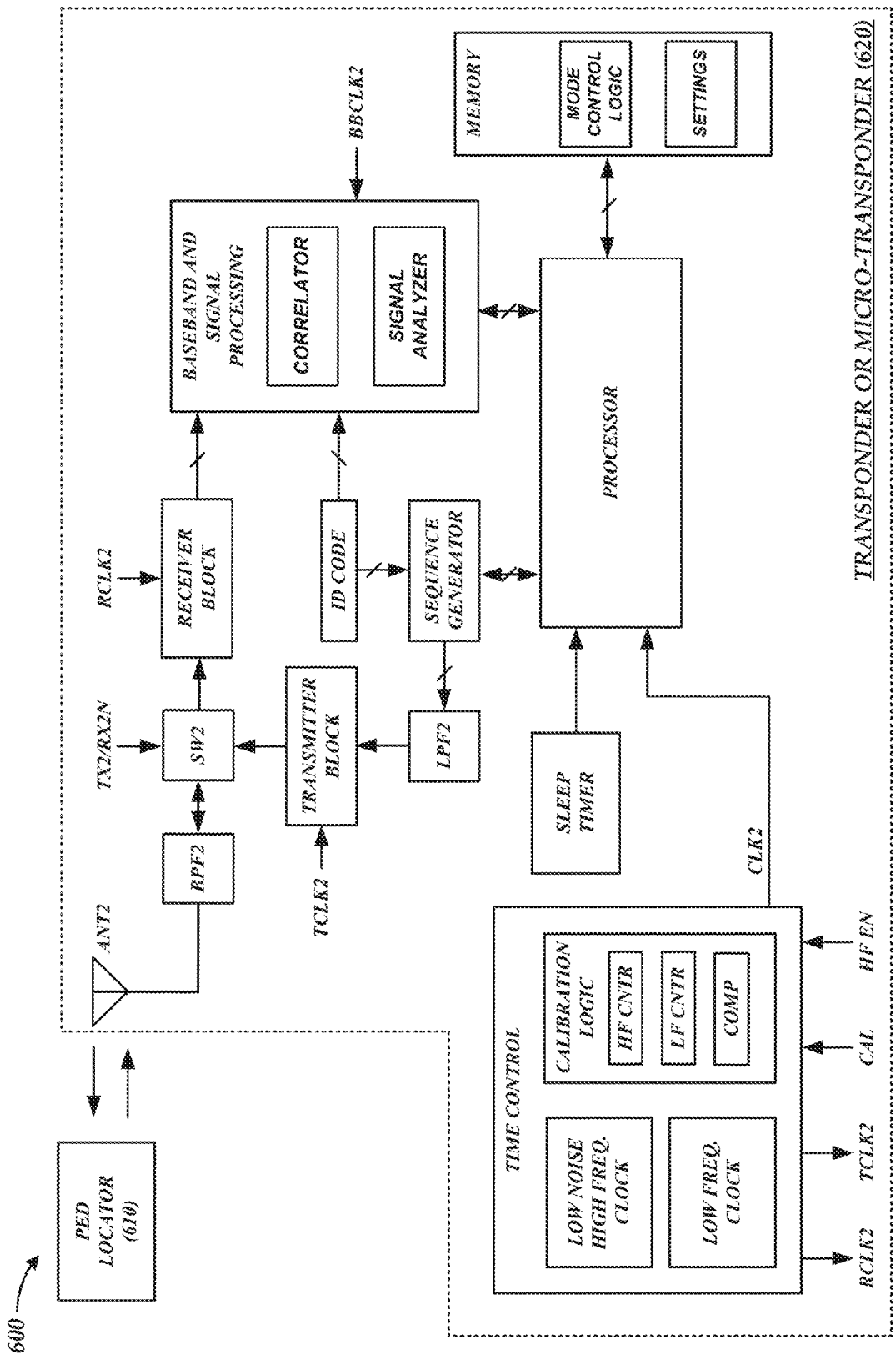

FIG. 6B illustrates an example MT (620) that is arranged to communicate with a PED based locator (610). The example MT (620) may be placed in a wristband, a collar, a watch, sewn into an article of clothing, or implanted in a patient such as a with a bionic-type device. The MT (620) is arranged to receive a coded transmission signal, such as previously described, from the PED with a receiver block via switch SW2 and antenna ANT2. Optionally, a band-limiting filter (e.g., BPF2) can be used to minimize interference from out-of-band signals in the receiver and/or to prevent interference with other devices. The receiver demodulates the carrier frequency and provides I and Q information, which is subsequently captured by a capture buffer. The capture buffer provides output signals in the form of data to an FFT correlator, which correlates the decoded transmission with the unique identifier (ID code). The processor is arranged to cooperate with memory similar to that previously described for the PED.

Various processing methods are employed to perform base-band processing and signal analysis in the MT, including a correlator block and a signal analyzer block. The correlator block may include an FFT correlator and a direct-form correlator. The signal analyzer is arranged to evaluate the outputs from the FFT correlator and/or the direct form correlator, to determine if the received transmission sequence is identified with the specific MT. When the sequence is appropriately identified, various timing signals are adjusted such that the frequency and phase of the digitally synthesized transmitter and receiver signal(s) are precisely aligned in the MT. Information from the coded signals is extracted by the processor once the transmission sequence is validated. Such information can include command and control instructions for the MT such as, for example, set sleep interval to a new time lapse (e.g., 10 minutes), log receiver signal strength, log invalid received signals, log receiver frequency and phase, transmit logged data, change to slow ping mode, change to fast ping mode, etc.

It is important to note that the processor in the MT (620) of the present disclosure is arranged to apply mode control logic in response to signals that are received from the PED based locator (610). The mode control logic an any related settings for the MT (620) can be provided in any of the above described memory devices, or as hard-coded instructions in a micro-controller, to name a few. In another example, the processor and memory can be replaced with any other appropriate processor means such as a PLD, a specially designed circuit such as an ASIC, as well as others devices that are arranged to provide similar functionality.

A reply message is transmitted from the MT to the PED based locator such that the PED based locator can identify, locate, and receive data from the MT. The reply message is generated with a reply sequence generator that is keyed from the unique identifier (ID Code), similar to the transmit sequence generator. A low pass filter (e.g., LPF2) can be placed between the sequence generator and the transmitter block in the MT. The transmitter block is coupled to antenna ANT2 via switch SW2 to cause the coded reply transmission (e.g., COM31, COM32).

Since an example MT operates with limited energy, the MT is normally operated in a low power or sleep mode. The energy consumed in the sleep mode is sufficient to operate a sleep timer that operates from a low frequency clock. According to a pre-determined time interval, the MT is activated (e.g., wakeup is asserted by the sleep timer) and the MT looks for a signal to receive while operating a high frequency clock. When no identifiable signal can be received, the MT returns to the sleep mode, where the high frequency clock is disabled. The high frequency clock can be enabled and disabled by a respective control signal (e.g., HF EN).

Various timing signals that are employed by the MT (or MT) are generated by a time control circuit as illustrated in FIG. 6B. The processor is operated from one clock signal (CLK2), while the transmitter and receiver in the MT are operated by other clock signals (TCLK2 and RCLK2). The various timing signals are used by the system to digitally synthesize transmitter and receiver carrier wave signals from a locally generated oscillator signal in the MT.

The time control circuit can include additional functionality to calibrate the high frequency clock with a calibration logic circuit. The calibration logic circuit can include any number of high frequency counters (HF CNTR), low frequency counters (LF CNTR), and digital comparator circuits (COMP), as well as other logic circuits such as registers, latches and related logic. In operation the calibration logic is enabled when a calibration signal (CAL) is asserted, such as in response to the processor when applying mode control logic.

The above described PED based locator can be arranged to provide a relatively high power transmission signal (e.g., 1 Watt) over a long time interval (e.g., 2.5 seconds) to ensure that the MT has sufficient time to capture the necessary signals when it is active. The upper limit for energy that can be captured by the MT is determined by the radiated power from the PED based locator multiplied times the capture time interval for the MT, multiplied times any loss factor due to the transmission path. An example transponder (MT) may be arranged to capture the signal from the PED for 157 µs, where the upper limit (ignoring path loss) for captured energy over the 157 µs time interval is approximately 157 µJules.

The MT can be arranged to transmit a very low power transmission signal (e.g., 10 mW) for a shorter time interval (e.g., 15.7 ms) than that for the PED (e.g., 2.5 s). The upper limit for energy that can be captured by the PED is determined by the radiated power from the MT multiplied times the capture time interval for the PED, multiplied times any loss factor due to the transmission path. For a 10 mW transmission over a 15.7 milli-second interval, the transmitted energy from the MT is approximately 157 µJules. The PED must be carefully arranged to capture signals form the MT such as by using an integration method as will be described later. It is contemplated that in one example embodiment, the MT will be implanted in a patient, and operated over at least several years using a watch-type battery.

The transponder (MT) is arranged to synthesize its own internal frequency for transmitting an acknowledgement signal by using the timing information that it acquires from the PED. The timing information that is received from the PED by the MT is Doppler shifted relative to the original transmission frequencies from the PED. The resulting synthesized frequency of the MT, while extremely accurate, corresponds to a Doppler shifted version of the original transmission frequencies form the PED. The acknowledgment signal from the MT is received by the PED, but is again Doppler shifted relative to the transmitting frequencies from the MT. The Doppler shift that result from the round trip of the signal transmissions (i.e., transmission from the PED to the MT, and reply transmission from the MT to the PED) is hereinafter referred to as the synthetic round-trip Doppler Shift.

Example Transmitter

Figure 7:
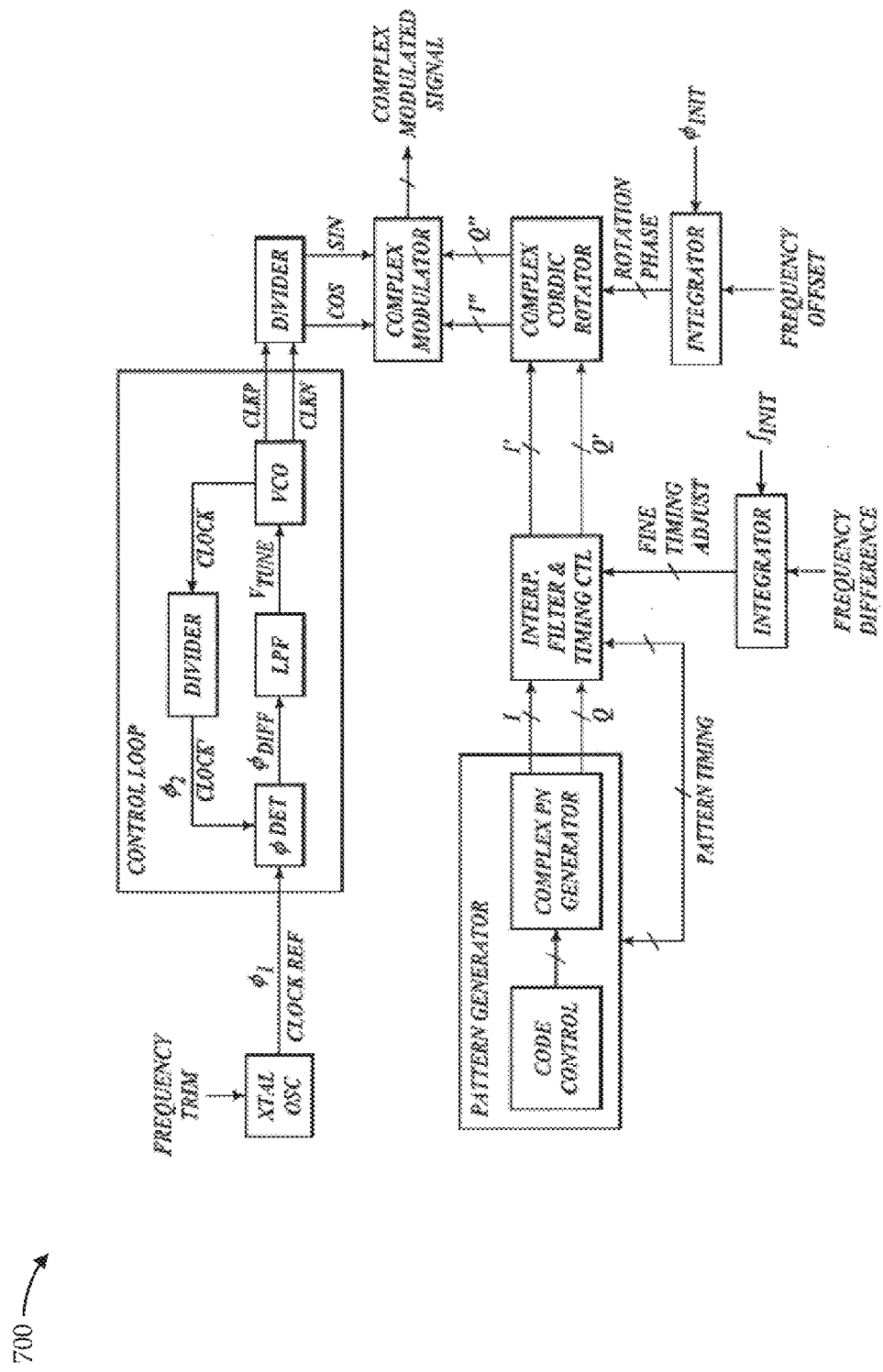
FIG. 7 illustrates an example transmitter.

FIG. 7 illustrates an example transmitter system. The transmitter system includes a crystal oscillator (XTAL OSC), a timing control circuit, a complex modulator, a pattern generator, an interpolation filter with timing control, integrators, and a complex cordic rotator.

The crystal oscillator is arranged to provide an oscillator signal as a clock signal (CLOCK) having a first phase ($\phi_1$) for the timing control circuit. In one example the crystal oscillator has a nominal frequency around 26.14 MHz, which can optionally be adjustable (e.g., via signal FREQ. TRIM). The oscillator can be a crystal-type oscillator, or any other oscillator that has a substantially stable oscillation frequency.

The timing control circuit includes a feedback control loop with an optional divider circuit that is arranged to synthesize a frequency. The control loop includes a phase detector, a low pass filter (LPF), a voltage controlled oscillator (VCO), and an optional divider circuit. The phase ($\phi_1$) of the reference clock signal (e.g., $CLOCK_{REF}$) is compared to a phase ($\phi_2$) from a feedback signal (e.g., CLOCK') by the phase detector to determine if the resulting clocks signal (CLOCK) is operating in phase with the reference clock ($CLOCK_{REF}$). The output of the phase detector corresponds to a phase difference signal ($\phi_{DIFF}$), which is provided to the low pass filter to generate a control voltage (VTUNE) for the VCO. The VCO adjusts the output frequency of clock signals CLKP and CLKN, which are out of phase with one another by 180 degrees. The feedback signal (CLOCK) is also provided from the VCO to the optional divider circuit. The output of the divider circuit is provided to the phase detector as signal CLOCK', which closes the control loop. Moreover, the VCO frequency can optionally be provided to another divider circuit, which generates synthesized frequencies that are associated with a sine and cosine function.

In one example, the VCO has a nominal output frequency of 1.83 GHz, the feedback loop divider circuit has a divide ratio of 70, and the phase detector is arranged to adjust the VTUNE signal via the low pass filter such that the average value of the 26.14 MHz signal is matched to 1.83 GHz/70. Other reference signals can be employed to yield the same result by adjusting the divider ratio in the control loop divider circuit. Moreover, the output of the VCO can be further adjusted by the output divider circuit (e.g., divide ratio of 2) to yield synthesized frequencies corresponding to SIN(915 MHz) and COS(915 MHZ) or any other desired frequency.

The pattern generator includes a code control block and a pseudo-noise generator block. The code control block is arranged to provide the pre-determined patterns, keyed from an ID Code, for "A", "B", and "C" sequenced patterns as will be described later. The pseudo-noise generator generates complex numbers (e.g., I and Q) from the codes based on the timing signals (pattern timing) for sequencing the pattern. In one example, the pseudo noise generator block is arranged to provide 2047 complex numbers. The complex sequence (I and Q) is provided to an interpolation filter and timing control block, which is arranged to adjust the fine timing associated with the I and Q signals, and provides I' and Q', which are associated with a complex interpolated baseband signal. An integrator circuit is used to integrate the difference between the transmitted and received frequencies to adjust the fine timing (fine timing adjust). The interpolator provides fine timing adjustment for the I and Q complex numbers (e.g., 8192/2047), and provides low-pass filtering for the transmitter. The integrator circuit can be initialized by an initialization parameter such as $f_{INIT}$ and/or $\phi_{INIT}$.

The interpolated complex baseband signals (I' and Q') are provided to the cordic rotator. The cordic rotator adjusts the rotational phase of the complex baseband signals (in the digital domain) in response to a phase adjustment signal (e.g., rotation phase). The phase adjustment signal is provided by another integrator that integrates the frequency offset. The integrator circuit can again be initialized by an initialization parameter such as $f_{INIT}$ and/or $\phi_{INIT}$. The output of the complex cordic rotator is a frequency shifted complex baseband signal (I" and Q"), where the frequency shifting is undertaken by the digital synthesis operations by the interpolation filter and the cordic rotator.

The complex modulator is arranged to receive the frequency shifted complex baseband signals (I" and Q"), and the sine and cosine timing signals to provide a modulated signal output. The modulated signal output can be provided to a power amplifier (not shown) that is coupled to an antenna for transmission of the modulated signal. The various timing control signals (e.g., clock frequency, clock phase, clock offset) are adjusted such that the rate, fine-timing, and phase of the modulated signal output has sufficient timing information embedded in the resulting signal.

The code control is based on a unique identifier (ID Code). In one example, the unique identifier is provided to a polynomial generator. In another example, the unique identifier is stored in a volatile memory. In yet another example, the unique identifier is stored in a non-volatile storage such as a flash memory device, a ROM, an EPROM, an EEPROM, a dip-switch, or some other means. In still another example, the pattern that was created with the ID code is stored in a memory device or a look-up table instead of the unique identifier.

Example Transmission Sequence

Figure 8:
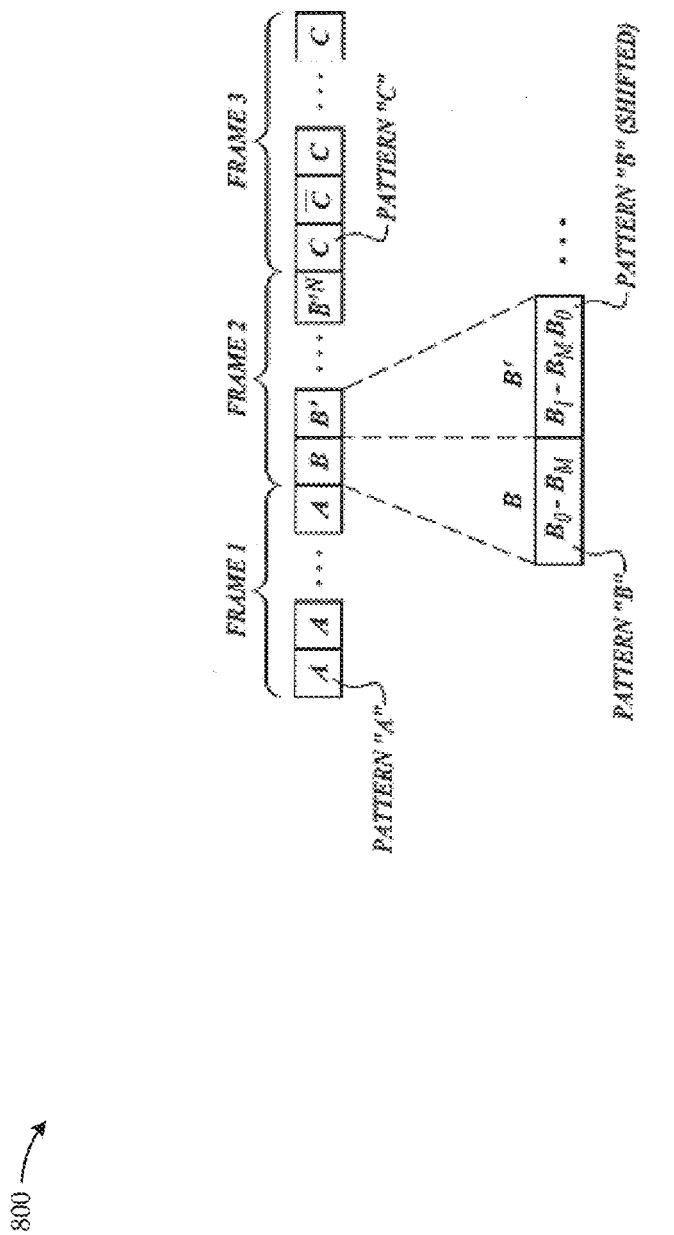
FIG. 8 is a diagram illustrating a set of frames formatted for transmission.

FIG. 8 is a diagram illustrating a set of frames formatted for transmission. A frame corresponds to a time-period for which a sequence is transmitted. For the example of FIG. 8, transmissions are broken into three sequential frames. During a first time-period, a first frame (i.e., "frame 1") is transmitted that consists of a first transmission sequence (i.e., "sequence A"). Sequence A consists of a repeated set of patterns that are in a sequential series, where each pattern (pattern A) is substantially identical. During a second time-period, a second frame (i.e., "frame 2") is transmitted that consists of a second transmission sequence (i.e., "sequence B"). Sequence B consists of a repeated set of patterns that are in a sequential series, where each subsequent pattern in the sequence is shifted as will be described later. During a third time-period, a third frame (i.e., "frame 3") is transmitted that consists of a third transmission sequence (i.e., "sequence C"). Sequence C consists of a repeated set of patterns, where each pattern (pattern "C") forms part of an encoded message as will be described later. The collection of the three sequential frames in a transmission is referred to as a PING as will be described later.

Each MT in the system has a unique identifier (e.g., an M-bit address) that is used to uniquely designate a specific MT. In one example, the unique identifier is a 33-bit address code that yields approximately 8.58 billion unique identifiers. The M-bit address can be dispersed over the various patterns. In one example, a 33 bit code is evenly dispersed over the three sequences such that 11-bits are coded in "sequence A", 11-bits are coded in "sequence B", and 11-bits are coded in "sequence C". In another example, the codes are not evenly dispersed over the transmission sequence. In still another example, the same code is used for each of the patterns. Each symbol that is transmitted is thus encoded according to the respective coding bits for the corresponding sequence portion. The terms "baud" and "chip" can also be used to refer to symbols.

The correlation of sequence "A" is used to verify that the first portion (e.g., the first 11-bits or bits 0-10) of the unique identifier is coded in the transmission. When a correlation is detected, fine baud and carrier timing can be derived. However, the MT has no prior timing information (e.g., no gross frame timing is known). Since the "A" pattern is repeated over the first-time interval, it is possible to accumulate the signals by adding them on top of one another before correlation is performed such that signal sensitivity is improved. In one example MT, the accumulation of signals is unnecessary. In another example MT, the accumulation of signals is performed during a repetitive tracking mode.

Once the "A" pattern has been acquired, the MT continues sampling to locate the "B" sequence. The correlation of sequence "B" is used to verify that the second portion (e.g., e.g., the second 11-bits or bits 11-21) of the unique identifier is coded in the transmission. As previously described, the "B" sequence is shifted over time. For example, a first B sequence includes coded bauds B0, B1, . . . , BM, while the second B sequence (B') includes coded bauds B1, B2, . . . , BM, B0. When correlation is achieved with the MT's "B" sequence, the MT identifies a stream position within the "B" sequence. Once the transmission stream position is determined from the shift pattern, the MT schedules the reception of sequence "C", whose arrival can now be predicted.

For the above described "B" sequencing example, a single baud shift is used between subsequent transmissions. Other shifting methods can be used such that the step size for shifting between subsequent transmissions can be a different integer number of baud shifts (e.g., 2, 3, 4, etc.) or a non-integer number of baud shifts (e.g., ½ baud, ¾ baud, 1½ baud, 2¼ baud, etc.), or a shift in samples of either an integer or non-integer variety. In another example, the shifting mechanisms between subsequent transmission can be replaced by a carrier phase rotation, where each subsequent transmission has the carrier phase rotated by a fixed amount.

Frame "C" has a third portion of the unique identifier encoded therein, and possible command and control data for the MT (or other data for the PED). The correlation of sequence "C" is used to verify the third portion (e.g., the third 11-bits or bits 22-33) of the unique identifier is coded in the transmission. The "C" sequence can also be very slowly modulated with a few bits of data. For example, up to 63 bits of data and error correction code (ECC) can be transferred in sequence "C". In one example, the chips or transmit symbols are encoded by inverting or not-inverting patterns of "C" in the transmission frame. Examples of coded command and control information were previously described above.

For the above described "C" sequence, data is encoded using an inverting and non-inverting encoding method. Other data encoding methods can be used such as encoding the data with a shifting bit pattern similar to the "B" sequence. For example, a "000" binary code can be encoded, and each increment in the binary code is the same pattern shifted by an incremental shift step (e.g., ½ baud step, 1 baud step, 2 baud step, etc.). The data message nominally in "C" can be encoded with a pattern timing changes as in the nominal section "B" previously described.

The MT transmits sequences A and B in substantially the same format as that described above. However, since the PED initiated the transmission and does not have a "wake-up" period creating an ambiguity in when reception begins, the transmission sequence from the MT can be shorter overall. The shortened transmission period helps minimize the MT's energy consumption. Frame "C" is similarly formatted, but may include other reported data such as: current temperature, heart rate, blood pressure, etc.

The timing and carrier signals for transmission in the MT are derived from the PED's synthesized clock as measured against the internal MT clock. The PED in turn correlates these signals, similar to the MT, and determines the exact round-trip time. The PED also determines deviations in the signal timing with respect to its own clock, which the MT attempted to mimic. The deviation in the signal timing is a consequence of Doppler shift, noise, and oscillator instability.

An example system has the following general information:
Received Frame consists of 4096 samples, 2047 baud;
Received Sample Rate is 25.777 M complex samples/sec;
Transmitted Sample Rate is 2*25.777 M complex samples/sec;
Baud Rate is determined by Sample Rate*(2047/2048)/2=12.8822 Mbaud symbols/sec, QPSK; and
Frame Period is 158.98 µs.

An example system has the following PED TX parameters:
"A" sequence is 2.2263 seconds long, (13×1024 frames), repeated un-shifted with one of 2047 first address portions;
"B" sequence is 317.96 ms long (2000 frames), repeated shifted with one of 2047 second address portions; and "C" sequence is 10.174 ms long (64 frames), repeated un-shifted with one of 2047 third address portions, frames inverted according to modulated data.

An example system has the following MT TX parameters:

"A" sequence is 81.397 ms long, (512 frames);
"B" sequence is 20.349 ms long (128 frames); and
"C" sequence is 10.174 ms long (64 frames), repeated un-shifted with one of 2047 third address portions, frames inverted according to modulated data.

Example Timing Acquisition Sequence

Figure 9A:
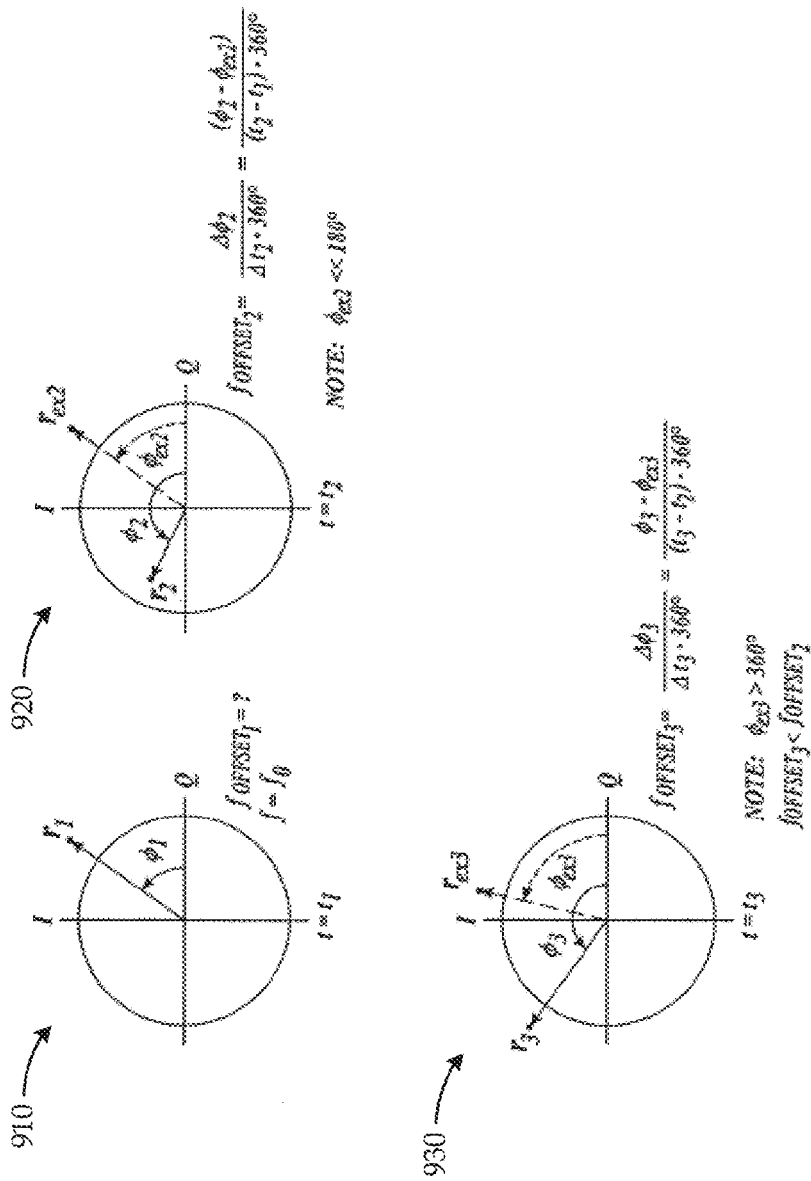
FIGS. 9A and 9B are diagrams illustrating the timing acquisition for an example communication system.
Figure 9B:
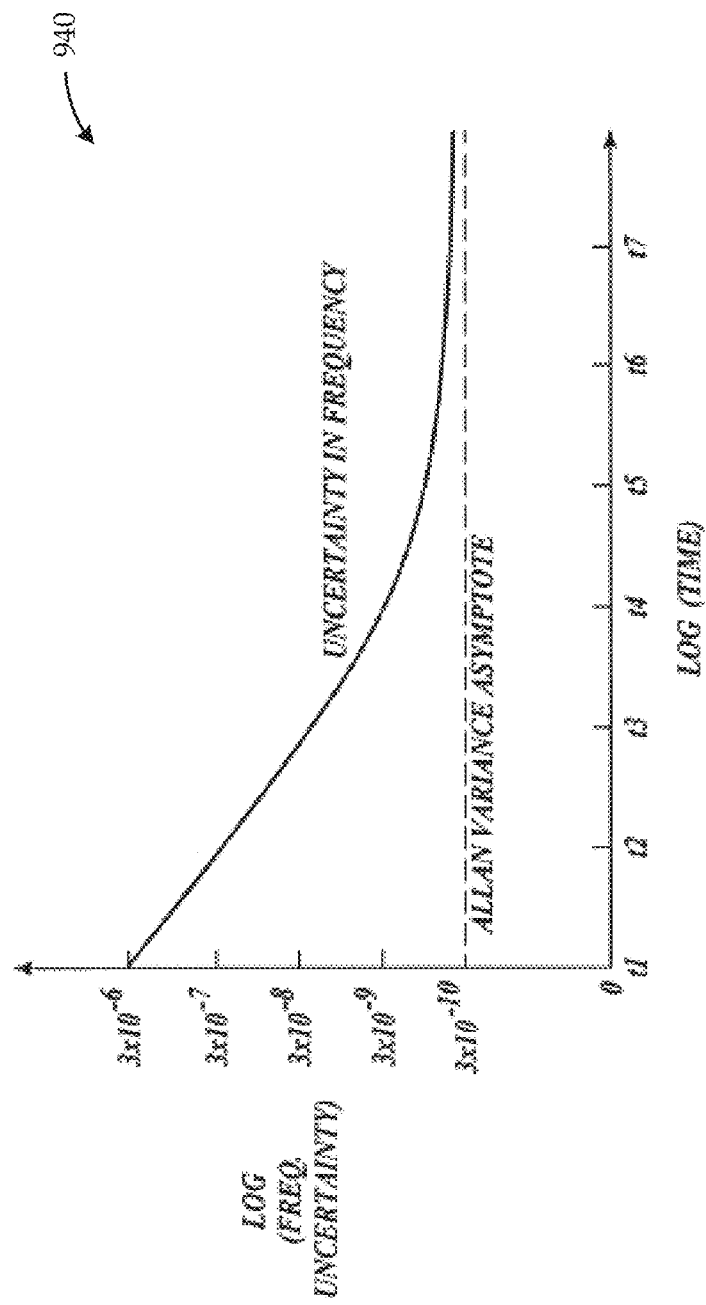

FIGS. 9A and 9B are diagrams illustrating the timing acquisition for an example communication system. The described timing acquisition sequence may be employed by the MT when receiving the three-part transmission sequence described previously with respect to FIGS. 1A, 1B, 2 and 3. However, as described herein, the timing acquisition sequence can be accomplished with only two of the three portions of the transmission sequence (e.g., sequence A and sequence B).

The receiver frequency is digitally synthesized from a locally generated clock circuit (e.g., a crystal oscillator). The carrier wave from the PED is also digitally synthesized from its own locally generated clocking circuits, and will likely be mismatched from the receiver frequency in the MT. The mismatch may be related to thermal differences in the operating environment, heat transients in the circuits, crystal tolerances, processing differences between the MT and the PED, as well as other non-ideal effects. Moreover, the overall system is not synchronized so there is no way to initially know the starting phase, frequency and cadence associated with the transmissions. FIG. 9A illustrates examples of phase and frequency determinations associated with an example "pattern A" sequence, while FIG. 9B illustrates the uncertainty in the receiver frequency over time during the timing acquisition.

The receiver portion of the communication system is initialized at time $t_1$ to an initial frequency (f) that is designated as $f=f_0$. However, the offset between the digitally synthesized receiver frequency and the carrier frequency from the received transmission is unknown at time $t=t_1$. The MT is arranged to measure the phase associated with the received signals from pattern A as phase $\phi_1$. The phase measurement (e.g., $\phi_1$) can be generated by an output of the correlator.

At time $t=t_2$, another portion of the transmission of pattern A is received, and the MT is arranged to measure the phase as $\phi_2$, and calculate a frequency offset error associated with the difference between the expected receiver frequency and the actual carrier wave from the PED's transmission. The frequency offset ($f_{offset2}$) is determined by the difference in the phases and the elapsed time between as: $f_{offset2}=[\phi_2-\phi_{ex2}]/[360(t_2-t_1)]$, where $\phi_{ex2}$ corresponds to the expected phase at time $t_2$. It is important to note that the time between the first two measurements should be short enough to result in an expected relative phase difference of substantially less than 180 degrees to ensure that unresolveable ambiguities do not occur. Notice that the expected phase for this time corresponds to $\phi_1$.

At time $t=t_3$, another portion of the transmission of pattern A is received, and the MT is arranged to measure the phase as $\phi_3$, and calculate a frequency offset error associated with the difference between the expected receiver frequency and the actual carrier wave from the PED's transmission. The frequency offset ($f_{offset3}$) is determined by the difference in the phases and the elapsed time between transmissions as: $f_{offset3}=[\phi_3-\phi_{ex3}]/[360(t_3-t_2)]$, where $\phi_{ex3}$ corresponds to the expected phase at time $t_3$. It is important to note that the elapsed time for the first two measurements should again result in an expected relative phase difference of substantially less than 180 degrees to ensure that unresolveable ambiguities do not occur. However, the absolute phase difference is expected to be significantly larger than 360 degrees such that the time difference between successive offset calculations can be gradually spaced further and further apart as the timing acquisition is adjusted by each subsequent estimate. Notice that the frequency error is gradually reduced with each subsequent adjustment until limited by the Allan Variance.

FIG. 9B is a graph illustrating the uncertainty in the digitally synthesized receiver frequency over an elapsed timing acquisition period. Note that the scale for both axes is logarithmic, and that the uncertainty will asymptotically approach the Allan Variance associated with the crystal oscillators in the MT and the PED. The horizontal axis illustrates elapsed time, while the vertical axis illustrates the uncertainty in the frequency. Each successive time period has a refined estimate of the receiver timing such that the uncertainty decreases in an exponential fashion. A knee in the uncertainty curve occurs after sufficient samples of the received signal are acquired (e.g., at time $t_5$) such that estimates for the received carrier wave frequency asymptotically approach a minimum uncertainty that is determined by the Allan variance.

Example Receiver

Figure 10A:
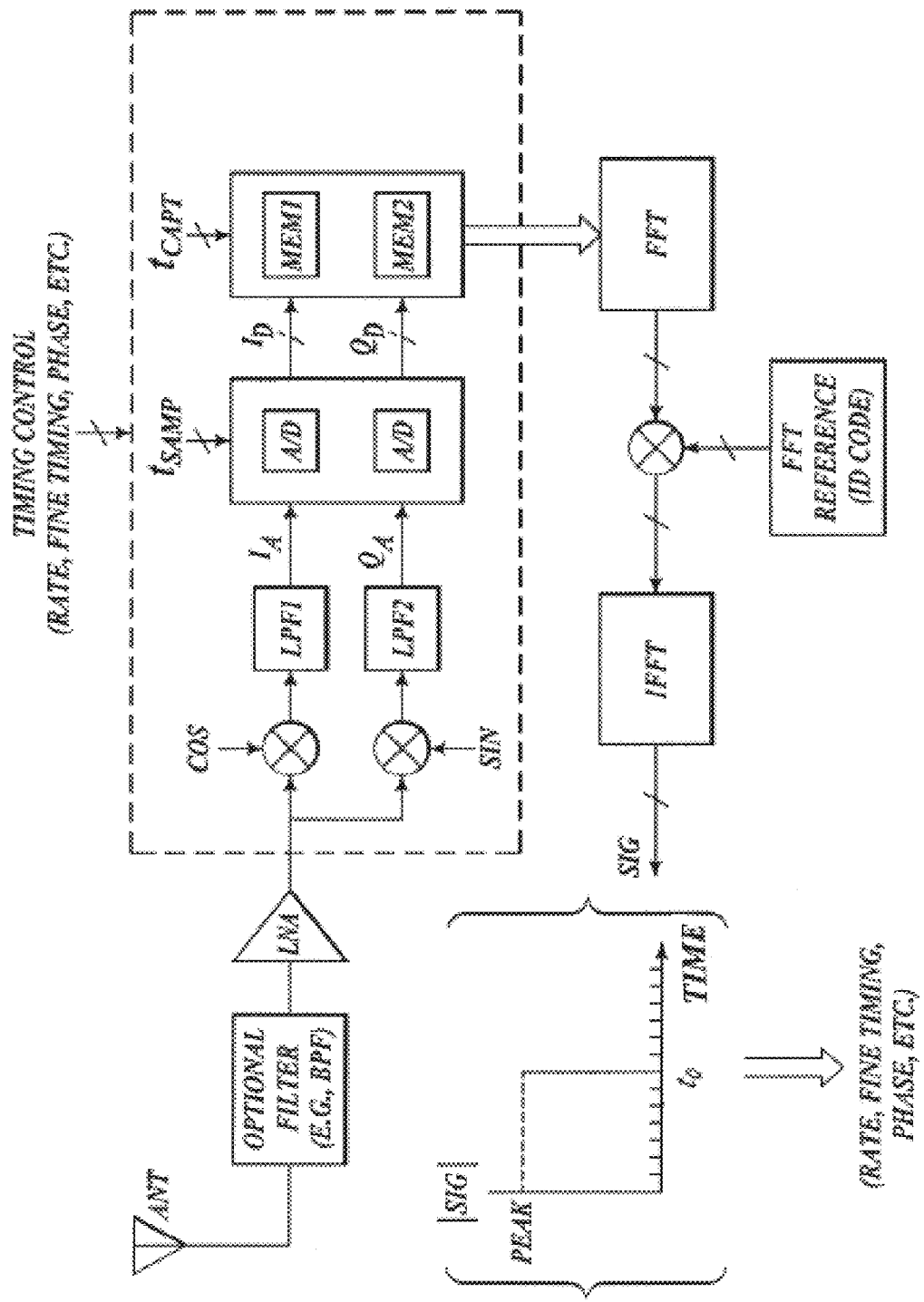
FIGS. 10A-10B are example diagrams for example receivers.

FIG. 10A is a block diagram for an example receiver. The example receiver includes an antenna (ANT), an optional filter, a low noise amplifier (LNA), a first mixer, a second mixer, a first low pass filter (LPF1), a second low pass filter (LPF2), an analog-to-digital converter (ADC), a buffer, an FFT processor, a correlator, and an inverse FFT processor. Other example receivers can use an analog storage method and perform a delayed A/D conversion.

The antenna is arranged to couple received signals to the LNA through the optional filter (e.g., a band-pass filter). The LNA is arranged to increase signal strength, and couple the increased signal to the mixers. The first mixer is arranged to generate an in-phase signal (I) with a cosine wave heterodyne, while the second mixer is arranged to generate quadrature signal (Q) with a sine wave heterodyne. The in-phase signal is coupled to the ADC via LPF1 as signal $I_A$, while the quadrature-phase signal is coupled to the ADC via LPF2 as signal $Q_A$.

The ADC is operated at a sampling frequency ($f_{SAM}$). The ADC can be implemented as a single A/D converter circuit with time division multiplexing between the $I_A$ and $Q_A$ signals. The ADC can alternatively be implemented as two separate A/D converter circuits. The ADC circuits convert the $I_A$ and $Q_A$ signals to quantized digital signals that are coupled to the buffer as signals $I_D$ and $Q_D$, respectively. The buffer can be implemented as one contiguous memory, as partitioned memory (e.g., MEM1, MEM2, etc.), or any other appropriate temporary storage that buffers the captured data.

The output of the buffer is coupled to the FFT processor, which converts the input signal to the frequency domain. The FFT of the reference signal is complex conjugate multiplied with the frequency domain representation of the captured signal. An inverse FFT of the product is taken, which is the circular correlation of the captured signal and the selected reference signal. Since the FFT reference is determined from the unique identifier of a MT (e.g., ID Code), the correlation of the FFT processor output will peak when a valid received code is identified in the signal. The carrier phase and pattern timing are also extracted from the received signals.

Figure 10B:
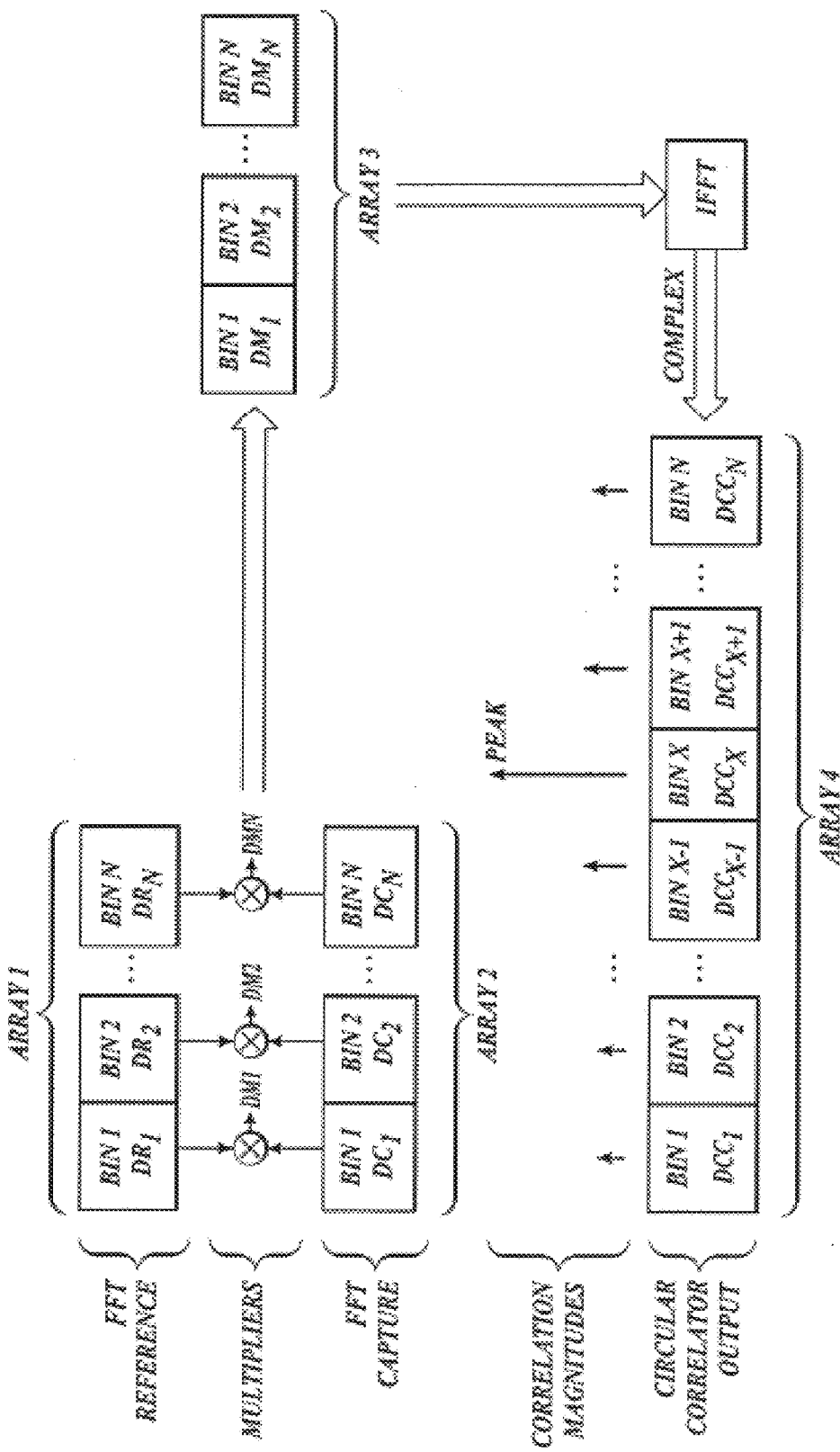

FIG. 10B illustrates operations in a receiver that may be performed as a DSP block. The FFT reference signal is provided as an array of N-bins. The captured signal is calculated as an FFT, also of N bins. Next, the complex conjugate of each complex element in a designated storage bin (BIN 1-BIN N)

is multiplied by the data from the other corresponding storage bin. For example, the complex conjugate of the FFT reference signal is stored in a first array (ARRAY 1) as $D_{R1}$-$D_{RN}$, and the FFT capture data is stored in a second array (ARRAY 2) as $D_{C1}$-$D_{CN}$. In another example, the FFT reference signal is stored in the first array (ARRAY 1) as $D_{R1}$-$D_{RN}$, and the complex conjugate of the FFT capture data is stored in the second array (ARRAY 2) as $D_{C1}$-$D_{CN}$.

The multipliers are arranged to receive data from the first array and the second array to provide a multiplied output, yielding a product result that can be stored in a third array (ARRAY 3) as $D_{M1}$-$D_{MN}$. An inverse FFT is computed from the product identified in the third array (ARRAY 3), to retrieve the circular correlator output. The circular correlator output results can be stored in a fourth array (ARRAY 4), or can optionally overwrite the values from the third array (ARRAY 3). The contents of the fourth array (ARRAY 4), or the third array depending on the implementation, are a complex result that includes both magnitudes and phases. As illustrated in FIG. 5B, the inverse FFT of the circular correlator output has a peak magnitude (PEAK) that occurs when the FFT reference ad the captured data correlate with one another. Each bin (BIN1-BIN N) of the third array (ARRAY 3), or fourth array depending on the implementation, corresponds to the output of the correlator, wherein a PEAK may be located in one of the bins (e.g., BINX), when a correlation occurs.

Example Operational Flows for Transmission and Reception

Figure 11:
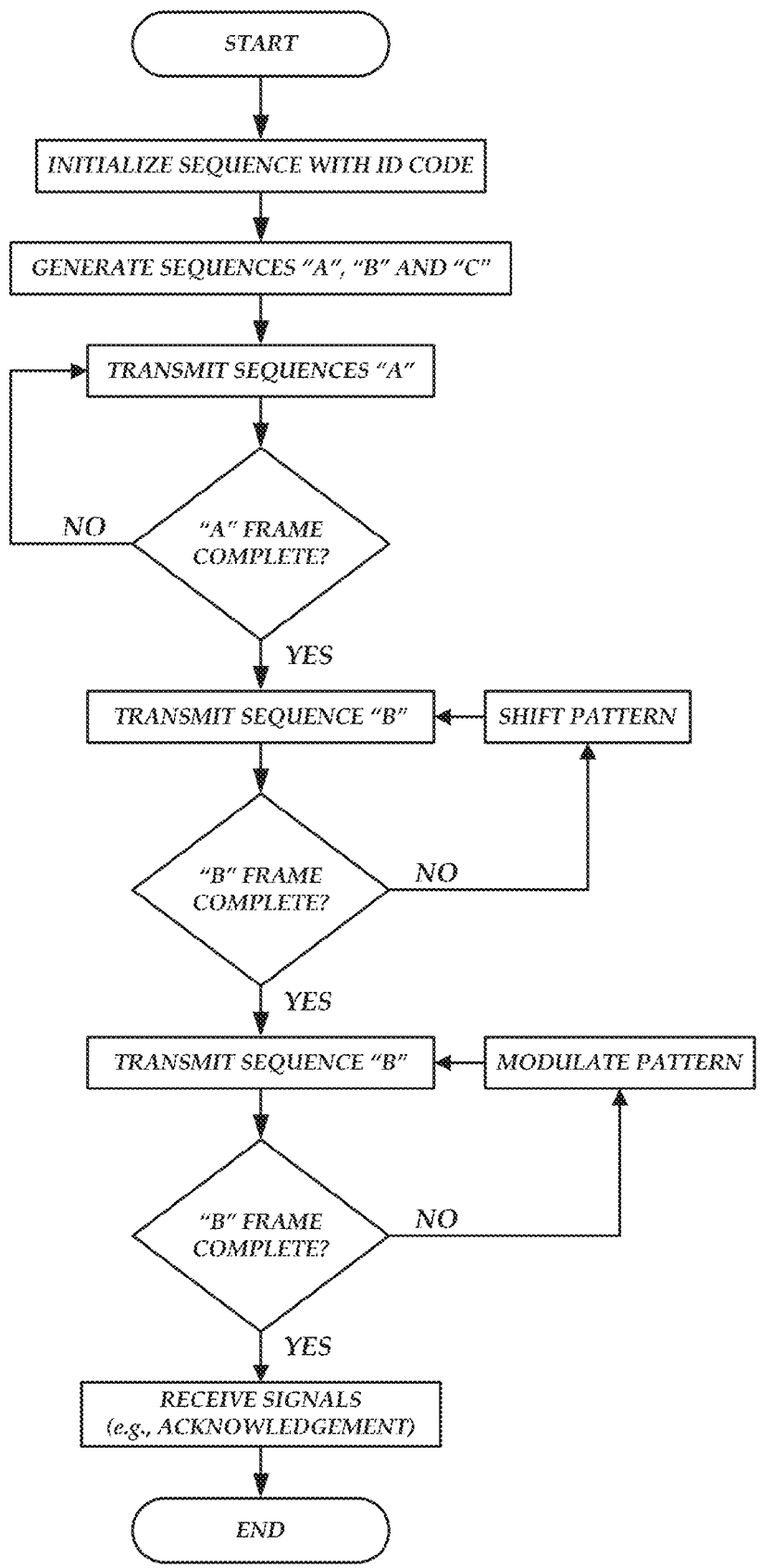
FIG. 11 is a flow-chart for an example transmitter.

FIG. 11 is a flow chart for an example transmitter configuration in either a MT or a PED based locator. Processing begins when a user, or some other process, initiates a request to locate a particular MT.

A transmission sequence is initialized with a unique identifier (ID Code). Sequences are generated for frame transmission such as sequence "A", "B", and "C" as previously described. Each of the "A", "B", and "C" sequences consists of bauds that are encoded with a portion of the unique code.

Next, the PED (or MT) then begins transmitting pattern "A", and repeats transmitting pattern "A" (Note: un-shifted) until the entire "A" sequence is completed (e.g., 13×1024 sequential patterns, or frame "A"). The PED then begins transmitting pattern "B". For each subsequent transmission of pattern "B", the pattern is shifted such as using a bit rotation algorithm, as previously described. After the entire sequence of "B" patterns is transmitted (e.g., 2000 sequential patterns, or frame "B"), the PED begins transmitting the "C" pattern. The sequence of "C" patterns includes modulated data that may correspond to command and control information for the MT. After the modulated data is transmitted (e.g., 64 sequential pattern, or frame "C"), the PED stops transmitting and switches into a receive mode.

In the receive mode, signals are received from the MT with the PED in a similar format as provided between the PED and the MT. The PED can then calculate a distance and location based on the round-trip time and Doppler shift in the received signals as previously described. Moreover, the received "C" frame transmission may include data that is communicated between the MT and the PED, which is extracted and evaluated by the PED. Such data may include: physiological information such as heart rate, body temperature, blood pressure, heart rhythm, blood-sugar level, as well as other sensory information that is associated with a user of the MT.

Figure 12A:
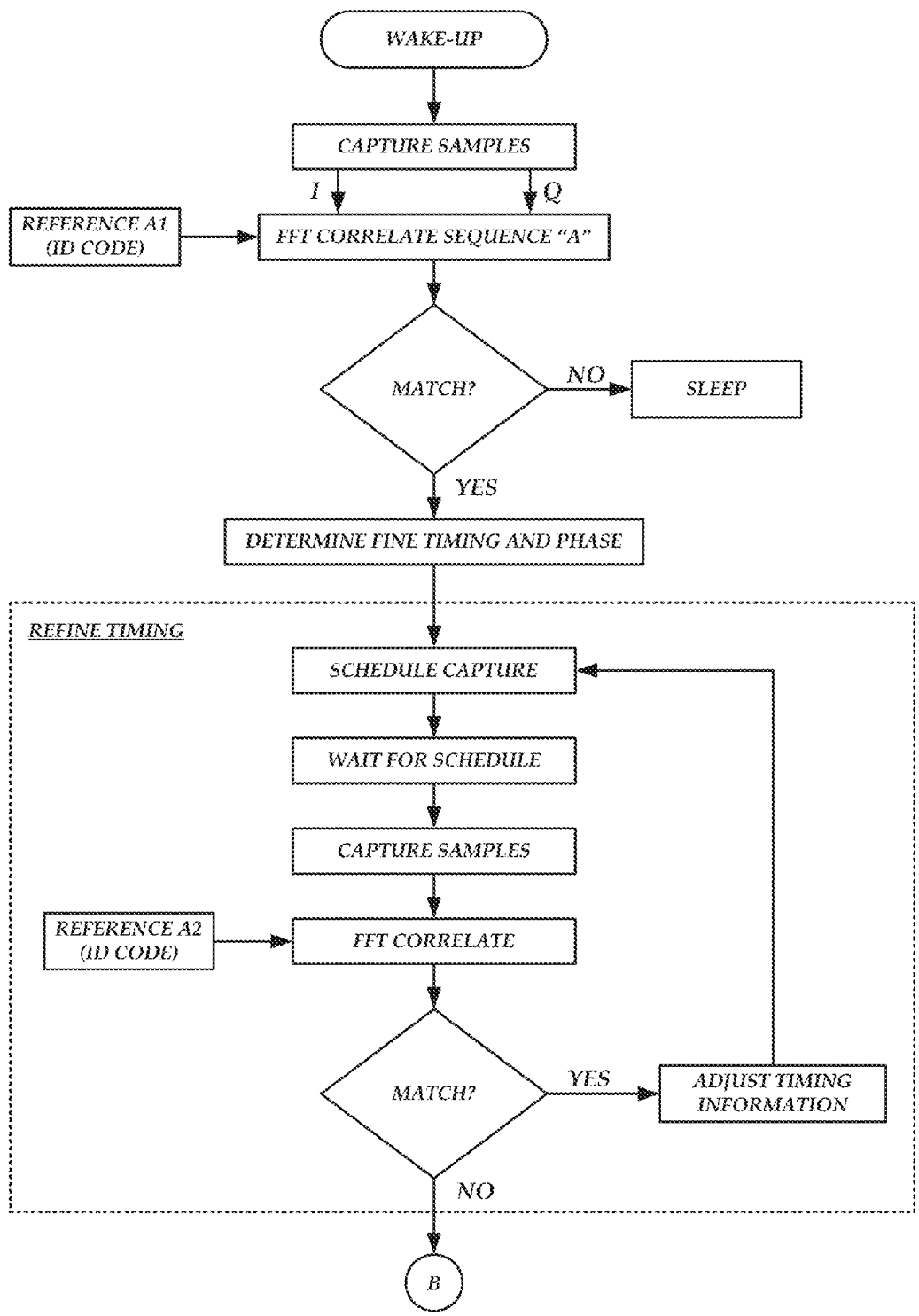
FIGS. 12A-12B, 13A-13B, and 14 are flow-charts for example receivers.
Figure 12B:
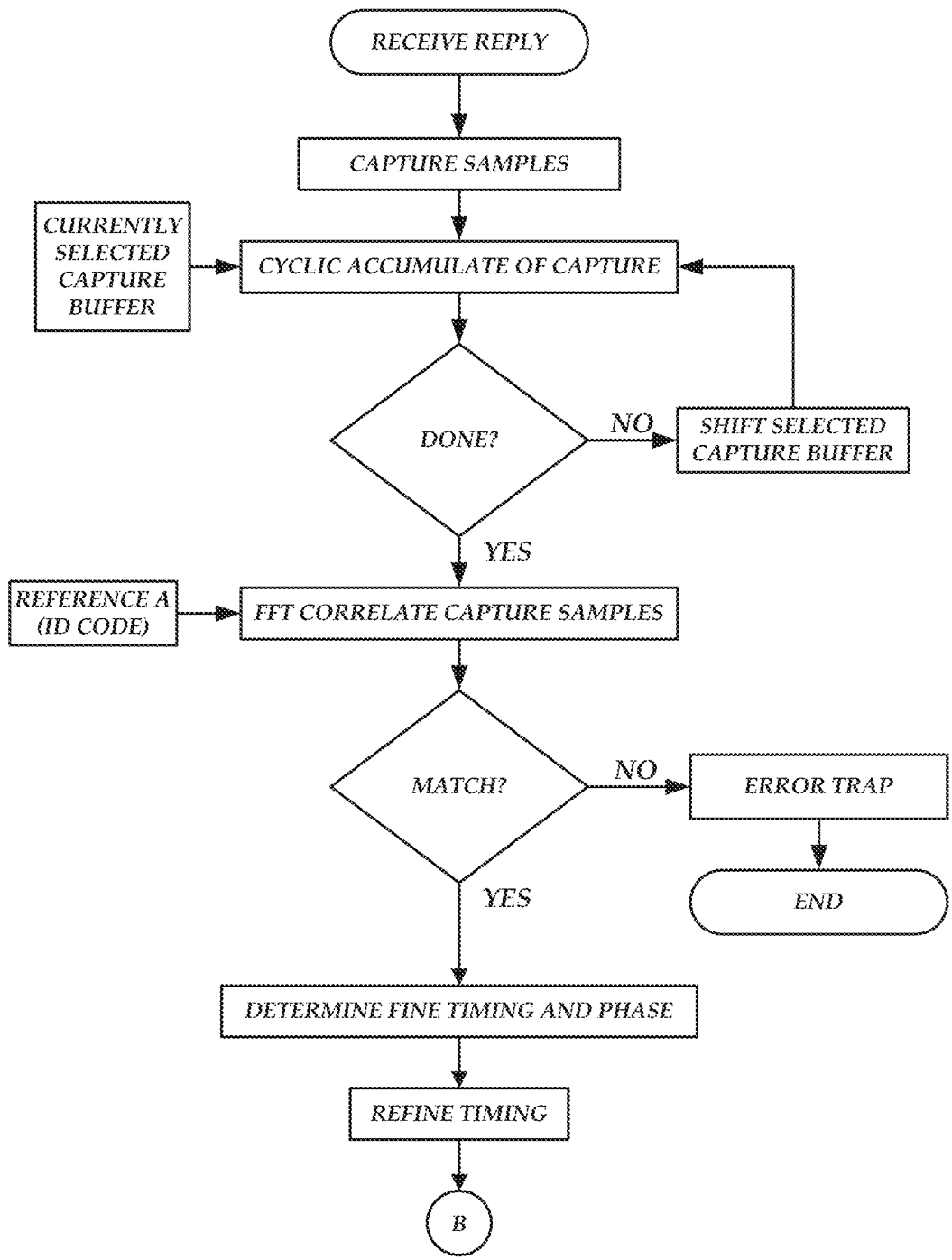

FIG. 12A is an example flow chart for an example receiver in a MT. Processing begins when the MT is activated out of a sleep mode (e.g., WAKE-UP is initiated). FIG. 12A illustrates the capture of samples associated with sequence "A" (or frame "A"). After wake-up is initiated, the receiver captures noise and/or signals. The MT will attempt to correlate the captured noise and/or signals with the first portion of the unique identifier for the specific MT. When the correlation fails to match, the MT determines that the transmission is intended for another device, or possibly that no transmission is present, and returns to a sleep mode. Alternatively, the MT extracts baud and carrier timing information from the transmission sequence to refine the receiver timings.

Timing is refined by repeatedly scheduling capture intervals. The receiver waits, and then begins capturing a portion of the samples from each scheduled capture time, and attempts to correlate the captured samples with another portion of the reference that is keyed to the code for the MT. Each time the correlation indicates a match, the timing for the receiver is adjusted (bootstrapped) to further refine the time/frequency estimates. Eventually, the correlation of pattern A fails to match the coded reference and processing continues to capture and evaluate pattern B as will be described with respect to FIG. 13A.

FIG. 7B illustrates the capture of samples associated with sequence "A" (or frame "A") in a receiver of an example PED device. Since the MT has limited power available for transmission, the signal may be considerably weaker than that from the PED. After wake-up is initiated by the PED, the receiver captures noise and/or signals. The PED will continue to capture the transmission for a predetermined time interval and accumulate values using a cyclic accumulation capture technique (e.g., an array of capture buffers that are cyclically selected in sequence). For each subsequent capture, the selected capture buffer is changed based on the time. Also, an accelerometer is used to measure the speed of the PED device for estimating time for reception, etc.

After the predetermined time interval expires; the PED attempts to FFT correlate the accumulated/captured signals and noise with the first portion of the unique identifier for the specific PED. The accumulation of the captured patterns over the sequence using the described cyclic accumulation improves the signal levels and minimizes the impact of noise on the reception. When the correlation fails to identify a match, the PED determines that the transmission is intended for another device, that no transmission is present, or that an error has occurred, and returns to a sleep mode. Alternatively, the PED fine timing and phase information from the transmission sequence is used to refine the receiver timings for the PED. Processing then continues to capture and evaluate pattern B as will be described with respect to FIG. 13B.

Figure 13A:
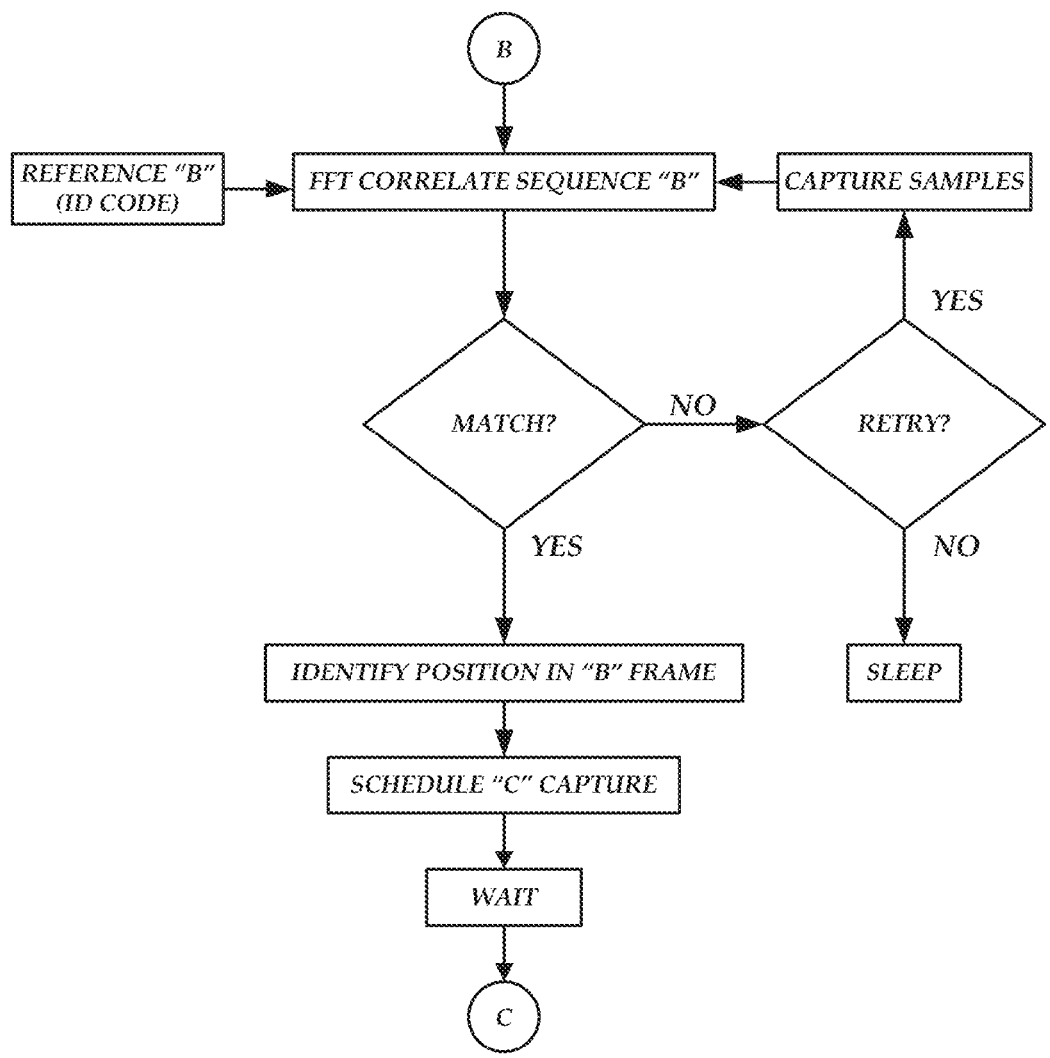

FIG. 13A illustrates the capture of samples associated with pattern "B" in a MT device. The receiver captures a sequence of samples, assuming those samples correspond to sequence "B". The MT will attempt to FFT correlate the captured samples with the second portion of the unique identifier for the specific MT. When the correlation fails to identify a match, the MT may determine that the signal sequence is intended for another device. During a processing time interval, the expected B sequence is shifted and captured, and FFT correlation determinations then follow. When the processing time interval completes without a match of sequence "B", the MT determines that the transmission is intended for another MT or that there is no transmission to receive and returns to a sleep mode. Alternatively, if the MT finds a match for sequence "B", then the MT determines the relative position of the matched pattern within the sequence (or within the frame) based on the shift position that yields a match. Since the timing, phase, and frequency information are now known, the MT schedules reception of the "C" sequence. Processing continues for the MT in FIG. 14, which follows further below.

Figure 13B:
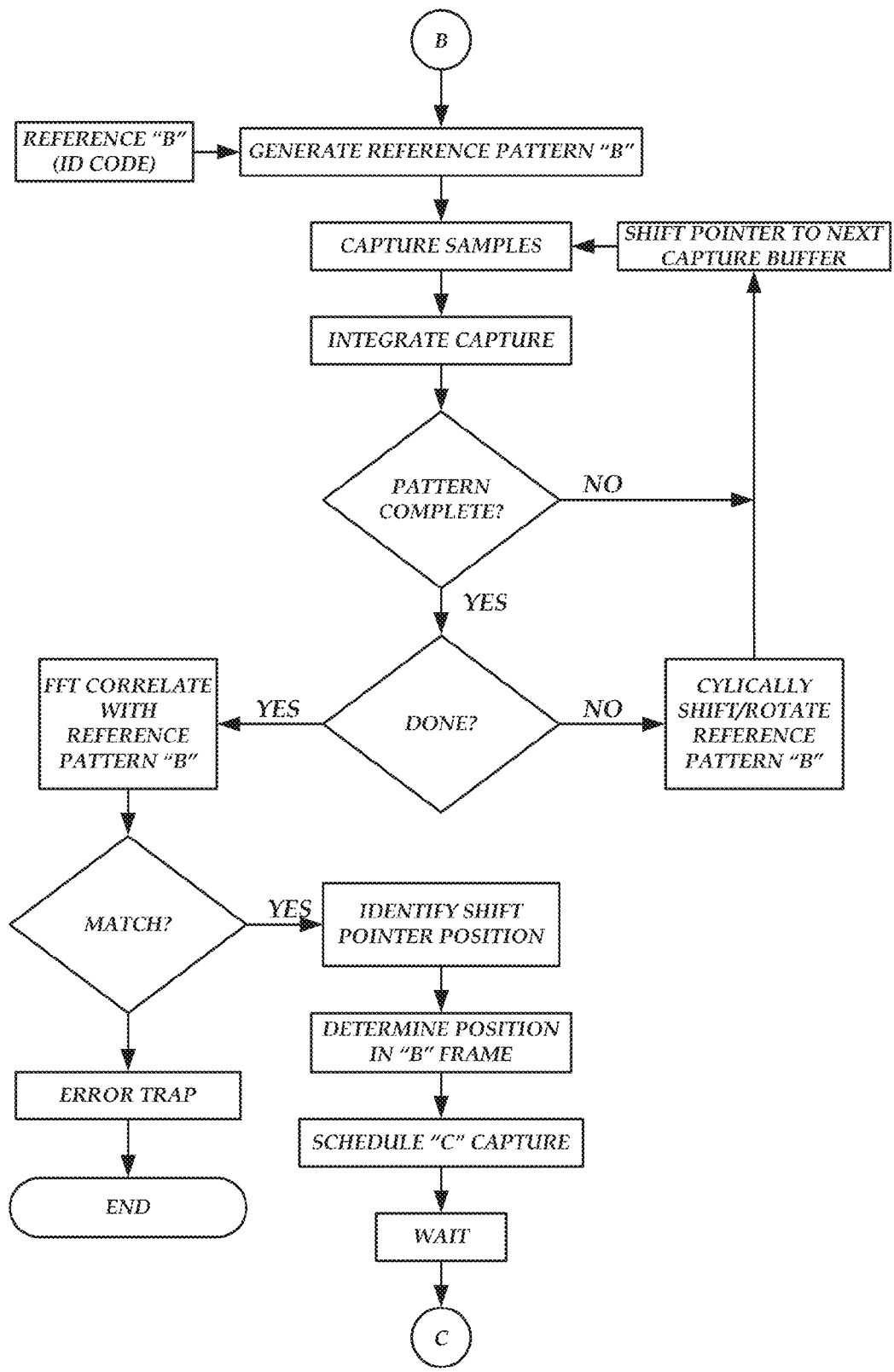

FIG. 13B illustrates the capture of samples associated with pattern "B" in a PED device. The receiver captures a sequence of complex samples (e.g., 4096 complex samples), assuming those samples correspond to sequence "B" using a cyclic accumulation/integration technique that is similar to that previously described for FIG. 7B. A reference pattern associated with pattern "B" is generated. Each received sample is captured and placed in a respective one of a series of buffers, where each buffer has an associated index such as a pointer. Each subsequently captured sample is placed in a different capture buffer (e.g., a capacitive storage cell).

As previously described with respect to the MT, sequence "B" is transmitted multiple times for receipt by the PED, where each subsequent "B" sequence is cyclically rotated with respect to the preceding sequence (e.g., see FIG. 3). As time moves forward a different capture buffer is used as the starting point for capturing a sequence by the PED. For example, assuming a 4096 complex sample pattern with a starting pointer to capture buffer 0, captures will be placed in buffers 0-4095 in sequence. After the first "B" sequence is captured, the next pattern "B" sequence will have a starting point for capture buffer 2, and captures are placed in buffers 2-4094 sequentially followed by capture buffers 0 and 1. Each buffer can be an analog storage cell so that samples from the first pattern are accumulated with the samples from the second pattern using the described method. After numerous accumulations of additional patterns, integration is completed and the accumulated signal can be evaluated.

After all of the samples for pattern sequence "B" (e.g., 4096 complex samples from a sequence of pattern "B") are received (i.e., "pattern complete") and accumulated, the PED will attempt to FFT correlate the integrated captured sequence with the previously generated pattern for pattern "B". When the FFT correlation fails to identify a match, the PED falls into an error trap. Processing a received sequence may expire without match when the transmission is intended for another MT, or perhaps when an error has occurred. An error trap handles the remaining processing when an error occurs.

When the PED finds a correlation match for the generated pattern "B", the PED can then determine the relative position of the matched pattern within the sequence (or within the frame) based on the shift position in the pattern that yields a match. Since the timing, phase, and frequency information are now known, the PED schedules to receive the "C" sequence. Processing continues for the PED in FIG. 9, which follows below.

In some examples systems the "B" sequence is sampled four times at the transmitter, with each sequence step being four samples. For this example, the receiver samples at half the transmit rate so that each shift in the pattern corresponds to two buffer locations. In other words, the starting point for each "B" sequence capture for this example always corresponds to an even numbered buffer (e.g., 0, 2, 4, . . . ). The PED can then determine the relative position of the matched pattern within the sequence or frame by evaluating the starting point index to the buffer or sample bin that matches or correlates to the expected pattern.

Figure 14:
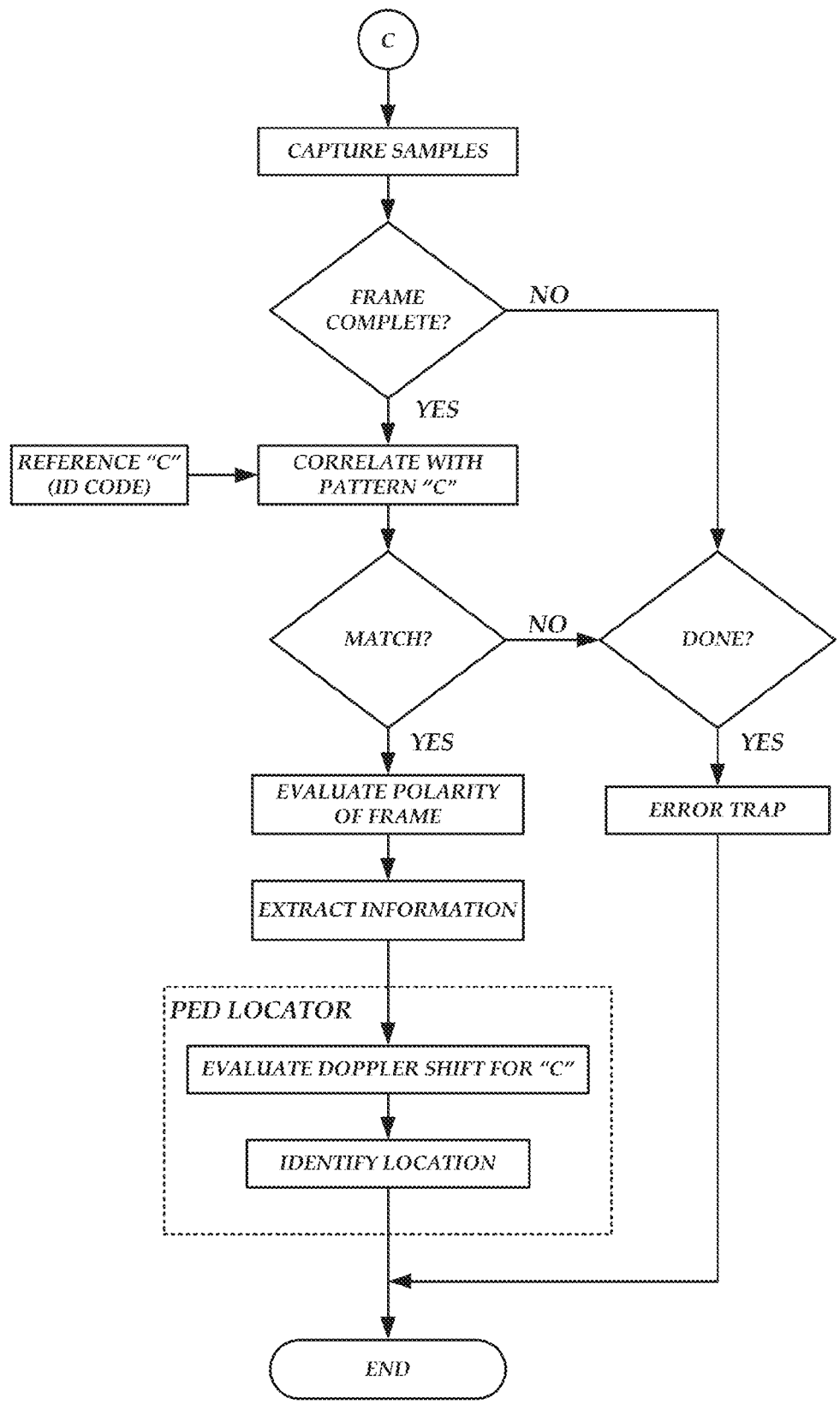

FIG. 14 illustrates the capture of samples associated with sequence "C". The receiver captures samples from the receiver in the MT, assuming those symbols correspond to pattern "C". The MT will continue to capture samples until the frame is expected to reach completion. The MT will then attempt to correlate the captured sequence (assuming it is sequence "C" from the PED) with the third portion of the unique identifier for the specific MT. When the correlation fails to achieve a sufficient level for detecting a match, we can assume as a formality that the transmission of the "C" sequence has failed for any number of reasons (excessive noise in the environment, a high strength interfering signal, etc.) Since we know precisely when transmission of sequence "C" should occur, and what carrier frequency, phase, timing, and cadence for which transmission should occur, the receipt of the "C" pattern can be used formalistically for verification of a valid transmission.

Sequence "C" includes data modulated therein that may be coded with error correcting codes (ECC), where the coded information can be phase modulated and subsequently demodulated and decoded. When the time-period has not expired, capturing of the expected C sequence is resumed, followed by correlation determinations again. When the time-period has expired without a match of sequence "C", the MT determines that the transmission is intended for another and traps an error condition appropriately. Alternatively, the MT finds a match for pattern "C" and evaluates the polarities of the symbols received in this frame, and extracts command and control information from the "C" sequence.

In the case of the MT, the completed capture of sequence C is followed by a transmission of sequences "A", "B", and "C2" (or some other order, perhaps, or even a different set of A'B'C'. Sequences "A" and "B" include a similar pattern as previously described for the PED, although shorter in length. Sequence "C2" is still the same number of frames except that data is encoded into the transmission for communication between the MT and the PED.

In the case of the PED, the completed capture of sequence C is followed by evaluation of the round-trip time to determine linear distance from the PED to the MT. A time difference is evaluated between the reception of two signals that are received from two different receiving antennas to help identify a vector for direction between the PED and the MT. An analysis of a Doppler shift in the received signals from the MT can also be used to assist in the determination of the directional vector. In addition, sequence "C" is evaluated to extract transferred information from the MT to the PED. Moreover, measurements from the compass sensor and can be utilized to assist in determining location as will be described later.

Example Operational Features and Observations

The present disclosure merges "location request" polling with the location process itself. The PED device is arranged to provide a relatively lengthy, powerful, coded signal whose duration spans the polling interval of the MT. The MT very briefly samples the relevant spectrum, and finds a coded spread spectrum signal. In this event, the MT performs multiple signal captures from the lengthy transmission, making successively more accurate estimates of the signals frequency, cadence, and time reference. These estimates are limited in precision by the short-term stability (root Allan variance) of the MT's and PED's time bases (e.g., a quartz crystal oscillator) and by the relative acceleration between the PED and the MT. This Allan variance will typically be better than 1 part per billion, but the acceleration for observation periods of 0.25 seconds may be the order of: 10 meters/sec$^2$ by 0.25 seconds, which would give a 2.5 meter/second Doppler change. This lurch is unusual, and typically, a 0.25 meter/second change or less is observed. A velocity change of 0.25 meter/second round-trip is 0.5 meter/second, which is a Doppler change of $0.5/3*10^8$, or 1.6 parts per billion (ppb). Thus, the estimates of incoming signal frequency/sequence should have a precision of approximately two (2) parts per billion or better. Experimentally, two (2) ppb has been observed.

The MT can use the precise estimate of the received signal timing to synthesize a coded spread spectrum reply with substantially the same timing and carrier frequency. This reply signal is emitted shortly after the end of the incoming signal. Since the timing is accurately captured, the presence of a delay or gap doesn't materially degrade accuracy. For example, if the time-base error is 2 ppb, then a 30 ms delay translates into a time uncertainty of approximately 60 ps, which is about one centimeter of round trip distance.

The coded reply signal from the MT is sufficiently lengthy so that integration over time compensates for its relatively low power. The signal from the MT can be coherently processed by the PED since the return signal is coherent plus or minus the synthetic round-trip Doppler shift with the PED's time base. A cyclic set of 4096 complex capacitive integrators can be used to perform the process of signal accumulation to raise the weak signals up and out of the noise floor. The complex patterns (e.g., a pattern of length 2047 chips) have approximately 33 db of spreading gain. The addition of the cyclic integrators can achieve an additional 20 db of signal gain with the repetitive portions of the signal, yielding 53 db of total gain. A bandwidth reduction from 26 MHz down to about 100 Hz is achieved with this technique. The thermal noise over the 100 Hz bandwidth is approximately −154 dbm, where reasonable signal reception is expected around a noise level of −140 dbm. A maximum path loss of 150 dB is achieved for a +10 dbm transmitter. The corresponding ideal free space range for this transmitter is approximately 1000 km assuming a 915 MHz signal and omnidirectional antennae. This large free space range or loss margin is useful for building penetration, implanted devices, and so forth.

The capture duration in the MT is limited by the relative crystal frequency tolerance between the MT and the PED. With time and temperature, and taking advantage of periodic calibration signals, this tolerance can be managed to a few parts per million. Thus, the product of the signaling frequency and the crystal tolerance gives a frequency offset, which in turn indicates the maximum possible reception time without the use of multiple Doppler bins or repeated correlation attempts. For example at 915 MHz and with a 3.5 ppm frequency error, a capture period of 312 μs would correspond to a first complete signal null.

The PED will in general receive a signal whose cadence and frequency very closely match its internal crystal clock, and thus the PED can use long cyclic integration times, which greatly increase the available signal to noise ratio. The described coherent integration (or coherent accumulation) process has a signal power maximum when the signal has rotated through 180 degrees at the end of the capture interval. For a 3.5 ppm frequency tolerance, when the period of the spread signal is designed to be about 150 μs. It is advantageous to use a signal which is itself complex. Improved orthogonality between coded signals is achieved by using a complex signal. For example, the Gold codes used in the GPS system have a length of 1023 chips with a cross correlation of approximately −24 db for 1025 possible codes. The complex signaling codes employed in the presently described disclosure is on the order of length 2047 chips, with a cross-correlation of −33 db for 2048 possible codes. The use of complex codes allows for improved signal rejection.

The round trip Doppler shift between slowly moving objects (e.g., people walking) is on the order of 4-5 ppb. Slowly moving objects provide a significantly longer integration time in cases where the received signal is likely to be very close in frequency to the PED's time base. Even automobile speeds will result in a round-trip Doppler-shift of 200 ppb or less.

Optional PED Compass Operation

The described system performs distance measurement by round trip time measurements. According to the present disclosure, an economical solution is available for a remote locator (PED) device that does not require accelerometers or multiple antennas for resolving directional information. A compass sensor can be adapted for use in the PED such that the target direction (the direction towards the MT from the PED) can be continuously displayed despite any relative change in the PED's orientation. Diversity antennas can be used to gain additional information about signal strength, distance and Doppler, etc.

Initially, when the user of the PED seeks to find an MT, a "search" mode is engaged. When the PED receives a satisfactory counter-signal from the MT the PED can determine the distance to the MT and provide an appropriate alert indicator to the user. Alert indicators may include, for example, an audible indicator via the audio output device, a visible indicator via the video output device, or a vibrating indicator.

After the initial search and alert are completed, the user can activate a "locate" mode. In the locate mode, the user holds the PED away from the body approximately at an arms length. The user then moves the PED through at least a portion of an arc or through a complete circular motion that is centered approximately about the user's head.) to scan for the MT. During the locate mode, the PED will handshake many times with the MT while acquiring a series of data items such as time of arrival (TOA), and Doppler readings which are interferometric. As the PED is spun in a circular motion, compass readings are also taken. The compass readings are associated with distances and Doppler readings. The distance change associated with the rotation is doubled by the round-trip transit time. In one example, a user may extend the PED away from his body around 70 cm of distance, and the corresponding round-trip time variation is around 280 cm, or about 8 waves at a frequency of 915 Mhz.

An example user rotates the PED at a variety of rates that can range between around 36 degrees/second and 180 degrees/second. The distance measurements that are acquired by the PED will fluctuate based on the PED's relative orientation relative to the MT. In other words, the distance between the PED and the MT is a function of the rotational position of the PED during the circular spin. The distance is also a function of the distance the user extends his arms to hold the PED away from their body during the rotational movement. In one example, the user holds the PED 70 cm away from their body, the compass reading has an initial reading of 84 degrees and the actual target is located at a heading of 120 degrees. For this example, the heading difference between the initial reading and the actual target is 34 degrees, which result in a distance change between the actual target and the user of: 2·0.7 m·COS (34°)=1.1326 m. As the user continues to rotate about their centerline, the distance to the target continues to change as illustrated by FIG. 10A. When the PED is oriented at the target heading of 120 degrees, the distance change peaks (1.4 m), while the distance change is lowest (−1.4 m) when the PED is oriented at the heading of 300 degrees since the PED is positioned at the furthest point relative to the target (180 degrees away from the target).

The heading from the PED to the MT is unknown until at least a partial rotation is complete and sufficient data is collected of compass readings, distance measurements, and Doppler readings to resolve the proper direction. The correlator in the PED is arranged to generate correlation phase information heading between the target location (the MT) and the PED. The correlation phase information is illustrated by the graph of FIG. 10B, where the correlation phase (Phase) is determined by the following equation: Phase=360°·(Φ−Δd/

λ), where Φ is the initial correlator phase, Δd is the change in distance for a given directional heading, and λ is the wavelength of the transmission.

As described, the PED is arranged to collect a series of compass headings and distances to resolve a target location for the MT. The motion or action required of the user is relatively intuitive in that the circular motion required for the PED is similar to the motion required for a user to visually search by "looking around" their current location. The cost of a PED that is employed in the above-described examples is reduced considerably since the use of accelerometers is not required. Moreover, the cost associated with some conventional two axis compass sensor devices is currently less than approximately two dollars.

Look Around Procedure

Figure 16A:
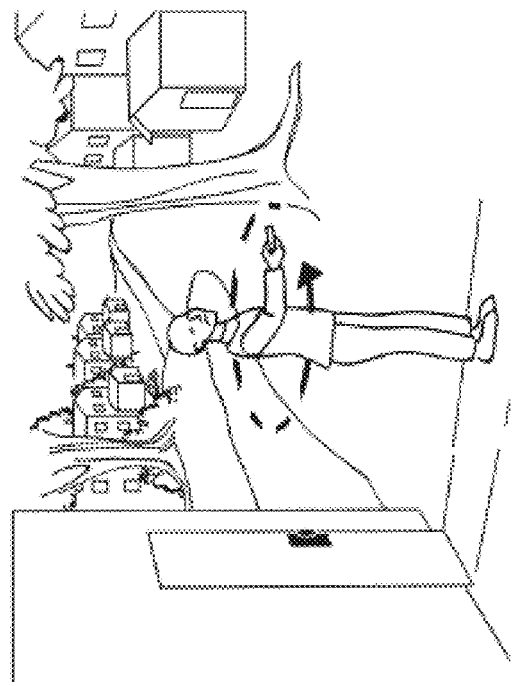
FIGS. 16A-16C are example illustrations for a look-around procedure that is employed by a user in a search and locate mode.
Figure 16B:
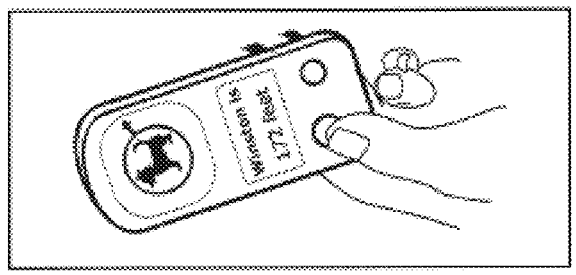
Figure 16C:
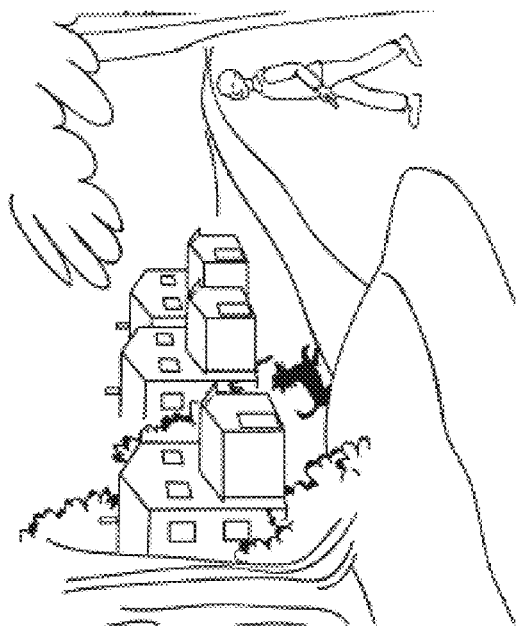

FIGS. 16A-16C are example illustrations for a look-around procedure that is employed by a user in a search and locate mode arranged according to at least one aspect of the present disclosure. The procedure illustrated by these figures depicts an owner that is searching for their dog, which has disappeared in the neighborhood. The dog has a MT device affixed to their collar, for example, so that the dog can be found with a hand-held PED device. The description is not intended to be limited to locating animals, and can be used to locate any object, person, animal, or thing that has a transponder device affixed thereto, or perhaps implanted therein As illustrated in FIG. 16A, a person comes out of their home to search for a runaway dog (e.g., "Winston" the dog) while holding an PED device, which is depicted in this example as a small hand-held device. The person activates the PED device into a search mode by pressing one of the buttons on the device (see FIG. 16B), and the PED transmits a ping to the MT. If within range, the MT transmits a reply to the PED. When the PED recognizes that the MT has been found, a user alert is issued such as an audible beep or a visible indicator. At this point the person activates the locate mode by pressing one of the buttons on the device. During the locate mode, the person extends their arm away from their body and rotates the PED about their centerline (e.g., see the dotted line in FIG. 11A), such as by pivoting about their heels.

Once a sufficient rotation has been completed the PED has found the MT (aka "Winston" the dog), and a directional indicator is illuminated on a display of the PED device as shown in FIG. 16B. Also shown in FIG. 16B, the distance between the PED and the MT is displayed indicating that "Winston" is located 172 feet away towards the right. As shown in FIG. 11C, the person then walks in the direction of the arrow on the display of the PED to locate the dog. As the person approaches the dog, the distance measurement will be updated to indicate that they are getting closer and closer. Once the person is within a close proximity (e.g., 10 feet) of the dog, the PED can provide a short audible indicator and then go to sleep mode.

Ping Modes

Figure 17:
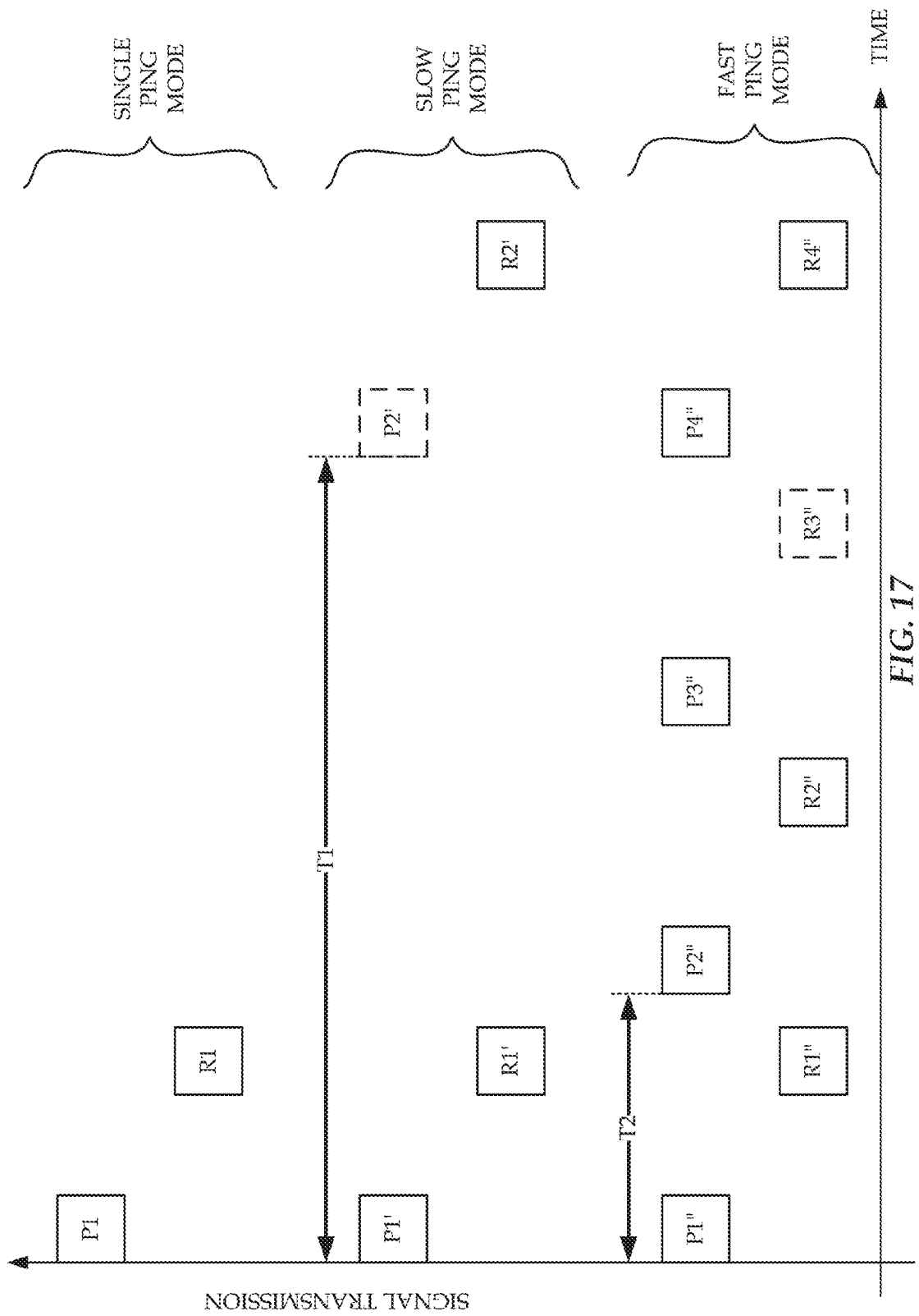
FIG. 17 is an example diagram illustrating single ping mode, slow ping mode, and fast ping mode.

FIG. 17 is an example diagram illustrating single ping mode, slow ping mode, and fast ping mode. As previously described a "ping" corresponds to a complete transmission by the PED to the MT, such as a complete set of the three frame transmission sequence. Similarly a "reply" corresponds to a complete set of frames from that are transmitted from the MT to the PED. In FIG. 17, each block designated as Px is intended to indicate a time of transmission for a ping that includes a complete set of frames, while Rx is intended to indicate a time of transmission for a reply that also includes a complete set of frames.

The described system performs distance measurement by round trip time measurements. The ping modes are arranged to provide regular communications between the PED and the MT, where distances can be tracked without excess energy consumption or spectral pollution. After an MT and PED have exchanged signatures, they share very precise mutual clock rate information. The accuracy of this clock rate information, absent any Doppler shift, is one part per billion or better. As time elapses between transmissions, the unit time bases, which aren't perfectly steady, will drift with respect to each other. By calibrating the low-speed sleep mode oscillator against the high-speed clock, so that a given sleep period can be accurately enumerated as a known number of high-speed clock periods, it is possible to accurately measure periods of several minutes without actually operating the high-speed clock. However, a long initial baseline for frequency determination is necessary to initially synchronize the clocks between the MT and the PED. Once synchronized/calibrated the precise timing is known and shorter transmissions are possible.

In the single ping mode, the PED transmits a single ping (P1) to the MT. The MT receives ping P1 when it within a transmission range of the PED for proper reception. The MT is arranged to transmit a reply (R1) to the PED in response to ping P1 when the ping is properly recognized as coded for the particular MT.

In the slow ping mode, the PED is arranged to continuously transmit a series of single pings (P1', P2' . . . PN') to the MT. Each subsequent ping is separated in time by a ping interval (T1) as illustrated. The MT receives each ping when it is located within a transmission range of the PED for proper reception, and transmits a corresponding reply (R1', R2' . . . RN') for each ping that is properly recognized as coded for the particular MT.

In the fast ping mode, the PED is arranged to continuously transmit a series of short duration single pings (P1", P2" . . . PN") to the MT. Each subsequent ping is separated in time by a ping interval (T2), which is significantly shorter in time than ping interval T1. For example, each ping in the fast ping mode is on the order of hundreds of microseconds to a few milliseconds in length. Since the timing and cadence is know from prior receptions, the coarse timing is already known and the PED is able to utilize greatly abbreviated transmissions. The short duration ping can be accomplished using just a portion of an "A" sequence. The MT receives each ping when it is located within a transmission range of the PED for proper reception, and transmits a corresponding reply (R1', R2' . . . RN') for each ping that is properly recognized as coded for the particular MT.

It is important to note that the MT may not always be able to properly receive a particular ping from an PED in even though it is properly coded for recognition by the MT. Environmental conditions such as noise, buildings, and other electronic interferences may inhibit a ping (e.g., ping P2') from reaching the intended MT. Similarly, environmental conditions may cause a reply (e.g., reply R3") from reaching the intended PED.

Example Operation of the PED in Search and Locate Modes

FIGS. 18A-18D are example flow charts for example mode selection features for an example remote locator (PED) arranged according to at least one aspect of the present disclosure.

Initially, a user input is asserted to activate the search mode on the PED, such as by activation of a button shown as shown in FIG. 16B or via a speech input as previous described. The user input is evaluated by the mode logic in the PED to decide if the user is requesting the search mode. The search mode can be implemented as a single ping mode or a multiple ping mode.

Figure 18A:
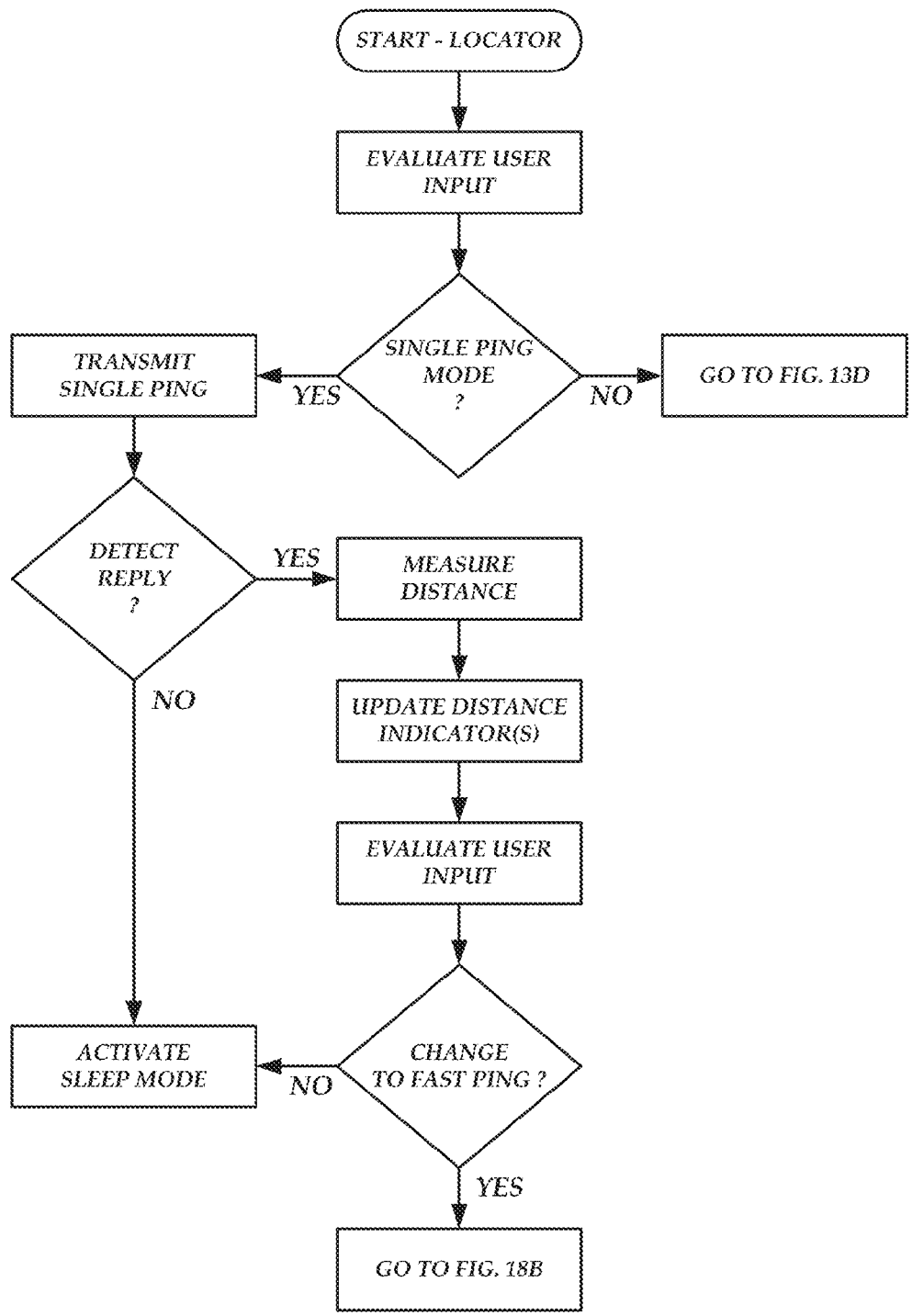
FIGS. 18A-18D are example flow charts for example mode selection features for an example locator.

As described in FIG. 18A, a single ping is transmitted from the PED to the MT (e.g., P1 from FIG. 17) when the single ping mode is selected by the user for the search mode. The PED then waits to detect a reply from the MT (e.g., R1 from FIG. 17). If no reply is detected, the PED device activates a sleep mode to conserve power. When a reply is properly detected from the MT, the PED measures the distance to the MT based on the round-trip time of the ping and the corresponding reply. Indicators on the PED are updated to alert the user of the currently determined distance. Example indicators include an LCD display that indicates the current distance, an audible indicator, a vibrating indicator, as well as others. The PED then waits for another user initiated input to change from the search mode to the locate mode. The locate mode requires a fast ping sequence as will be described with reference to FIG. 18B. Otherwise, another mode can be selected or the device can go to a sleep mode to conserve power.

Figure 15A:
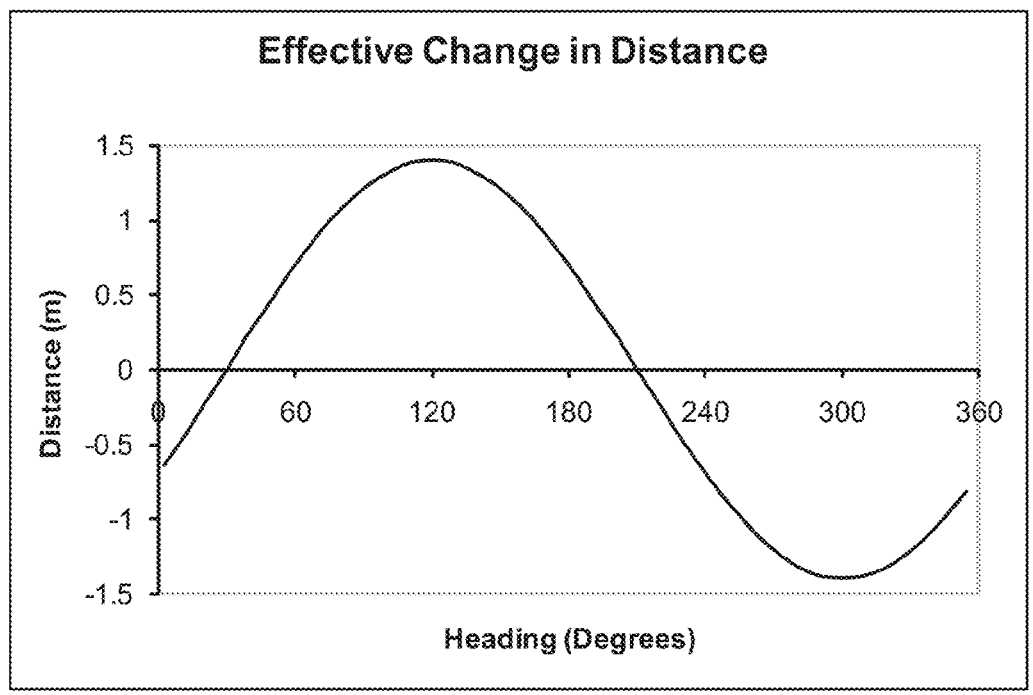
FIG. 15A is an example graph for effective change in distance during a rotation through 360 degrees.
Figure 15B:
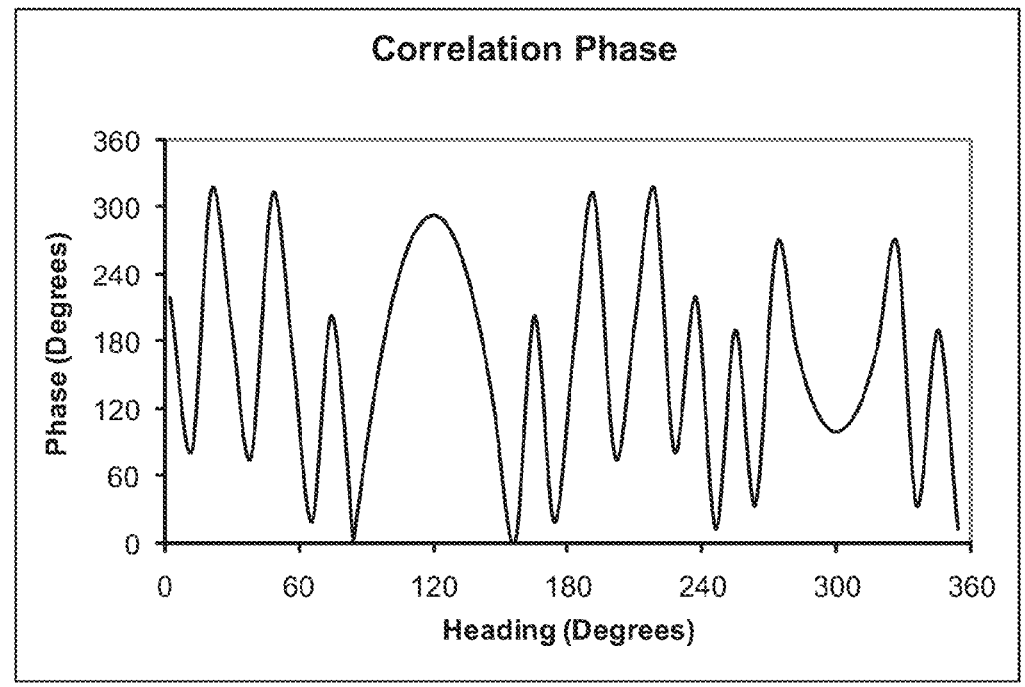
FIG. 15B is an example graphs for correlation phase information from a rotation through 360 degrees.
Figure 18B:
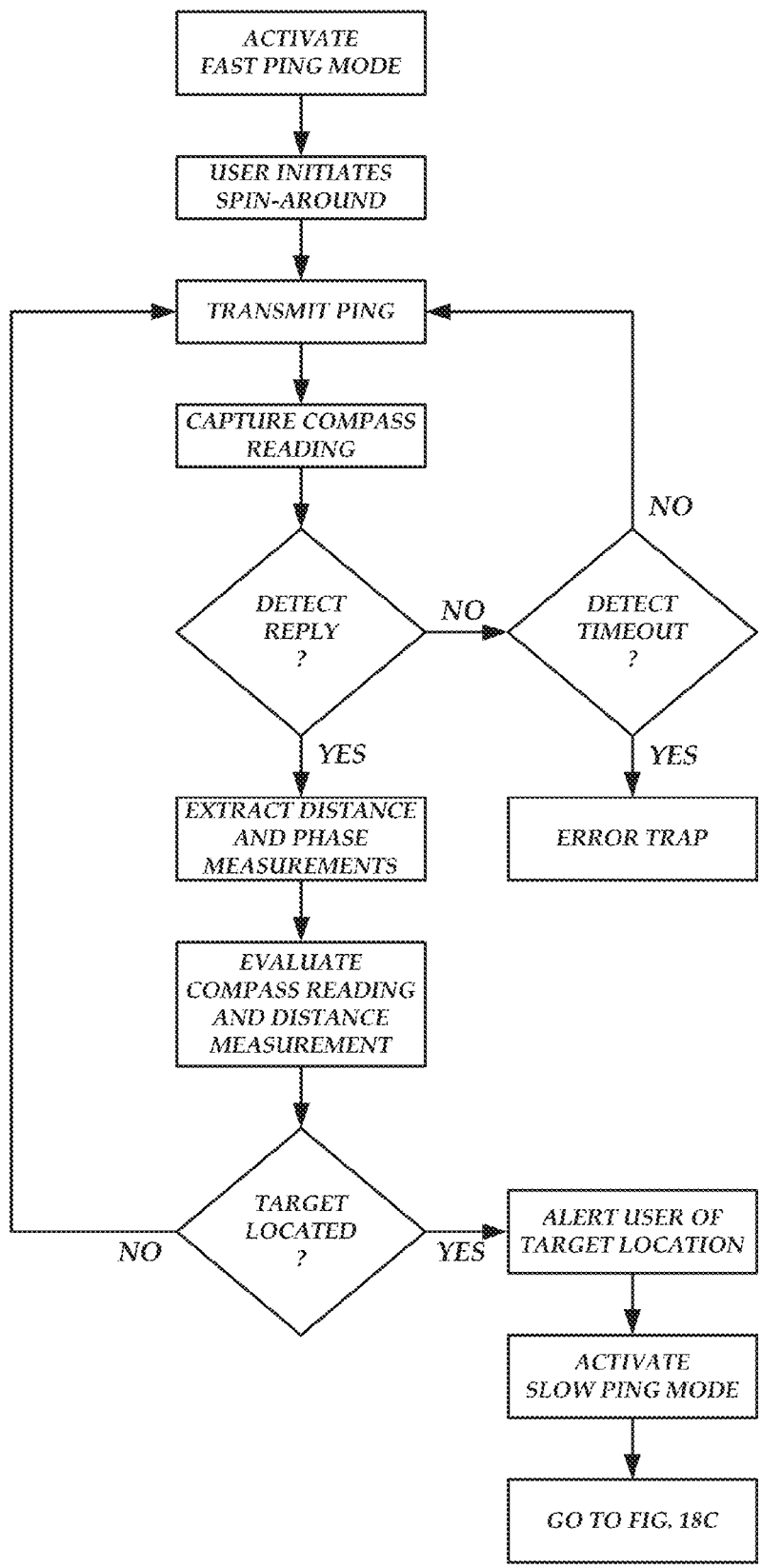

Referring now to FIG. 18B, a fast ping mode is activated by the PED then user selects the locate mode. During the locate mode, the user initiates a spin around procedure such as that previously described, and the PED transmit pings at a more frequent interval such as illustrated by time interval T2 in FIG. 17. After each ping is transmitted by the PED, compass readings are captured and the PED looks for a reply from the MT. A timeout detection and error trap procedure can be employed to take appropriate action (e.g., go to sleep mode) when the MT does not reply within a prescribed time limit. Otherwise, each reply from the MT is analyzed to determine distance and phase information as the spin around is initiated. The compass readings are analyzed with the calculated distances to determine if an initial location for the target has been identified. As previously described with reference to FIGS. 15A and 15B, the calculated distance will change as the user initiates the spin-around such that a minimum distance can be identified when the PED is oriented at a closest point towards the MT. The captured data can be further analyzed to ensure an accurate reading on the compass. The PED includes updates direction indicators for based on the identified initial location as illustrated in FIG. 16, where a compass is illuminated to identify the heading to the target and an LCD display indicates the range to the target. Once the user has located the target, the slow ping mode is activated (see FIG. 17) and processing continues to FIG. 18C.

Figure 18C:
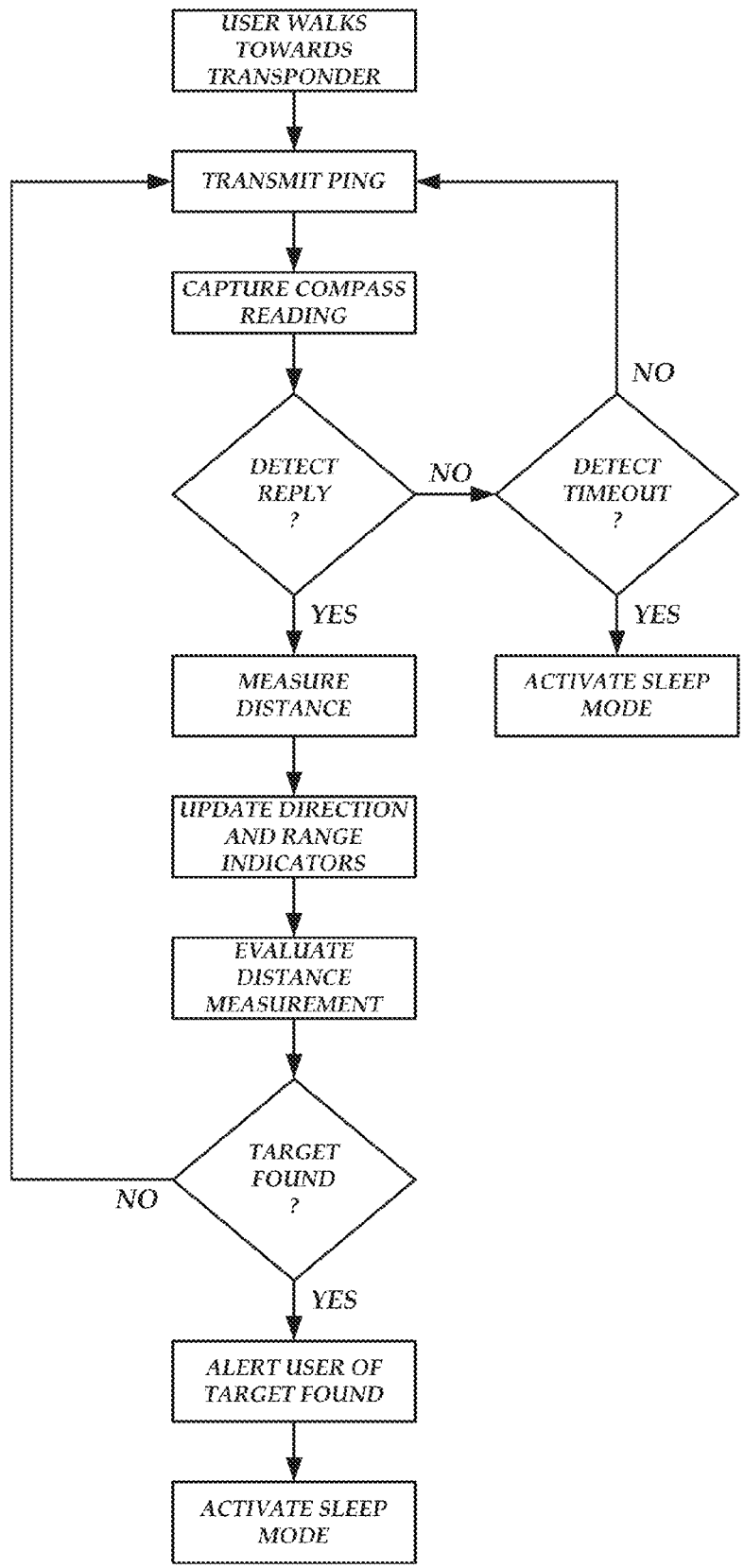

As shown in FIG. 18C, the user can begin walking towards the MT after the initial location is identified. The PED transmits a slow ping, where each subsequent ping is spaced apart in time such as is illustrated by time interval T1 in FIG. 17. Compass readings are captured and the distance measurements and current direction indicators are updated each time a reply is received from the MT. The desired direction to locate the MT is also indicated on the PED so that the user can monitor if they are walking in the proper direction or not. Once the PED is within a prescribed range such as 10 feet, for example, the PED provides an alert indication (e.g., a sound, a flashing light, a vibrating alert, etc.) that the target has been found and the PED goes to a sleep mode. A timeout detection and sleep mode activation can be employed for cases where the PED loses communication with the MT once the slow ping mode is enabled.

Figure 18D:
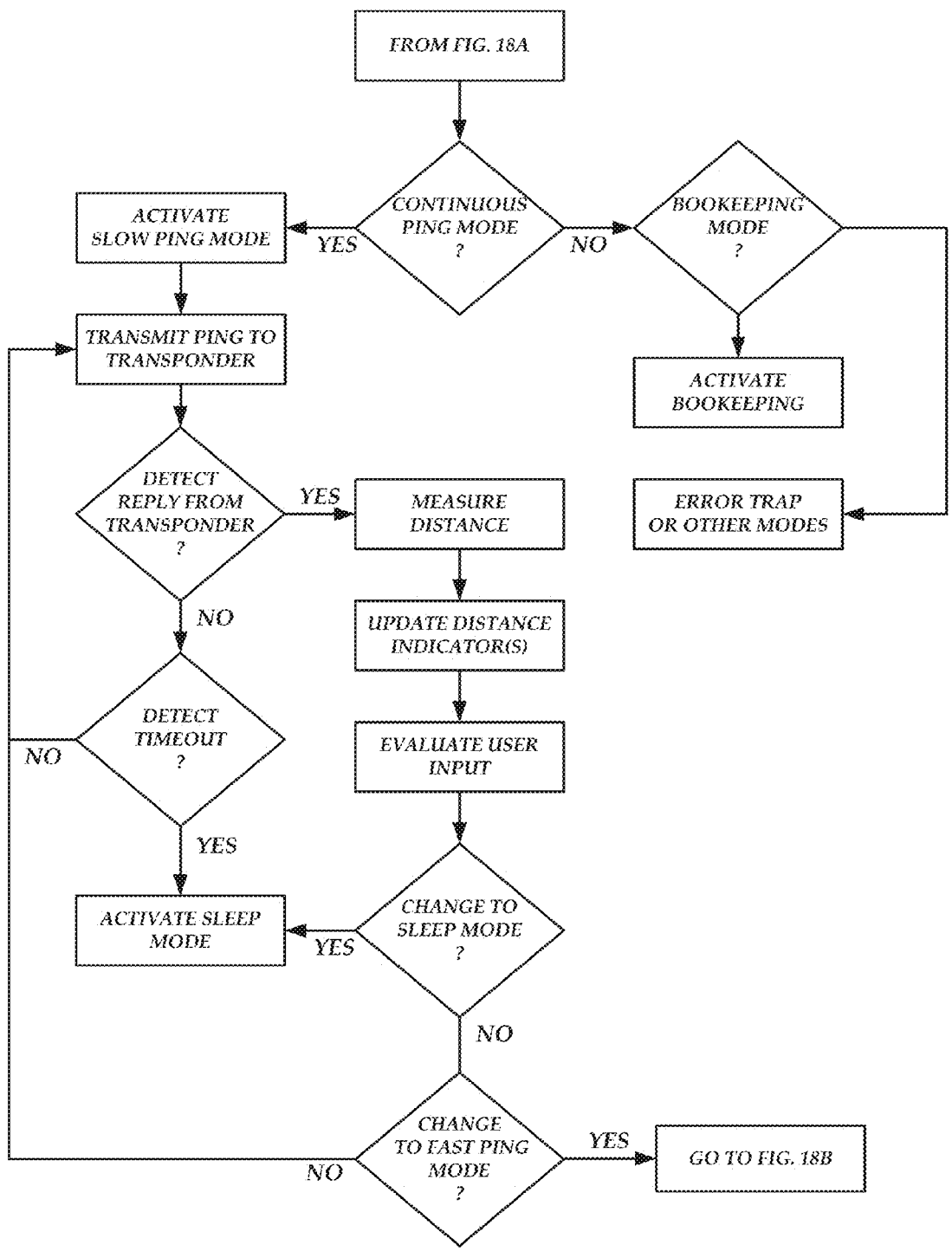

When a mode other than the single ping mode is selected by a user from FIG. 18A, processing continues to FIG. 18D. A continuous ping mode can be activated by the user for the search mode, where a slow ping is periodically transmitted from the PED to the MT. Distances are calculated and compass readings are captured when the PED detects a reply from the MT. Distance indicators are then updated on the PED (e.g., range readings are updated, lights are activated, sounds are initiated, etc.). User inputs are evaluated during the continuous ping mode to permit selection of any number of modes such as a sleep mode or activation of the locate mode such as described above with reference to FIG. 18B. When replies are not received from the MT with a prescribed timeout period, the device can again go to a sleep mode to conserve power. Other example modes can include bookkeeping modes were data and other diagnostic information can be collected by the PED, or perhaps the PED can transmit a command for the MT to log or transmit other information.

Example Operation of the MT in Search and Locate Modes

Figure 19A:
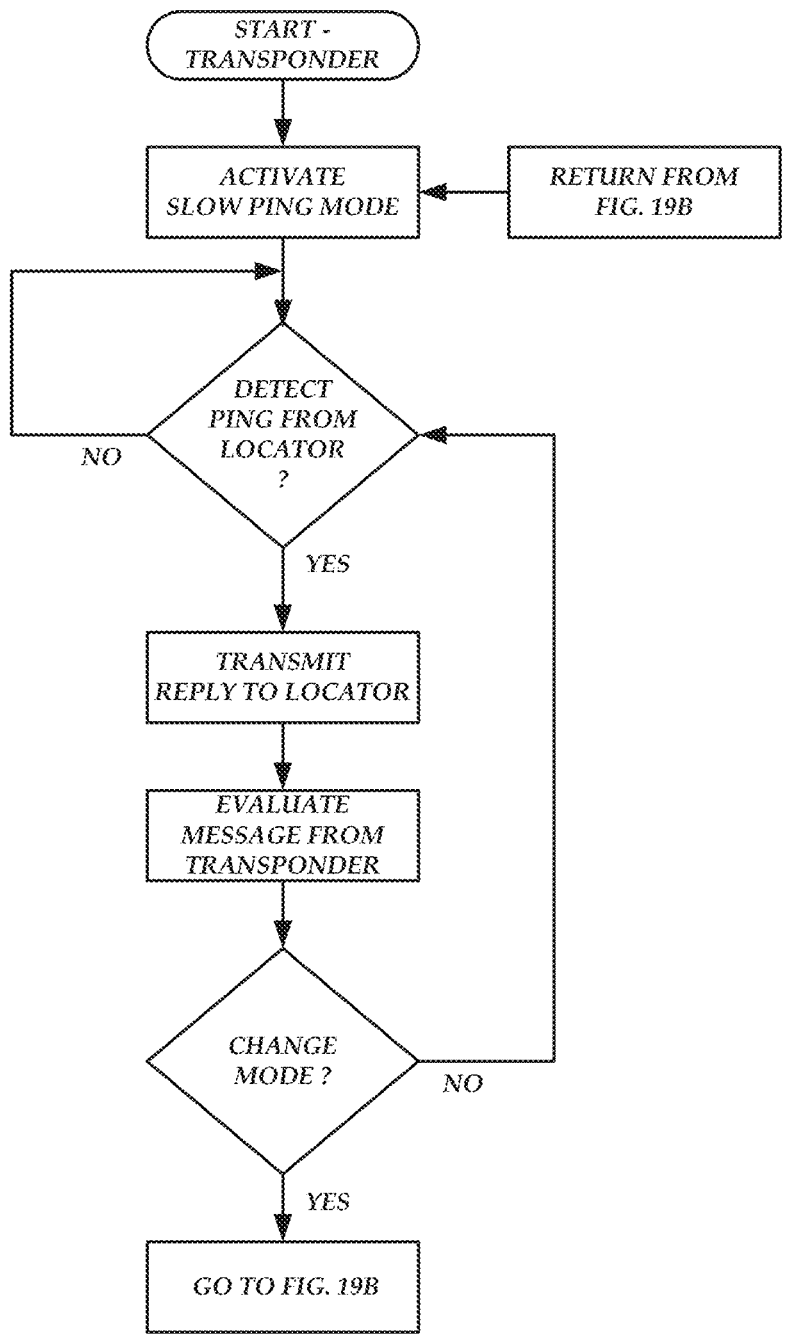
FIGS. 19A-19B are example flow charts for example mode selection in an example micro-transponder (MT), all arranged in accordance with the present disclosure.
Figure 19B:
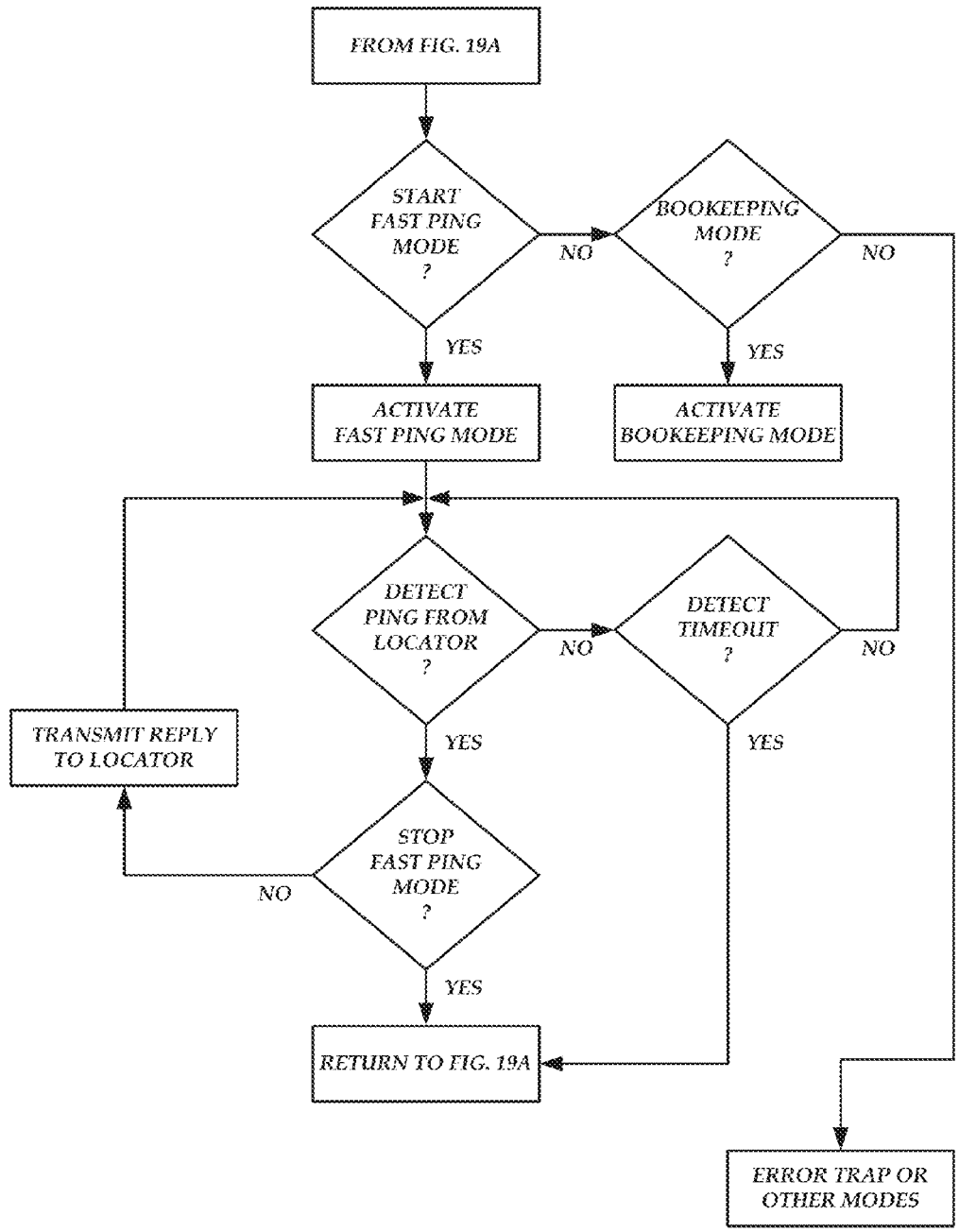

FIGS. 19A-19B are example flow charts for example mode selection in an example micro-transponder (MT) arranged in accordance with at least one aspect of present disclosure.

As shown in FIG. 19A, the transponder is initially in a slow ping mode such as described previously. When a ping is detected from the PED, the MT transmits a reply to the PED and evaluates any coded messages or commands that are communicated in the ping. When the PED requests the MT to change modes, processing continues to FIG. 19B.

The change mode request is evaluated by the MT in FIG. 19B. The mode request may be to change to a fast ping mode, enter a bookkeeping mode, or some other mode as may be desired. In the fast ping mode, the MT monitors received signals more frequently than the slow ping mode and provides a rapid reply to the PED. In the bookkeeping mode, the MT encodes additional information into reply messages for the PED such as, for example, estimated battery life, environmental sensor data such as ambient temperature and pressure, biological sensor data such as heart rate and blood pressure, receiver signal quality, receiver signal strength, etc. Eventually, the PED will transmit a signal to change modes back to slow ping mode and the processing will return back to FIG. 19A. Otherwise, a timeout may occur when pings from the PED fail to be detected for a predetermined time interval and processing will again return to the slow ping mode to conserve power.

The presently described system, apparatus, and methods take advantage of the acquired frequency knowledge to allow for synthesis of a time and phase coherent response to accurately determine location with a low-power MT. Although the preceding description describes various embodiments of the system, the invention is not limited to such embodiments, but rather covers all modifications, alternatives, and equivalents that fall within the spirit and scope of the invention. For example, the positioning of the various components may be varied, the functions of multiple components can be combined, individual components may be separated into different components, or components can be substituted as understood in the art. Since many embodiments of the invention can be made without departing from the spirit and scope of the invention, the invention is not limited except as by the appended claims.

What is claimed is:

1. A method for determining a relative position of a transponder with a radio transceiver in personal electronic devices that also each include a satellite navigation system, the method comprising:
   identifying a target ID associated with the transponder;
   sending a transponder location request to each of the personal electronic devices;
   receiving a location and distance measurement from each of the personal electronic devices after sending the transponder location request; and
   calculating a location associated with the transponder from at least a portion of the received locations and distance measurements by:

determining a circle for each received distance measurement at a geographic position associated with the corresponding received location;
identifying one or more common point areas that are created by overlapping circles; and
identifying a calculated location and a calculated distance to the transponder based on the identified one or more common point areas.

2. The method of claim 1, wherein calculating the location associated with the transponder from at least the portion of the received locations and distance measurements further comprises setting a radius of each circle according to a corresponding one of the received distance measurements.

3. The method of claim 1, further comprising: sending a message to a requesting personal electronic device with the identified calculated location and calculated distance to the transponder, wherein a user initiated the transponder position determination with the requesting personal electronic device.

4. The method of claim 1, further comprising: sending a message to a personal computer device with the identified calculated location and calculated distance to the transponder, wherein a user initiated the transponder position determination with the personal computer device.

5. The method of claim 1, wherein each identified personal electronic device is arranged for:
receiving the transponder location request;
executing a radio set configuration logic such that the radio transceiver is reconfigured from a cellular telephone mode to a locator mode to form a software configured radio transceiver, wherein the software configured radio transceiver is arranged for:
selecting the target ID associated with the transponder from the transponder location request;
coding a sequence for the selected target ID;
initiating a transmission of a structured multi-frame transmission to the transponder over a first time interval with the software configured radio transceiver;
identifying a geographic location for a personal electronic device with the satellite navigation system when the transmission is initiated;
capturing samples of a signal spectrum over a second time interval that is subsequent to the first time interval with the software configured radio transceiver;
correlating the captured samples over a third time interval with the software configured radio transceiver;
detecting a valid reply from the transponder when the captured samples correlate to a structured reply transmission from the transponder with a reply cadence and frequency that substantially matches an expected reply cadence and frequency based on an internal clock of the personal electronic device; and
determining a round-trip time-of-flight between the transmission of the structured multi-frame transmission and the detected valid reply;
calculating a distance measurement from the determined round-trip time-of-flight;
and sending a message including the calculated distance measurement and the identified geographic location.

6. A system for determining a relative position of a transponder with personal electronic devices, the system comprising:
the transponder;
a satellite navigation system;
personal electronic devices (PEDs) that each comprise a radio transceiver;
a computing device that is configured to identify a target ID associated with the transponder and send a transponder location request to the PEDs; wherein each of the PEDs is configured to perform operations, comprising:
receive the transponder location request;
determine a location and distance measurement of the transponder;
send the location and distance measurement to the computing device;
the computing device performing actions, comprising:
receiving locations and distance measurements from at least a portion of the PEDs;
calculating a location associated with the transponder from at least a portion of the received locations and distance measurements by:
determining a circle for each received distance measurement at a geographic position associated with the corresponding received location;
identifying one or more common point areas that are created by overlapping circles; and
identifying a calculated location and a calculated distance to the transponder based on the identified one or more common point areas.

7. The system of claim 6, wherein calculating the location associated with the transponder from at least the portion of the received locations and distance measurements further comprises setting a radius of each circle according to a corresponding one of the received distance measurements.

8. The system of claim 6, wherein the computing device is a PED.

9. The system of claim 6, wherein the computing device is a server.

10. The system of claim 6, wherein each of the PEDs is arranged for:
executing a radio set configuration logic such that the radio transceiver is reconfigured from a cellular telephone mode to a locator mode to form a software configured radio transceiver, wherein the software configured radio transceiver is arranged for:
selecting the target ID associated with the transponder from the transponder location request;
coding a sequence for the selected target ID;
initiating a transmission of a structured multi-frame transmission to the transponder over a first time interval with the software configured radio transceiver;
identifying a geographic location for a personal electronic device with the satellite navigation system when the transmission is initiated;
capturing samples of a signal spectrum over a second time interval that is subsequent to the first time interval with the software configured radio transceiver;
correlating the captured samples over a third time interval with the software configured radio transceiver;
detecting a valid reply from the transponder when the captured samples correlate to a structured reply transmission from the transponder with a reply cadence and frequency that substantially matches an expected reply cadence and frequency based on an internal clock of the personal electronic device; and
determining a round-trip time-of-flight between the transmission of the structured multi-frame transmission and the detected valid reply;
calculating a distance measurement from the determined round-trip time-of-flight; and
sending a message including the calculated distance measurement and the identified geographic location.

* * * * *